US008940184B2

(12) United States Patent
Taugerbeck et al.

(10) Patent No.: US 8,940,184 B2
(45) Date of Patent: Jan. 27, 2015

(54) POLYMERIZABLE COMPOUNDS AND THEIR USE IN LIQUID-CRYSTAL DISPLAYS

(75) Inventors: Andreas Taugerbeck, Darmstadt (DE); Achim Goetz, Alsbach-Haehnlein (DE)

(73) Assignee: MERCK PATENT GmbH, Darmstadt (DE)

( * ) Notice: Subject to any disclaimer, the term of this patent is extended or adjusted under 35 U.S.C. 154(b) by 0 days.

(21) Appl. No.: 13/498,694

(22) PCT Filed: Aug. 30, 2010

(86) PCT No.: PCT/EP2010/005315
§ 371 (c)(1),
(2), (4) Date: Mar. 28, 2012

(87) PCT Pub. No.: WO2011/035842
PCT Pub. Date: Mar. 31, 2011

(65) Prior Publication Data
US 2012/0182516 A1      Jul. 19, 2012

(30) Foreign Application Priority Data

Sep. 28, 2009 (DE) .................. 10 2009 043 261

(51) Int. Cl.
| | | |
|---|---|---|
| *C09K 19/06* | (2006.01) | |
| *C09K 19/34* | (2006.01) | |
| *C09K 19/32* | (2006.01) | |
| *C09K 19/12* | (2006.01) | |
| *C09K 19/02* | (2006.01) | |
| *G02F 1/1333* | (2006.01) | |
| *C07D 311/02* | (2006.01) | |
| *C07C 69/00* | (2006.01) | |
| *C07C 69/52* | (2006.01) | |
| *C07C 39/12* | (2006.01) | |
| *C07C 33/00* | (2006.01) | |
| *C09K 19/04* | (2006.01) | |
| *C09K 19/54* | (2006.01) | |

(52) U.S. Cl.
CPC ..... *C09K 19/0403* (2013.01); *C09K 2019/0448* (2013.01); *C09K 2019/548* (2013.01)
USPC .............. 252/299.6; 252/299.61; 252/299.62; 252/299.63; 252/299.66; 428/1.1; 349/86; 349/182; 549/283; 560/139; 560/140; 560/194; 568/747; 568/808

(58) Field of Classification Search
USPC ............... 252/299.01, 299.6, 299.61, 299.62, 252/299.63, 299.66; 428/1.1; 349/86, 182; 549/283; 560/139, 140, 194; 568/747, 568/808
See application file for complete search history.

(56) References Cited

U.S. PATENT DOCUMENTS

| 5,770,107 A | 6/1998 | Hassall et al. |
|---|---|---|
| 6,369,262 B1 | 4/2002 | Chartoff et al. |
| 6,491,990 B1 | 12/2002 | Parri et al. |
| 6,514,578 B1 | 2/2003 | Farrand |
| 7,988,882 B2 * | 8/2011 | Tomita et al. ............... 252/299.6 |
| 8,304,035 B2 * | 11/2012 | Bernatz et al. ........... 252/299.01 |
| 2002/0006479 A1 | 1/2002 | Sekine |
| 2004/0175638 A1 | 9/2004 | Tierney et al. |
| 2009/0141215 A1 | 6/2009 | Bremer et al. |
| 2013/0093975 A1 * | 4/2013 | Taugerbeck et al. ............ 349/56 |

FOREIGN PATENT DOCUMENTS

| CN | 1413969 | 4/2003 |
|---|---|---|
| DE | 10241721 | 4/2003 |
| DE | 10 2008 036 248 A1 | 3/2009 |
| EP | 0 972 818 A1 | 1/2000 |
| EP | 1 404 683 B1 | 10/2005 |
| GB | 2 280 445 A | 2/1995 |
| GB | 2 306 470 A | 5/1997 |
| GB | 2 351 734 A | 1/2001 |
| GB | 2388600 | 11/2003 |
| JP | H08-133996 | 5/1996 |
| JP | H11-228460 | 8/1999 |
| JP | 2002012579 | 1/2002 |
| JP | 2003147020 | 5/2003 |
| JP | 2004002392 | 1/2004 |
| WO | WO 03/006468 A2 | 1/2003 |

OTHER PUBLICATIONS

Chartoff et al. ("Properties of High Temperature Liquid Crystal Stereolithography Resin", Solid Freefrom Fabrication Symposium Proceedings, 1998, 737-744).*
International Search Report of PCT/EP2010/005315 (Nov. 17, 2010).
SI/CMB Research—2009 Copyright Derwent Information Ltd.
English Translation of the Abstract in CN 1413969. Publication date: Apr. 30, 2003. "Triphenyl diacetylene compound with reaction and liquid crystal polymer containing the compound". Inventor: Xu Qianshu et al. Applicant: IND Technology Inst. (Espacenet).
English Translation of the Abstract in DE 10241721. Publication Date: Apr. 20, 2003. "Liquid crystal mixture useful in displays comprises 1,4-diphenyl-1,3-butadiyne derivatives and 1-biphenylyl-2-phenylethyne derivatives". Inventor: Hirschmann Harald et al. Applicant: Merck Patent GMBH. (Espacenet).
English Translation of the Abstract in JP 2002-012579. Publication Date: Jan. 15, 2002. "Phenylacetylene compound, liquid crystal composition, and liquid crystal or optical element". Inventor: Sekine Chizu. Applicant: Sumitomo Chem Co. Ltd. (Patent Abstracts of Japan).
English Translation of the Abstract in JP 2003-147020. Publication Date: May 21, 2003. "Polymer produced by polymerizing liquid crystal gel, optical anisotropic material and liquid crystal or optical element". Inventor: Sekine Chizu et al. Applicant: Sumitomo Chem Co. Ltd. (Patent Abstracts of Japan).
English Translation of the Abstract in JP 2004-002392. Publication Date: Jan. 8, 2004. "Polymerizable compound containing cinnamic acid group and acetylene group". Inventor: Simon Greenfield et al. Applicant: Merck Patent GMBH. (Patent Abstracts of Japan).

(Continued)

*Primary Examiner* — Geraldina Visconti
(74) *Attorney, Agent, or Firm* — Millen, White, Zelano & Branigan, P.C.

(57) ABSTRACT

The present invention relates to polymerizable compounds, to processes and intermediates for the preparation thereof, and to the use thereof for optical, electro-optical and electronic purposes, in particular in liquid-crystal (LC) media and LC displays, especially in LC displays of the PS ("polymer sustained") or PSA ("polymer sustained alignment") type.

31 Claims, No Drawings

(56) References Cited

OTHER PUBLICATIONS

English Translation of the Abstract in JP 08-133996. Publication Date: May 28, 1996. "Diacetylene compound, its production, liquid crystal composition containing the same as active component and liquid crystal element using the same". Inventor: Matsumoto Tsutomu et al. Applicant: Sumitomo Chem Co. Ltd. (Patent Abstracts of Japan).

English Translation of the Abstract in JP 11-228460. Publication Date: Aug. 24, 1999. "Diphenylbutadiyne Derivative". Inventor: Osawa Masahi et al. Applicant: Dainippon Ink & Chem Inc. (Patent Abstracts of Japan).

* cited by examiner

POLYMERIZABLE COMPOUNDS AND THEIR USE IN LIQUID-CRYSTAL DISPLAYS

The present invention relates to polymerisable compounds, to processes and intermediates for the preparation thereof, and to the use thereof for optical, electro-optical and electronic purposes, in particular in liquid-crystal (LC) media and LC displays, especially in LC displays of the PS ("polymer sustained") or PSA ("polymer sustained alignment") type.

The liquid-crystal displays (LC displays) used at present are usually those of the TN ("twisted nematic") type. However, these have the disadvantage of a strong viewing-angle dependence of the contrast. In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of an electrode which is structured in a comb-shaped manner, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are the so-called PS or PSA (polymer sustained or polymer sustained alignment) displays, for which the term "polymer stabilised" is also occasionally used. In these, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable.

Unless indicated otherwise, the term "PSA" is used below as representative of PS displays and PSA displays.

In the meantime, the PS(A) principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without, preferably without, an applied electrical voltage in the case of PSA-IPS displays. As can be demonstrated in test cells, the PS(A) method results in a pretilt in the cell. In the case of PSA-OCB displays, for example, it is possible for the bend structure to be stabilised so that an offset voltage is unnecessary or can be reduced. In the case of PSA-VA displays, the pretilt has a positive effect on response times. For PSA-VA displays, a standard MVA or PVA pixel and electrode layout can be used. In addition, however, it is also possible, for example, to manage with only one structured electrode side and no protrusions, which significantly simplifies production and at the same time results in very good contrast at the same time as very good transparency to light.

Furthermore, the so-called posi-VA displays ("positive VA") have proven to be a particularly suitable mode. Like in classical VA displays, the initial orientation of the LC molecules in posi-VA displays is homeotropic, i.e. substantially perpendicular to the substrates, in the initial state when no voltage is applied. However, in contrast to classical VA displays, in posi-VA displays LC media with positive dielectric anisotropy are used. Like in the usually used IPS displays, the two electrodes in posi-VA displays are arranged on only one of the two substrates, and preferably exhibit intermeshed and comb-shaped (interdigital) structures. By application of a voltage to the interdigital electrodes, which create an electrical field that is substantially parallel to the layer of the LC medium, the LC molecules are transferred into an orientation that is substantially parallel to the substrates. In posi-VA displays, too, it a polymer stabilisation (PSA) has proven to be advantageous, i.e. the addition of RMs to the LC medium, which are polymerised in the cell, whereby a significant reduction of the switching times could be realised.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

In particular for monitor and especially TV applications, optimisation of the response times, but also of the contrast and luminance (thus also transmission) of the LC display continues to be demanded. The PSA method can provide crucial advantages here. In particular in the case of PSA-VA, PSA-IPS, PSA-FFS and PSA-posi-VA displays, a shortening of the response times, which correlate with a measurable pretilt in test cells, can be achieved without significant adverse effects on other parameters.

In the prior art, use is made, for example, of polymerisable compounds of the following formula:

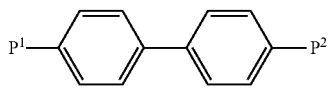

in which P denotes a polymerisable group, usually an acrylate or methacrylate group, as described, for example, in U.S. Pat. No. 7,169,449.

However, the problem arises that not all combinations consisting of LC mixture (also referred to as "LC host mixture" below)+polymerisable component (typically RMs) are suitable for PSA displays since, for example, an inadequate tilt or none at all becomes established or since, for example, the so-called "voltage holding ratio" (VHR or HR) is inadequate for TFT display applications. In addition, it has been found that, on use in PSA displays, the LC mixtures and RMs known from the prior art still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerisation by means of UV light without the addition of photoinitiators is desired, which may be advantageous for certain applications.

In addition, the selected combination of LC host mixture/RM should have the lowest possible rotational viscosity and the best possible electrical properties. In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a particularly small pretilt angle. Preferred materials here are those which produce a lower pretilt angle during polymerisation for the same exposure time than the materials known to date, and/or through the use of which the (higher) pretilt angle that can be achieved with known materials can already be achieved after a shorter exposure time. The production time ("tact time") of the display could thus be shortened and the costs of the production process reduced.

A further problem in the production of PSA displays is the presence or removal of residual amounts of unpolymerised RMs, in particular after the polymerisation step for production of the pretilt angle in the display. For example, unreacted RMs of this type may adversely affect the properties of the display by, for example, polymerising in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerised RMs is often observed in PSA displays. Uncontrolled polymerisation of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerisation of the RMs to proceed as completely as possible during production of the PSA display and for the presence of unpolymerised RMs in the display to be excluded as far as possible or reduced to a minimum. To this end, materials are required which enable highly effective and complete polymerisation. In addition, controlled reaction of these residual amounts would be desirable. This would be simpler if the RM polymerised more rapidly and effectively than the materials known to date.

There is thus still a great demand for PSA displays, in particular of the VA and OCB type, and LC media and polymerisable compounds for use in such displays, which do not exhibit the disadvantages described above or only do so to a small extent and have improved properties. In particular, there is a great demand for PSA displays, and materials for use in PSA displays, which enable a high specific resistance at the same time as a large working-temperature range, short response times, even at low temperatures, and a low threshold voltage, a low pretilt angle, a multiplicity of grey shades, high contrast and a broad viewing angle, and have high values for the "voltage holding ratio" (VHR) after UV exposure.

The invention is based on the object of providing novel suitable materials, in particular RMs and LC media comprising same, for use in PSA displays, which do not have the disadvantages indicated above or do so to a reduced extent, polymerise as rapidly and completely as possible, enable a low pretilt angle to be established as quickly as possible, reduce or prevent the occurrence of "image sticking" in the display, and preferably at the same time enable very high specific resistance values, low threshold voltages and short response times.

A further object of the invention is the provision of novel RMs, in particular for optical, electro-optical and electronic applications, and of suitable processes and intermediates for the preparation thereof.

In particular, the invention is based on the object of providing polymerisable compounds which produce a greater maximum pretilt after photopolymerisation, which results in the desired pretilt being achieved more quickly and thus in significantly shortened times for production of the LC display.

This object has been achieved in accordance with the invention by the provision of materials, processes and LC displays as described in the present application. In particular, it has been found, surprisingly, that some or all of the objects described above can be achieved by providing PSA displays which contain one or more polymerised compounds according to the invention or by using LC media which comprise one or more polymerisable compounds according to the invention for the production of PSA displays of this type. The polymerisable compounds according to the invention contain one mesogenic group and one or more polymerisable groups, where at least one of these polymerisable groups is connected to the mesogenic group via a spacer group and where at least one of these spacer groups contains a C—C triple bond.

The use of polymerisable compounds of this type in LC media and PSA displays according to the invention results in the desired pretilt being achieved particularly quickly and in significantly shortened times for production of the display. This has been demonstrated in connection with an LC medium by means of exposure time-dependent pretilt measurements in VA tilt measurement cells. In particular, it was possible to achieve a pretilt without the addition of photoinitiator.

Since the polymerisable compounds according to the invention exhibit a significantly higher polymerisation rate in the PSA displays, fewer unreacted residual amounts also remain in the LC cell, causing an improvement in the electro-optical properties thereof, and the controlled reaction of these residual amounts becomes simpler.

Polymerisable compounds containing a spacer group containing a C—C triple bond have been described for other purposes in the prior art. Thus, U.S. Pat. No. 6,369,262 discloses mesogenic diacrylate monomers containing a C—C triple bond in the spacer group for the preparation of highly crosslinked anisotropic polymers having high glass transition temperatures for stereo-lithographic applications, in particular at high temperatures. However, the use of such monomers in PSA displays for the rapid establishment of a tilt angle by in-situ polymerisation in an electric field is neither described nor proposed.

The invention thus relates to the use of polymerisable compounds containing one mesogenic group and one or more polymerisable groups, where at least one of these polymerisable groups is connected to the mesogenic group via a spacer group and where at least one of these spacer groups contains a C—C triple bond (also referred to as "polymerisable compounds according to the invention" below), in liquid-crystal (LC) media and LC displays of the PS or PSA (polymer sustained alignment) type.

The invention furthermore relates to an LC medium comprising one or more polymerisable compounds according to the invention and one or more additional compounds, which may also be mesogenic, liquid-crystalline and/or polymerisable.

The invention furthermore relates to an LC medium comprising a polymer obtainable by polymerisation of one or more polymerisable compounds according to the invention and one or more additional compounds, which may also be mesogenic, liquid-crystalline and/or polymerisable.

The invention furthermore relates to an LC medium comprising
  a polymerisable component A) comprising one or more polymerisable compounds according to the invention, and
  a liquid-crystalline component B), also referred to below as "LC host mixture", comprising one or more, preferably two or more, low-molecular-weight (monomeric and unpolymerisable) compounds as described above and below.

The invention furthermore relates to a process for the preparation of an LC medium as described above and below in which one or more low-molecular-weight liquid-crystalline compounds, or an LC host mixture as described above and below, are mixed with one or more polymerisable compounds according to the invention and optionally with further liquid-crystalline compounds and/or additives.

The invention furthermore relates to the use of polymerisable compounds according to the invention and LC media according to the invention in PS and PSA displays, in particular the use in PS and PSA displays containing an LC medium, for the production of a tilt angle in the LC medium by in-situ polymerisation of the compound(s) of the formula I in the PSA display, preferably with application of an electric or magnetic field.

The invention furthermore relates to an LC display containing one or more polymerisable compounds according to the invention or an LC medium according to the invention, in particular a PS or PSA display, particularly preferably a PSA-VA, PSA-OCB, PSA-IPS, PS-FFS, PSA-posi-VA or PSA-TN display.

The invention furthermore relates to an LC display of the PS or PSA type containing an LC cell having two substrates and two electrodes, where at least one substrate is transparent to light and at least one substrate has one or two electrodes, and a layer, located between the substrates, of an LC medium comprising a polymerised component and a low-molecular-weight component, where the polymerised component is obtainable by polymerisation of one or more polymerisable compounds between the substrates of the LC cell in the LC medium, preferably with application of an electrical voltage to the electrodes, where at least one of the polymerisable compounds is selected from polymerisable compounds according to the invention.

The invention furthermore relates to a process for the production of an LC display as described above and below in which an LC medium comprising one or more low-molecular-weight liquid-crystalline compounds or an LC host mixture as described above and below and one or more polymerisable compounds according to the invention is introduced into an LC cell having two substrates and two electrodes as described above and below, and the polymerisable compounds are polymerised, preferably with application of an electrical voltage to the electrodes.

The PS and PSA displays according to the invention have two electrodes, preferably in the form of transparent layers, which are applied to one or both of the substrates which form the LC cell. Either in each case one electrode is applied to each of the two substrates, as, for example, in PSA-VA, PSA-OCB or PSA-TN displays according to the invention, or both electrodes are applied to only one of the two substrates, while the other substrate has no electrode, as, for example, in PSA-posi-VA, PSA-IPS or PSA-FFS displays according to the invention.

The invention furthermore relates to novel polymerisable compounds according to the invention, to processes for the preparation thereof, and to novel intermediates used or obtained in these processes.

The following meanings apply above and below:

The terms "tilt" and "tilt angle" relate to a tilted alignment of the LC molecules of an LC medium relative to the surfaces of the cell in an LC display (here preferably a PS or PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

The term "reactive mesogen" or "RM" denotes a compound containing one mesogenic group and one or more functional groups which are suitable for polymerisation (also referred to as polymerisable group or group P).

The terms "low-molecular-weight compound" and "unpolymerisable compound" denote compounds, usually monomeric, which contain no functional group which is suitable for polymerisation under the usual conditions known to the person skilled in the art, in particular under the conditions used for the polymerisation of RMs.

The term "organic group" denotes a carbon or hydrocarbon group.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

"Conjugated radical" or "conjugated group" denotes a radical or group which contains principally $sp^2$-hybridised (or possibly also sp-hybridised) carbon atoms, which may also be replaced by corresponding hetero-atoms. In the simplest case, this means the alternating presence of double and single bonds. "Principally" in this connection means that naturally (non-randomly) occurring defects which result in conjugation interruptions do not devalue the term "conjugated". Furthermore, the term "conjugated" is likewise used in this application text if, for example, arylamine units or certain heterocycles (i.e. conjugation via N, O, P or S atoms) are located in the radical or group.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ alkyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ alkyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]-thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" above and below, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, in which $R^x$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the meaning indicated above.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

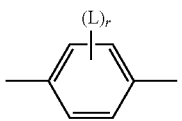

is preferably

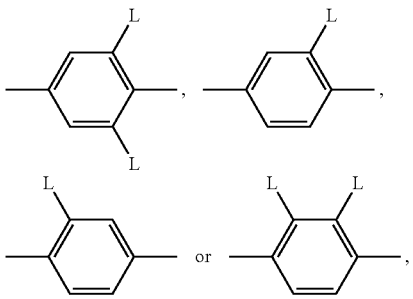

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2=CW^1-CO-O-$, $CH_2=CW^1-CO-$,

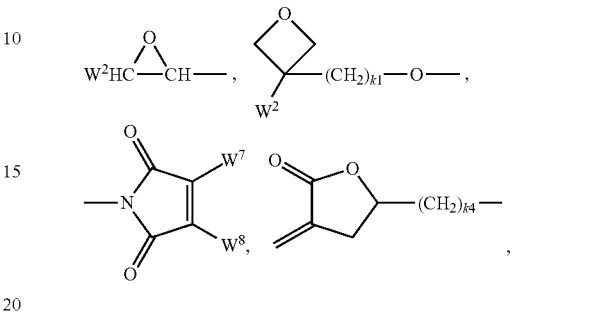

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}\text{-Phe-}(O)_{k2}-$, $CH_2=CH-(CO)_{k1}\text{-Phe-}(O)_{k2}-$, Phe-CH=CH—, HOOC—, OCN— and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups P are selected from the group consisting of $CH_2=CW^1-CO-O-$, $CH_2=CW^1-CO-$,

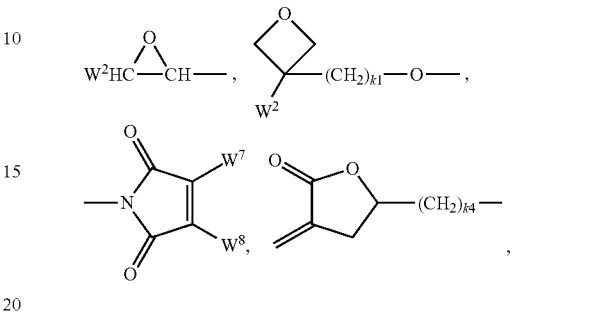

$CH_2=CW^2-O-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}\text{-Phe-}(O)_{k2}-$, $CH_2=CH-(CO)_{k1}\text{-Phe-}(O)_{k2}-$, Phe-CH=CH— and $W^4W^5W^6Si-$, in which $W^1$ denotes H, F, Cl, CN, $CF_3$, phenyl or alkyl having 1 to 5 C atoms, in particular H, F, $C_1$ or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

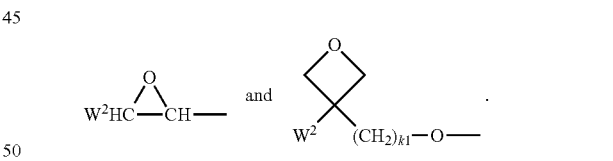

Further very particularly preferred groups P are selected from the group consisting of vinyloxy, acrylate, methacrylate, fluoroacrylate, chloroacrylate, oxetane and epoxide groups, and particularly preferably denote an acrylate or methacrylate group.

Preferred spacer groups Sp other than a single bond are selected from the formula Sp"-X", so that the radical P-Sp- conforms to the formula P-Sp"-X"—, where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N(R°)—, —Si(R°°R°°°)—, —CO—, —CO—O—, —O—CO—, —O—CO—O—, —S—CO—, —CO—S—, —N(R°°)—CO—O—, —O—CO—N(R°°)—, —N(R$^{00}$)—CO—N(R$^{00}$)—, —CH=CH— or —C≡C—
in such a way that O and/or S atoms are not linked directly
to one another, X" denotes —O—, —S—, —CO—, —CO—O—,
—O—CO—, —O—CO—O—, —CO—N(R$^{00}$)—,
—N(R$^{00}$)—CO—, —N(R$^{00}$)—CO—N(R$^{00}$)—,
—OCH$_2$—, —CH$_2$O—, —SCH$_2$—, —CH$_2$S—,
—CF$_2$O—, —OCF$_2$—, —CF$_2$S—, —SCF$_2$—,
—CF$_2$CH$_2$—, —CH$_2$CF$_2$—, —CF$_2$CF$_2$—, —CH=N—,
—N=CH—, —N=N—, —CH=CR$^0$—,
—CY$^2$=CY$^3$—, —C≡C—, —CH=CH—CO—O—,
—O—CO—CH=CH— or a single bond, R$^{00}$ and R$^{000}$ each, independently of one another, denote H or
alkyl having 1 to 12 C atoms, and Y$^2$ and Y$^3$ each, independently of one another, denote H, F, Cl
or CN.

X' is preferably —O—, —S—, —CO—, —COO—,
—OCO—, —O—COO—, —CO—NR$^0$—, —NR$^0$—CO—,
—NR$^0$—CO—NR$^0$— or a single bond.

Typical spacer groups Sp" are, for example, —(CH$_2$)$_{p1}$—,
—(CH$_2$CH$_2$O)$_{q1}$—CH$_2$CH$_2$—, —CH$_2$CH$_2$—S—
CH$_2$CH$_2$—, —CH$_2$CH$_2$—NH—CH$_2$CH$_2$— or
—(SiR$^{00}$R$^{000}$—O)$_{p1}$—, in which p1 is an integer from 1 to
12, q1 is an integer from 1 to 3, and R$^{00}$ and R$^{000}$ have the
meanings indicated above.

Particularly preferred groups -Sp"-X"— are —(CH$_2$)$_{p1}$—,
—(CH$_2$)$_{p1}$—O—, —(CH$_2$)$_{p1}$—O—CO—, —(CH$_2$)$_{p1}$—
O—CO—O—, in which p1 and q1 have the meanings indicated above.

Particularly preferred groups Sp" are, for example, in each
case straight-chain ethylene, propylene, butylene, pentylene,
hexylene, heptylene, octylene, nonylene, decylene, undecylene, dodecylene, octadecylene, ethyleneoxyethylene,
methyleneoxybutylene, ethylenethioethylene, ethylene-N-
methyliminoethylene, 1-methylalkylene, ethenylene, propenylene and butenylene.

In a further preferred embodiment of the invention, R$^a$
and/or R$^b$ in formula I denote a radical containing two or more
polymerisable groups (multifunctional polymerisable radicals). Suitable radicals of this type and polymerisable compounds containing them and the preparation thereof are
described, for example, in U.S. Pat. No. 7,060,200 B1 or US
2006/0172090 A1. Particular preference is given to multifunctional polymerisable radicals selected from the following formulae:

—X-alkyl-CHP$^1$—CH$_2$—CH$_2$P$^2$    I*a

—X-alkyl-C(CH$_2$P$^1$)(CH$_2$P$^2$)—CH$_2$P$^3$    I*b

—X-alkyl-CHP$^1$CHP$^2$—CH$_2$P$^3$    I*c

—X-alkyl-C(CH$_2$P$^1$)(CH$_2$P$^2$)—C$_{aa}$H$_{2aa+1}$    I*d

—X-alkyl-CHP$^1$—CH$_2$P$^2$    I*e

—X-alkyl-CHP$^1$P$^2$    I*f

—X-alkyl-CP$^1$P$^2$—C$_{aa}$H$_{2aa+1}$    I*g

—X-alkyl-C(CH$_2$P$^1$)(CH$_2$P$^2$)—CH$_2$OCH$_2$—C
(CH$_2$P$^3$)(CH$_2$P$^4$)CH$_2$P$^5$    I*h —X-alkyl-CH((CH$_2$)$_{aa}$P$^1$)((CH$_2$)$_{bb}$P$^2$)    I*i —X-alkyl-CHP$^1$CHP$^2$—C$_{aa}$H$_{2aa+1}$    I*k —X'-alkyl-C(CH$_3$)(CH$_2$P$^1$)(CH$_2$P$^2$)    I*m in which alkyl denotes a single bond or straight-chain or branched
alkylene having 1 to 12 C atoms, in which one or more
non-adjacent CH$_2$ groups may each be replaced, independently of one another, by —C(R$^{00}$)=C(R$^{000}$)—,
—C≡C—, —N(R$^{00}$)—, —O—, —S—, —CO—,
—CO—O—, —O—CO—, —O—CO—O— in such a
way that O and/or S atoms are not linked directly to one
another and in which, in addition, one or more H atoms
may be replaced by F, Cl or CN, where R$^{00}$ and R$^{000}$ have
the meanings indicated above, aa and bb each, independently of one another, denote 0, 1, 2,
3, 4, 5 or 6, X has one of the meanings indicated for X', and P$^{1-5}$ each, independently of one another, have one of the
meanings indicated for P.

Particularly preferred polymerisable compounds according to the invention are those of the formula I:

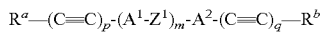    I in which the individual radicals have the following meanings:

R$^a$, R$^b$ each, independently of one another, denote P-Sp-, H, F,
Cl, Br, I, —ON, —NO$_2$, —NCO, —NOS, —OCN,
—SCN, SF$_5$, straight-chain or branched alkyl having 1 to
25 C atoms, in which, in addition, one or more non-adjacent CH$_2$ groups may each be replaced, independently of
one another, by arylene, —C(R$^0$)=C(R$^{00}$)—, —C≡C—,
—N(R$^0$)—, —O—, —S—, —CO—, —CO—O—,
—O—CO—, —O—CO—O— in such a way that O and/or
S atoms are not linked directly to one another and in which,
in addition, one or more H atoms may be replaced by F, Cl,
Br, I, CN or P-Sp-, or aryl or heteroaryl, preferably having
2 to 25 C atoms, which may also contain two or more fused
rings and which is optionally mono- or polysubstituted by
L,
where at least one of the radicals R$^a$ and R$^b$ denotes or
contains a group P-Sp-, P on each occurrence, identically or differently, denotes a
polymerisable group, Sp on each occurrence, identically or differently, denotes a
spacer group or a single bond, A$^1$, A$^2$ each, independently of one another, denote an aromatic, heteroaromatic, alicyclic or heterocyclic group,
preferably having 4 to 25 C atoms, which may also contain
fused rings and which is optionally mono- or polysubstituted by L, L on each occurrence, identically or differently, denotes
P-Sp-, H, OH, CH$_2$OH, halogen, SF$_5$, NO$_2$, a carbon group
or hydrocarbon group, Z$^1$ in each case, independently of one another, denotes
—O—, —S—, —CO—, —CO—O—, —OCO—,
—O—CO—O—, —OCH$_2$—, —CH$_2$O—, —SCH$_2$—,
—CH$_2$S—, —CF$_2$O—, —OCF$_2$—, —CF$_2$S—,
—SCF$_2$—, —(CH$_2$)$_n$—, —CF$_2$CH$_2$—, —CH$_2$CF$_2$—,
—(CF$_2$)$_n$—, —CH=CH—, —CF=CF—, —CH=CF—,
—CF=CH—, —C≡C—, —CH=CH—COO—,
—OCO—CH=CH—, —CH$_2$—CH$_2$—COO—,
—OCO—CH$_2$—CH$_2$—, —C(R$^0$R$^{00}$)—, —C(R$^y$R$^z$)— or
a single bond, R$^0$, R$^{00}$ each, independently of one another and identically or
differently on each occurrence, denote H or alkyl having 1
to 12 C atoms, R$^y$, R$^z$ each, independently of one another, denote H, F, CH$_3$
or CF$_3$, m denotes 0, 1, 2, 3 or 4, n on each occurrence, identically or differently, denotes 1, 2,
3 or 4, p, q each, independently of one another, denote 0 or 1, where p+q≥1.

Particularly preferred compounds of the formula I are those in which $A^1$ and $A^2$ each, independently of one another, denote 1,4-phenylene, naphthalene-1,4-diyl or naphthalene-2,6-diyl, where, in addition, one or more CH groups in these groups may be replaced by N, cyclohexane-1,4-diyl, in which, in addition, one or more non-adjacent $CH_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, phenanthrene-2,7-diyl, anthracene-2,7-diyl, phenanthrene-2,7-diyl, 9,10-dihydrophenanthrene-2,7-diyl, 6H-benzo[c]chromene-3,8-diyl, 9H-fluorene-2,7-diyl, 9,9-dimethyl-9H-fluorene-2,7-diyl, dibenzofuran-3,7-diyl, 2-oxo-2H-chromen-7-yl, 4-phenyl-2-oxo-2H-chromen-7-yl, 4-oxo-4H-chromen-6-yl, 4-phenyl-4-oxo-4H-chromen-6-yl, where all these groups may be unsubstituted or mono- or polysubstituted by L and where of all these groups cyclohexane and aromatic groups are very particularly preferred, L denotes P, P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, straight-chain or branched alkyl or alkoxy having 1 to 25, preferably 1 to 12, C atoms, or straight-chain or branched alkenyl, alkynyl, alkylcarbonyl, alkoxycarbonyl, alkylcarbonyloxy or alkoxycarbonyloxy having 2 to 25, preferably 2 to 12, C atoms, in which, in addition, one or more H atoms in all these groups may be replaced by F, Cl, P or P-Sp-, $Y^1$ denotes halogen, and $R^x$ denotes P, P-Sp-, H, halogen, straight-chain, branched or cyclic alkyl having 1 to 25, preferably 1 to 12, C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another and in which, in addition, one or more H atoms may be replaced by F, Cl or P-Sp-.

In the compounds of the formula I and sub-formulae thereof, the mesogenic groups -($A^1$-$Z^1$)$_m$-$A^2$- and —(C≡C)$_p$-($A^1$-$Z^1$)$_m$-$A^2$-(C≡C)$_q$— preferably denote a conjugated radical. It has been found that polymerisable compounds according to the invention containing conjugated mesogenic radicals have particularly high absorption in the wavelength range of the UV radiation usually used for the polymerisation and facilitate rapid and complete polymerisation, in particular also without the use of photoinitiators. They are therefore particularly suitable for use in PSA displays.

Further preferred compounds of the formula I and sub-formulae thereof indicated above and below are those in which one of the radicals $R^a$ and $R^b$ denotes P-Sp- and the other is other than P-Sp-, $R^a$ and $R^b$ denote identical or different radicals P-Sp-, $R^a$ and $R^b$ denote P-Sp-, where Sp in one of the radicals $R^a$ and $R^b$ denotes a single bond and Sp in the other of the radicals $R^a$ and $R^b$ is other than a single bond and preferably denotes a group of the formula Sp"-X"—, so that this radical P-Sp- conforms to the formula P-Sp"-X"—, $R^a$ and $R^b$ denote identical or different radicals P-Sp- in which both radicals Sp denote a single bond, one of the radicals $R^a$ and $R^b$ denotes or contains a group P-Sp- and the other denotes an unpolymerisable group, preferably selected from straight-chain or branched alkyl having 1 to 25 C atoms, in which, in addition, one or more non-adjacent $CH_2$ groups may each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl, Br, I or CN, $R^a$ and $R^b$ are other than H, one of the radicals $R^a$ and $R^b$ denotes P-Sp- and the other is other than H, the radical $R^a$ or $R^b$ which is other than P-Sp- denotes alkyl having 1 to 12, preferably 5 to 12, C atoms, alkoxy having 1 to 12 C atoms or alkenyl having 2 to 11 C atoms, where, in addition, one or more H atoms in all these radicals may be replaced by F, $R^a$ or $R^b$ denotes straight-chain or branched alkyl having 1 to 25, preferably 1 to 12, C atoms, in which, in addition, one or more non-adjacent $CH_2$ groups may each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl, Br, I or CN, Sp denotes a single bond, Sp denotes —($CH_2$)$_{p1}$—, —($CH_2$)$_{p1}$—O—, —($CH_2$)$_{p1}$—O—CO—, —($CH_2$)$_{p1}$—O—CO—O—, preferably —($CH_2$)$_{p1}$— or —($CH_2$)$_{p1}$—O—, in which p1 denotes an integer from 1 to 12, preferably 1 to 5, particularly preferably 1 to 3, Sp or Sp" is a radical having 1 to 5, preferably 1 to 3, C atoms, $A^1$ and $A^2$ are selected from the group consisting of phenylene-1,4-diyl, naphthalene-2,6-diyl, phenanthrene-2,7-diyl, anthracene-2,7-diyl, 9,10-dihydrophenanthrene-2,7-diyl, 6H-benzo[c]chromene-3,8-diyl, which is optionally mono- or disubstituted in the 6-position by $R^a$, 9H-fluorene-2,7-diyl, which is optionally mono- or disubstituted in the 9-position by $R^a$, dibenzofuran-3,7-diyl, which is optionally mono- or disubstituted in the 6-position by $R^a$, where, in addition, one or two CH groups in all the rings or ring systems described above may be replaced by N and where the individual rings may be mono- or poly-substituted by L as described above and below, where $R^a$ preferably has one of the preferred meanings indicated above and below, L does not denote or contain a polymerisable group, L is an unpolymerisable group, preferably selected from F, Cl, —CN and straight-chain or branched alkyl having 1 to 25, particularly preferably 1 to 10, C atoms, in which, in addition, one or more non-adjacent $CH_2$ groups may each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl, Br, I or CN, L denotes F, Cl, Br, I, —CN, —$NO_2$, —NCO, —NOS, —OCN or —SCN, preferably F, L denotes straight-chain or branched alkyl or alkoxy having 1 to 12 C atoms, or straight-chain or branched alkenyl, alkynyl, alkylcarbonyl, alkoxycarbonyl, alkylcarbonyloxy or alkoxycarbonyloxy having 2 to 12 C atoms, in which, in addition, one or more H atoms in all these groups may be replaced by F, Cl, P or P-Sp-, L denotes P or P-Sp-, $Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —CO—, single bond, $Z^1$ denotes a single bond, m denotes 0, 1 or 2, preferably 0 or 1, p and q denote 1, one of p and q denotes 0 and the other denotes 1.

Particularly preferred compounds of the formula I are selected from the group consisting of the following sub-formulae:

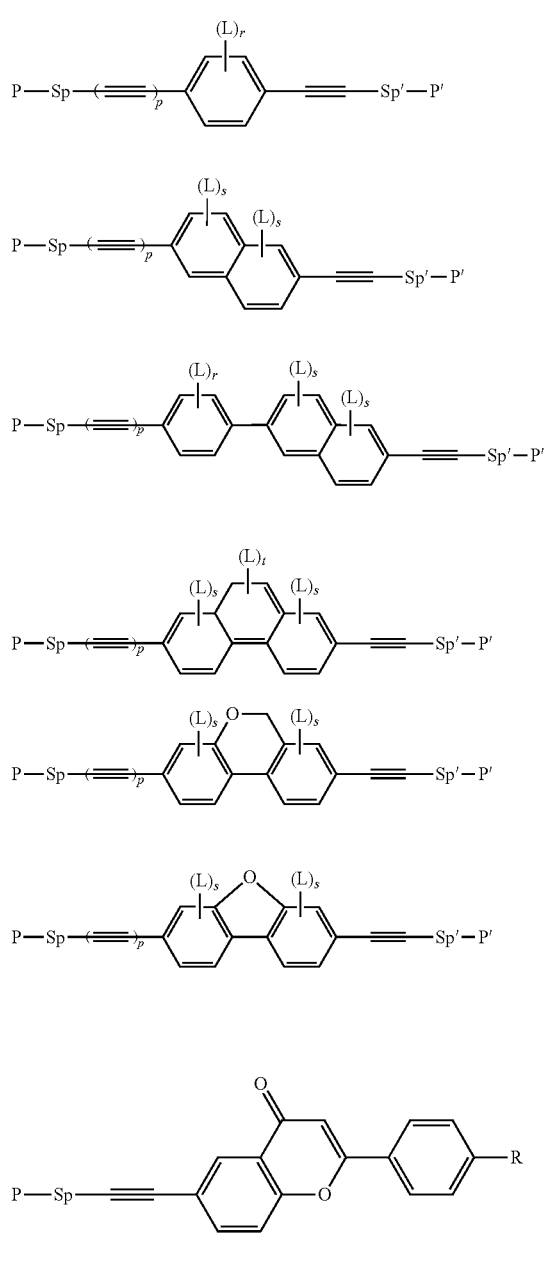

in which P, Sp and L have one of the meanings indicated above and below, the radicals R each, independently of one another, have one of the meanings indicated above and below for $R^a$, P' has one of the meanings indicated above and below for P and Sp' has one of the meanings indicated above and below for Sp, r denotes 0, 1, 2, 3 or 4, s denotes 0, 1, 2 or 3, and t denotes 0, 1 or 2.

Particular preference is given to compounds of the formulae I1 to I11 in which one of the radicals Sp and Sp' denotes a single bond and the other is other than a single bond.

Very particularly preferred compounds of the formula I are selected from the group consisting of the following sub-formulae:

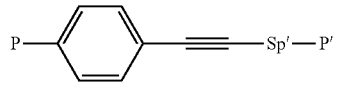

I1a

I2a

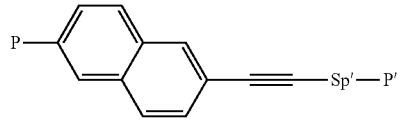

I3a

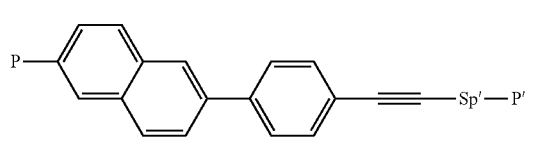

I4a

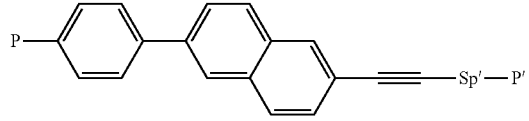

I5a

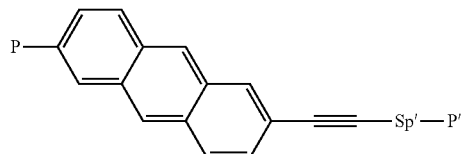

I6a

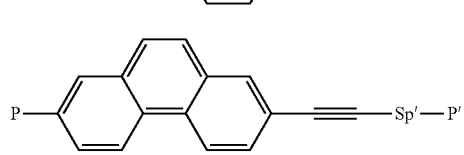

I7a

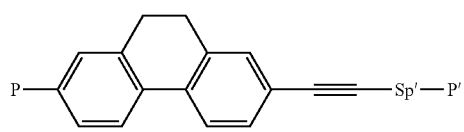

I8a

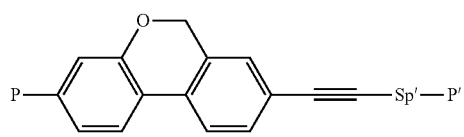

I9a

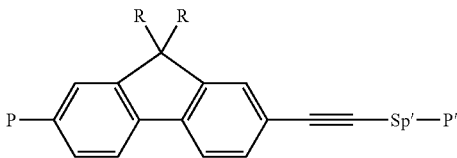

I10a

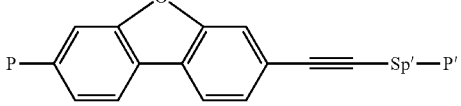

I11a

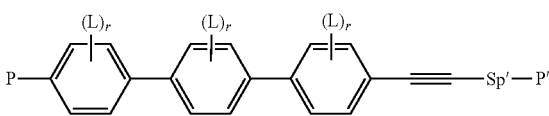

I15a in which P, P', Sp, R, L and r have the meanings indicated above.

P and P' in the compounds of the formula I and sub-formulae thereof preferably denote an acrylate, fluoroacrylate or methacrylate group.

Sp and Sp' in the compounds of the formula I and sub-formulae thereof preferably denote —$(CH_2)_{p1}$—, —O—$(CH_2)_{p1}$—, —$(CH_2)_{p1}$—O—, —O—CO—$(CH_2)_{p1}$—, —$(CH_2)_{p1}$—O—CO—, —O—CO—O—$(CH_2)_{p1}$—, —$(CH_2)_{p1}$—O—CO—O— or a single bond, in which p1 denotes an integer from 1 to 12, preferably 1 to 6, very particularly preferably 1, 2 or 3, where these groups are linked to P or P' in such a way that O atoms are not linked directly to one another.

The invention furthermore relates to novel compounds of the formula I and sub-formulae thereof in which the individual radicals have the meanings or preferred meanings indicated above and below, with the proviso that, in the case where p=q=1 and $R^a=R^b$=P-Sp-, in particular if P is an acrylate, glycidyl or epoxide group and Sp denotes alkoxy or oxaalkyl having 1 to 20 C atoms or a single bond, -$(A^1-Z^1)_m$-$A^2$- denotes a radical other than the following groups:

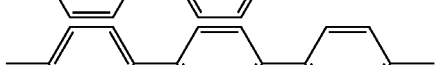

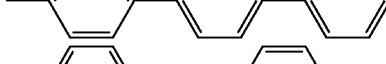

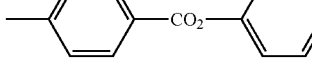

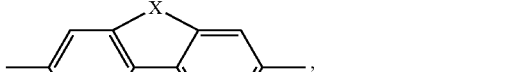

in which X denotes $CH_2$, NH, O, S or $SO_2$.

Particular preference is given to novel compounds of the formula I and sub-formulae thereof in which $Z^1$ denotes a single bond, in particular those in which m is 0 or 1, and those in which, preferably in the case where p=q=1, the radical -(A$^1$-Z$^1$)$_m$-A$^2$- is other than biphenyl, terphenyl, fluorene (preferably including substituted fluorene) and dibenzofuran.

The invention furthermore relates to novel intermediates for the preparation of compounds of the formula I, selected from formula II

in which A$^{1,2}$, Z$^1$, Sp, Sp', p, q and m have the meanings indicated in formula I or above and below, and G and G' each, independently of one another, denote an H atom or a protecting group.

Suitable protecting groups G are known to the person skilled in the art. Preferred protecting groups are alkyl, acyl and alkylsilyl or arylsilyl groups, 2-tetrahydropyranyl or methoxymethyl.

Particularly preferred intermediates of the formula II are selected from the group consisting of the sub-formulae I1-I15 and I1a-I15a mentioned above in which P in each case denotes G-O and P' in each case denotes O-G', where G and G' preferably denote H.

In these preferred intermediates, it is preferred for one of the radicals Sp and Sp', preferably Sp, to denote a single bond and for the other, preferably Sp', to denote a group other than a single bond.

Of these preferred compounds, particular preference is given to those in which one of the radicals Sp and Sp', preferably Sp, denotes a single bond and the other, preferably Sp', denotes —(CH$_2$)$_{p1}$—, where p1 is as defined above.

In a further preferred embodiment of the invention, the polymerisable compounds according to the invention do not contain a group of the formula III, or A$^1$ and A$^2$ in formulae I and II denote a group other than the formula III:

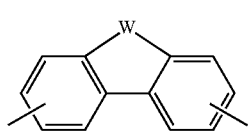

in which W denotes —C(R$^c$R$^d$)—, —CH$_2$CH$_2$—, —CH$_2$—O—, —O—, —CO—, —CO—O—, —S— or —N(R$^c$)—, and R$^c$ and R$^d$ each, independently of one another, have one of the meanings other than P-Sp- indicated for R$^a$ in formula I or denote P-Sp-.

Particularly suitable and preferred processes for the preparation of compounds and intermediates of the formulae I and II and sub-formulae thereof are depicted by way of example in the following schemes and preferably comprise one or more of the steps described below.

The compounds and intermediates of the formulae I and II and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, compounds of the formula I are synthesised by esterification or etherification of the intermediates of the formula II using corresponding acids, acid derivatives, or halogenated compounds containing a group P. As depicted by way of example in Scheme 1 (in which R denotes H or CH$_3$), compounds of the formula I in which R$^a$ and R$^b$ denote P-Sp- and the radicals P denote an acrylate or methacrylate group can be obtained by esterification of the corresponding alcohols of the formula II in which G=G'=H using acid derivatives, such as, for example, (meth)acryloyl chloride or (meth)acrylic anhydride, in the presence of a base and optionally 4-(N,N-dimethylamino)pyridine (DMAP). Furthermore, the alcohols can also be esterified using (meth)acrylic acid in the presence of a dehydrating agent, for example by the Steglich method using dicyclohexylcarbodiimide (DCC).

Scheme 1

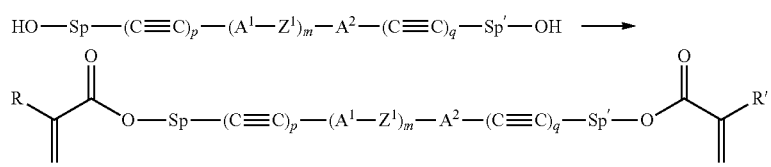

The alkyne groups can be introduced, for example, by a Sonogashira reaction, as described, for example, in E. Negishi, L. Anastasia, *Chem. Rev.* 2003, 103, 1979 (Scheme 2). The compounds II can be obtained by reacting suitable aryl halides with terminal alkynols, as shown in Scheme 2 (X=halogen, triflate). The corresponding situation applies for the symmetrically substituted case (Scheme 3).

Scheme 2

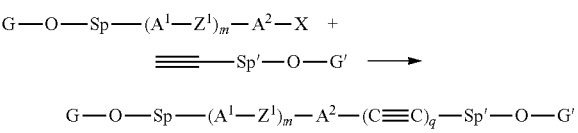

Scheme 3

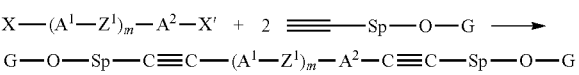

Dialkynes containing different spacer groups can be obtained in a similar manner by using dihalogenated building blocks with different halogen substituents of different reactivity, for example X=bromine and X'=iodine (Scheme 3), which enables the stepwise introduction of two different alkynes. Alternatively, the reaction can start from monohalogenated hydroxyl compounds, which, after conversion into alkynes, can subsequently be modified to give triflates, which can themselves be reacted in a Sonogashira reaction (Scheme 4).

Scheme 4

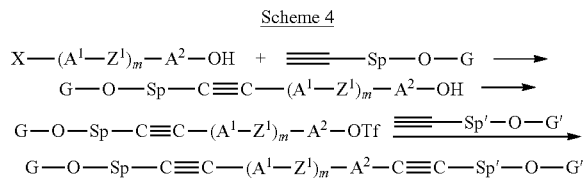

For the production of PSA displays, the polymerisable compounds are polymerised or crosslinked (if one compound contains two or more polymerisable groups) by in-situ polymerisation in the LC medium between the substrates of the LC display with application of a voltage. The polymerisation can be carried out in one step. It is also possible firstly to carry out the polymerisation with application of a voltage in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus comprises no polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component A), is preferably 10-10,000 ppm, particularly preferably 50-500 ppm.

The LC media according to the invention for use in PSA displays preferably comprise <5% by weight, particularly preferably <1% by weight, very particularly preferably <0.5% by weight, of polymerisable compounds, in particular polymerisable compounds of the formulae given above.

Particular preference is given to LC media comprising one, two or three polymerisable compounds according to the invention.

Preference is furthermore given to LC media in which the polymerisable component (component A) comprises exclusively polymerisable compounds according to the invention.

Preference is furthermore given to LC media in which component B) is an LC compound or an LC mixture which has a nematic liquid-crystal phase.

Preference is furthermore given to achiral polymerisable compounds according to the invention and LC media in which the compounds of component A) and/or B) are selected exclusively from the group consisting of achiral compounds.

Preference is furthermore given to LC media in which the polymerisable component or component A) comprises one or more polymerisable compounds according to the invention containing one polymerisable group (monoreactive) and one or more polymerisable compounds according to the invention containing two or more, preferably two, polymerisable groups (di- or multireactive).

Preference is furthermore given to PSA displays and LC media in which the polymerisable component or component A) comprises exclusively polymerisable compounds according to the invention containing two polymerisable groups (direactive).

The proportion of the polymerisable component or component A) in the LC media according to the invention is preferably <5%, particularly preferably <1%, very particularly preferably <0.5%.

The proportion of the liquid-crystalline component or component B) in the LC media according to the invention is preferably >95%, particularly preferably >99%.

The polymerisable compounds according to the invention can be polymerised individually, but it is also possible to polymerise mixtures which comprise two or more polymerisable compounds according to the invention, or mixtures comprising one or more polymerisable compounds according to the invention and one or more further polymerisable compounds (comonomers), which are preferably mesogenic or liquid-crystalline. In the case of polymerisation of such mixtures, copolymers form. The invention furthermore relates to the polymerisable mixtures mentioned above and below. The polymerisable compounds and comonomers are mesogenic or non-mesogenic, preferably mesogenic or liquid-crystalline.

Suitable and preferred mesogenic comonomers, particularly for use in PSA displays, are selected, for example, from the following formulae:

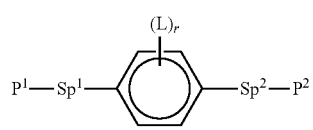

M1

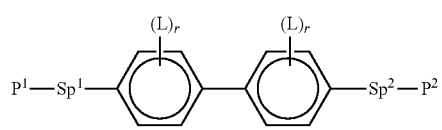

M2

-continued
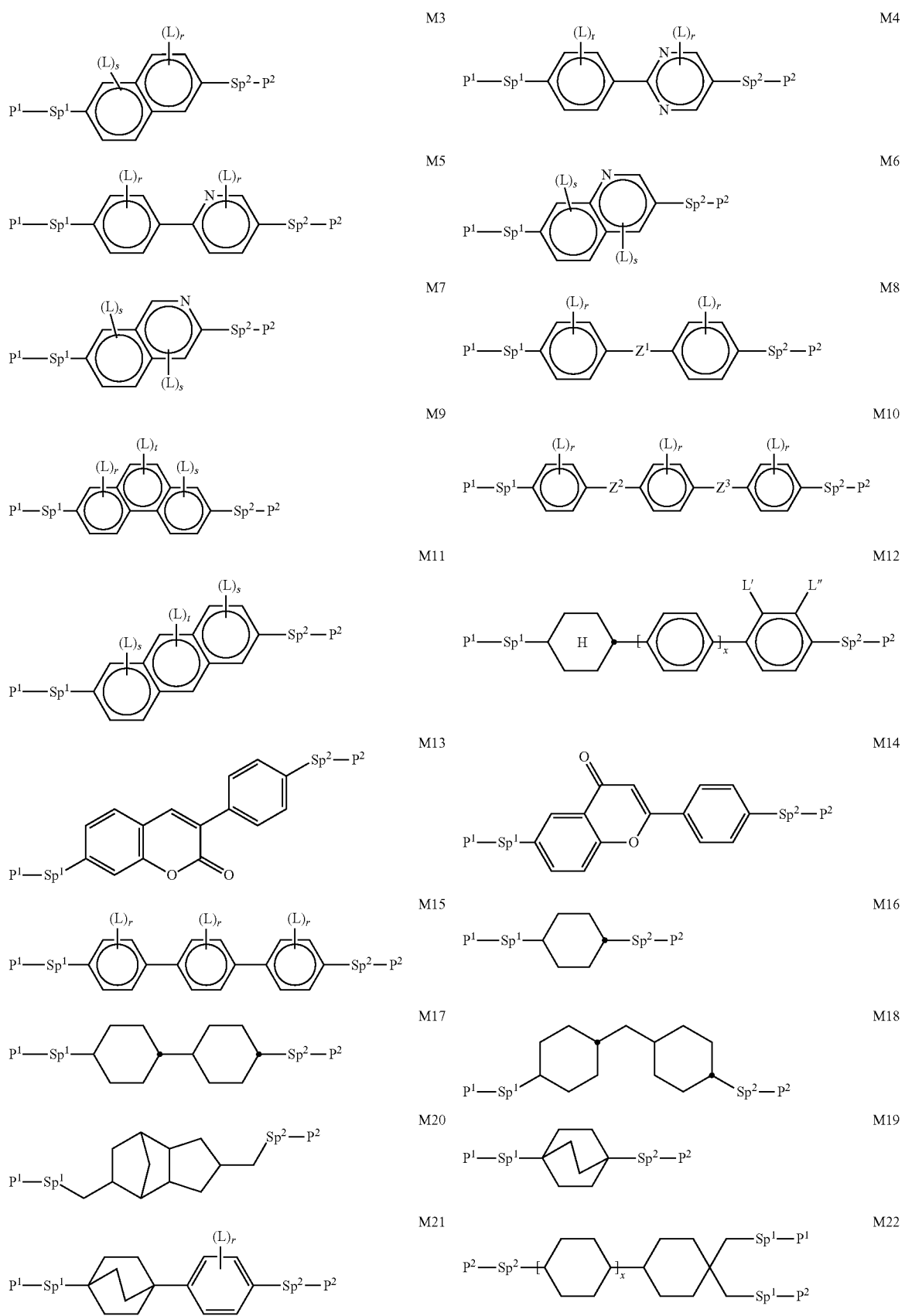

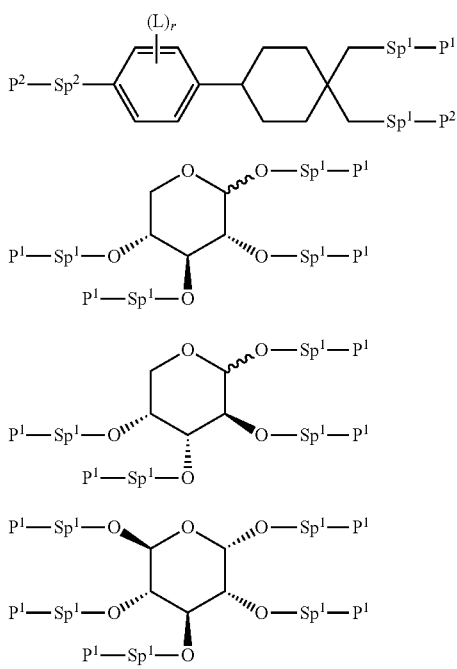

in which the individual radicals have the following meanings:
P¹ and P² each, independently of one another, denote a polymerisable group, preferably having one of the meanings indicated above and below for P, particularly preferably an acrylate, methacrylate, fluoroacrylate, oxetane, vinyloxy or epoxide group,
Sp¹ and Sp² each, independently of one another, denote a single bond or a spacer group, preferably having one of the meanings indicated above and below for Sp, and particularly preferably denote —(CH₂)$_{p1}$—, —(CH₂)$_{p1}$—O—, —(CH₂)$_{p1}$—CO—O— or —(CH₂)$_{p1}$—O—CO—O—, in which p1 is an integer from 1 to 12, and where the linking to the adjacent ring in the last-mentioned groups takes place via the O atom,
where, in addition, one or more of the radicals P¹-Sp¹- and P²-Sp²- may denote R$^{aa}$, with the proviso that at least one of the radicals P¹-Sp¹- and P²-Sp²- present does not denote R$^{aa}$,
R$^{aa}$ denotes H, F, Cl, CN or straight-chain or branched alkyl having 1 to 25 C atoms, in which, in addition, one or more non-adjacent CH₂ groups may each be replaced, independently of one another, by C(R⁰)=C(R⁰⁰)—, —C≡C—, —N(R⁰)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹-Sp¹-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms),
R⁰, R⁰⁰ each, independently of one another and identically or differently on each occurrence, denote H or alkyl having 1 to 12 C atoms,
R$^y$ and R$^z$ each, independently of one another, denote H, F, CH₃ or CF₃,
Z¹ denotes —O—, —CO—, —C(R$^y$R$^z$)— or —CF₂CF₂—,
Z² and Z³ each, independently of one another, denote —CO—O—, —O—CO—, —CH₂O—, —OCH₂—, —CF₂O—, —OCF₂— or —(CH₂)$_n$—, where n is 2, 3 or 4,
L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F,
L' and L" each, independently of one another, denote H, F or Cl,
r denotes 0, 1, 2, 3 or 4,
denotes 0, 1, 2 or 3,
t denotes 0, 1 or 2,
x denotes 0 or 1.

In the compounds of formulae M1 to M29

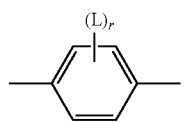

is preferably

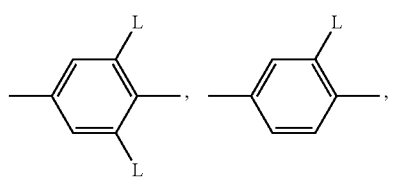

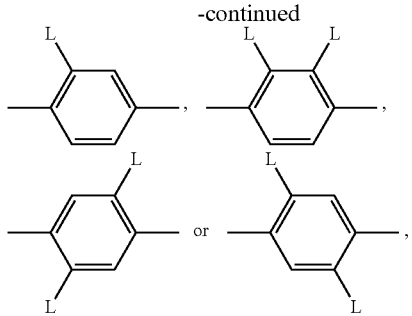

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, more preferably F, Cl, CH$_3$, OCH$_3$, COCH$_3$ oder OCF$_3$, especially F or CH$_3$.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for polymerisation of the polymerisable compounds. In principle, any LC mixture which is suitable for use in conventional VA and OCB displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

In a first preferred embodiment the LC medium contains an LC host mixture based on compounds with negative dielectric anisotropy. Such LC media are especially suitable for use in PSA-VA displays. Particularly preferred embodiments of such an LC medium are mentioned in the following sections a)-x):

a) LC medium which comprises one or more compounds of the formulae CY and/or PY:

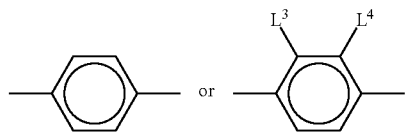
CY

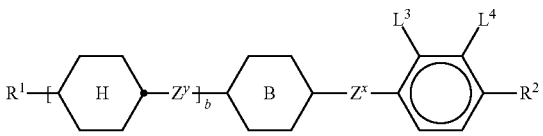
PY in which the individual radicals have the following meanings:
a denotes 1 or 2,
b denotes 0 or 1,

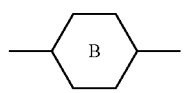

denotes

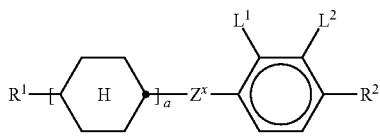

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^{1-4}$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl, or both radicals L$^3$ and L$^4$ denote F or one of the radicals L$^3$ and L$^4$ denotes F and the other denotes Cl.

The compounds of the formula CY are preferably selected from the group consisting of the following sub-formulae:

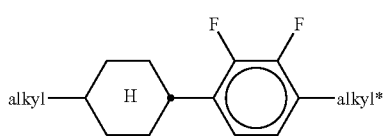
CY1

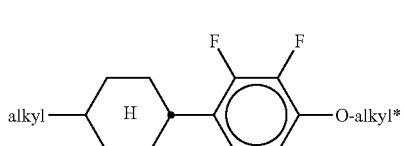
CY2

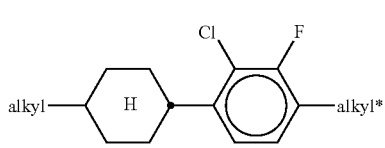
CY3

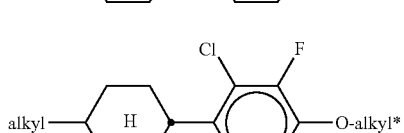
CY4

-continued
CY5
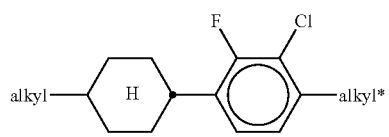
CY6
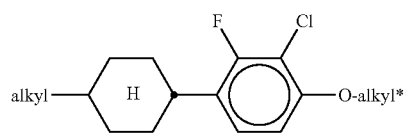
CY7
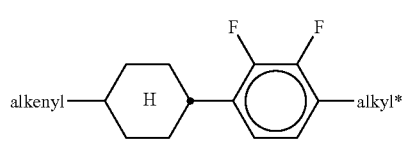
CY8
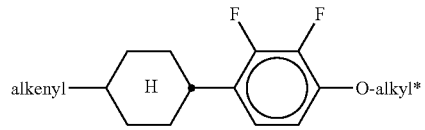
CY9
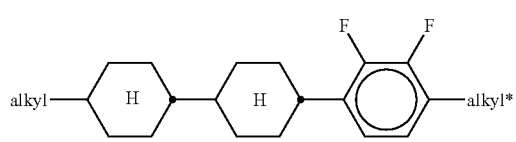
CY10
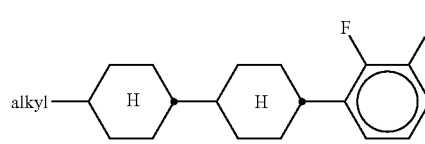
CY11
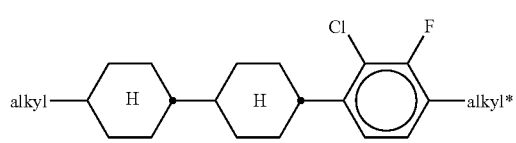
CY12
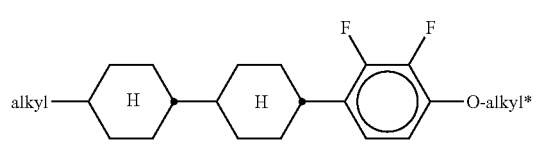
CY13
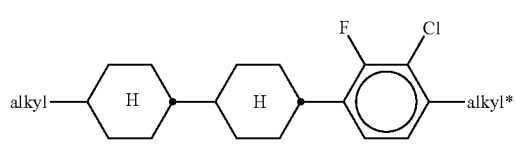
CY14
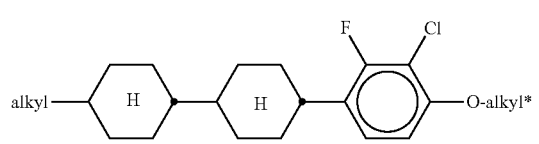
CY15
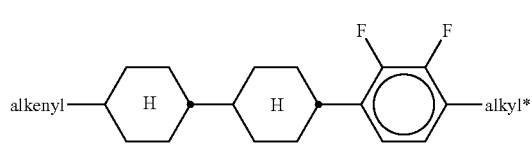
CY16
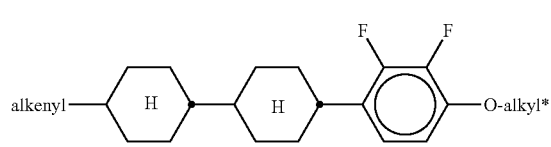
CY17
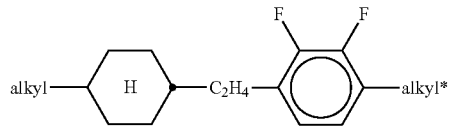
CY18
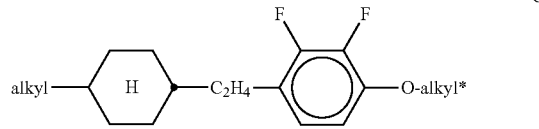
CY19
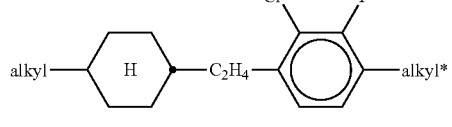
CY20
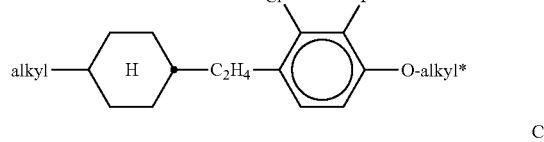
CY21
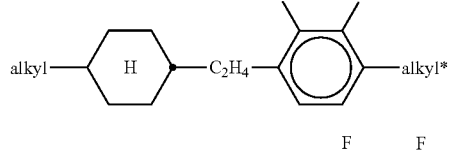
CY22
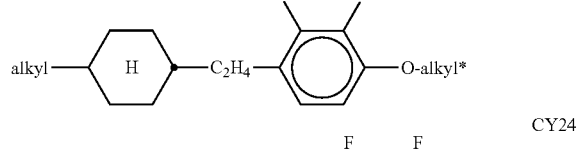
CY23
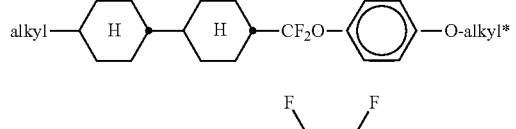
CY24
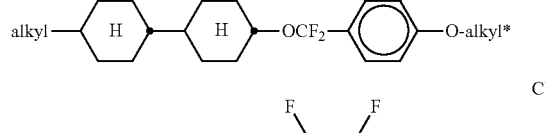
CY25
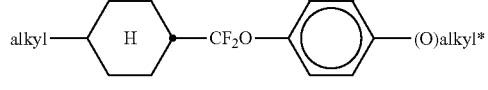
CY25
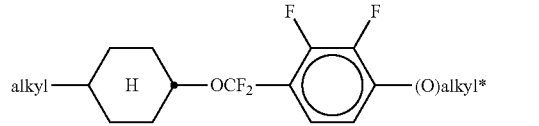

-continued

CY26
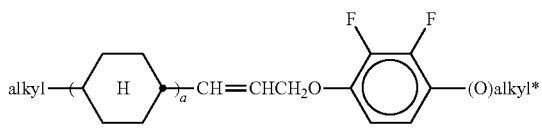

CY27
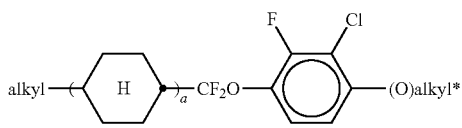

CY28
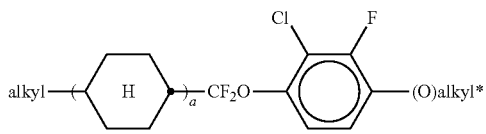

CY29
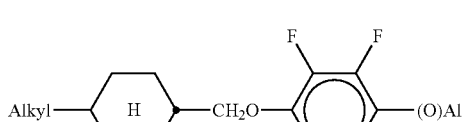

CY30
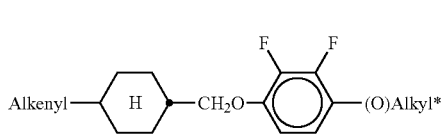

CY31
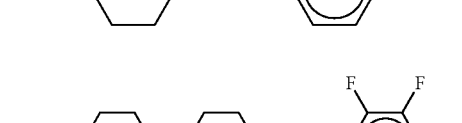

CY32
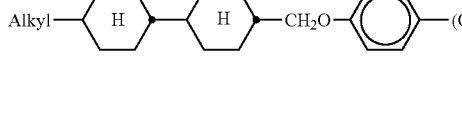

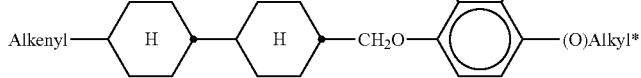

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

PY1
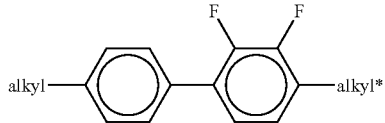

PY2
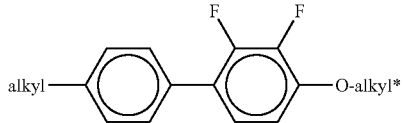

PY3
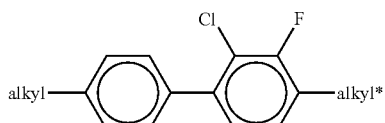

PY4
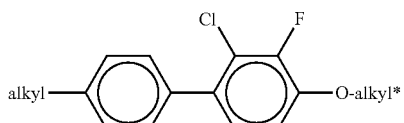

PY5
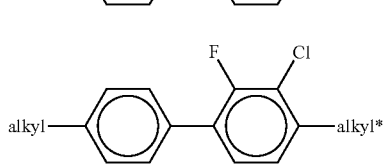

PY6
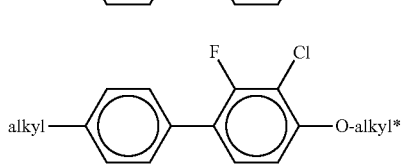

PY7
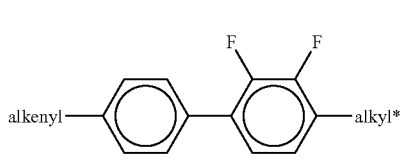

PY8
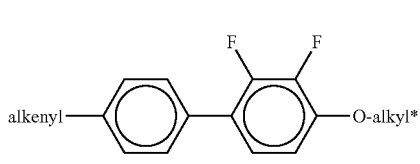

PY9
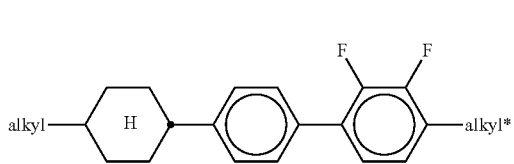

PY10
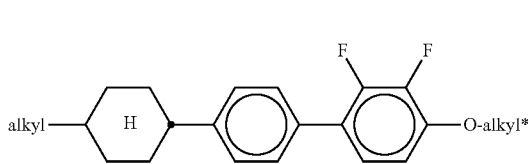

-continued

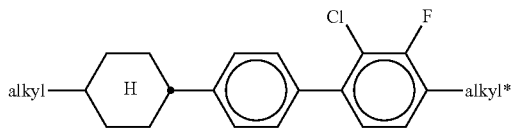
PY11 / PY12

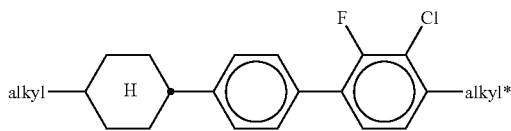
PY13 / PY14

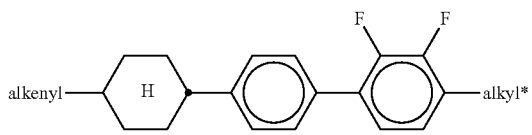
PY15 / PY16

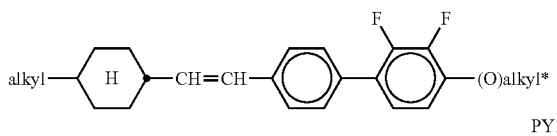
PY17 / PY18

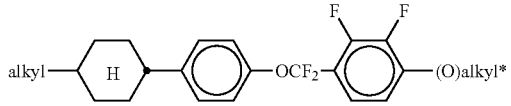
PY19 / PY20

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

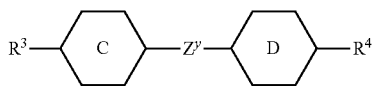

ZK in which the individual radicals have the following meanings:

denotes

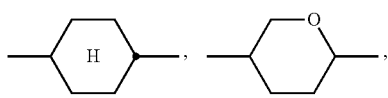

denotes

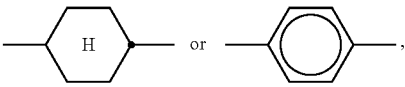

$R^3$ and $R^4$ each, independently of one another, denote alkyl having 1 to 12 C atoms, in which, in addition, one or two non-adjacent $CH_2$ groups may be replaced by $-O-$, $-CH=CH-$, $-CO-$, $-O-CO-$ or $-CO-O-$ in such a way that O atoms are not linked directly to one another, $Z^y$ denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-$ $CH_2O-$ or a single bond, preferably a single bond.

The compounds of the formula ZK are preferably selected from the group consisting of the following sub-formulae:

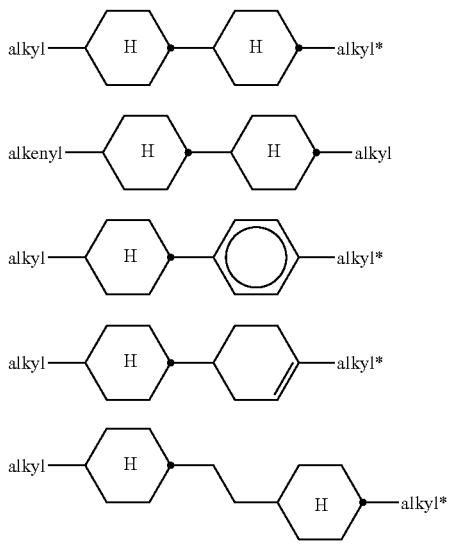
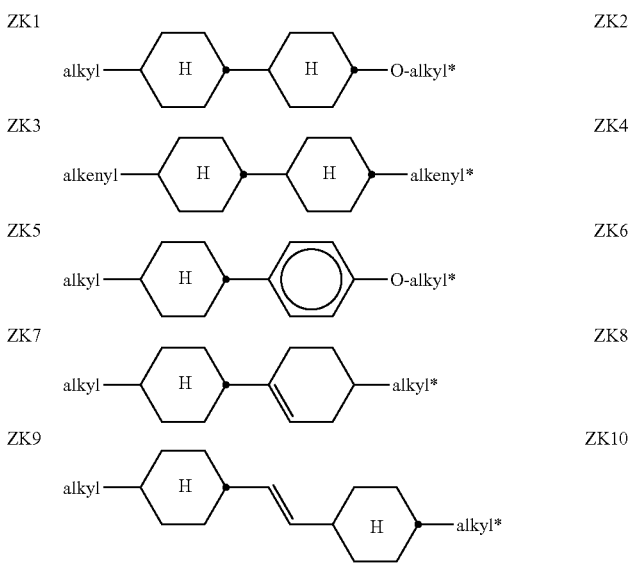

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

c) LC medium which additionally comprises one or more compounds of the following formula:

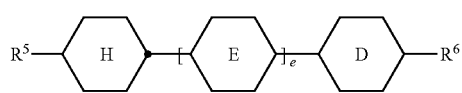
DK in which the individual radicals on each occurrence, identically or differently, have the following meanings:

$R^5$ and $R^6$ each, independently of one another, have one of the meanings indicated above for $R^1$,

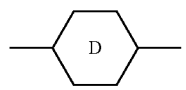 denotes

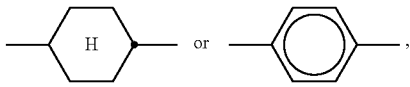

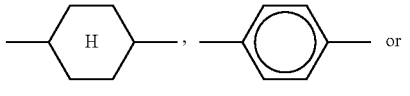

denotes

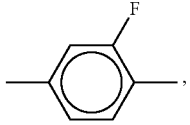

and e denotes 1 or 2.

The compounds of the formula DK are preferably selected from the group consisting of the following sub-formulae:

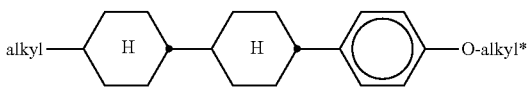

-continued

DK5
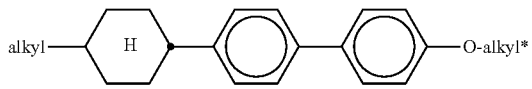

DK6
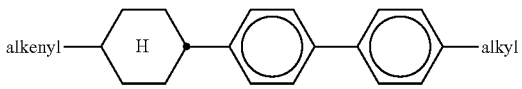

DK7
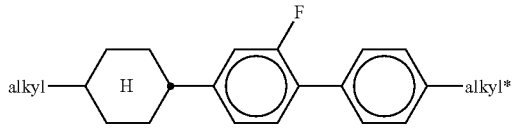

DK8
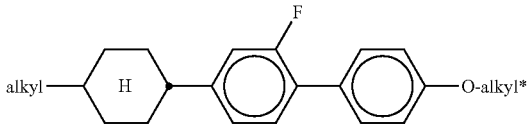

DK9
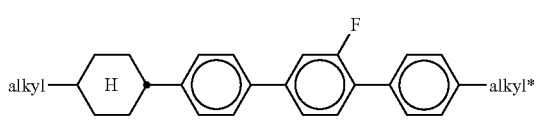

DK10
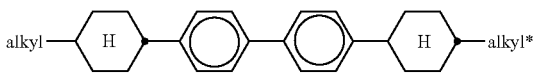

DK11
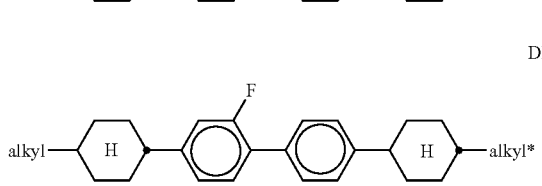

DK12
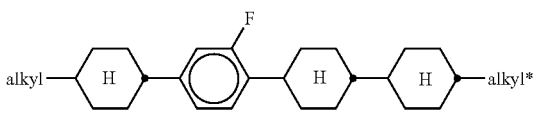

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

d) LC medium which additionally comprises one or more compounds of the following formula:

LY
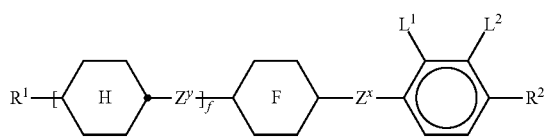

in which the individual radicals have the following meanings:

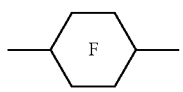

denotes

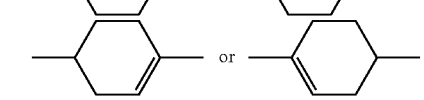

f denotes 0 or 1, $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, $Z^x$ and $Z^y$ each, independently of one another, denote —$CH_2CH_2$—, —CH=CH—, —$CF_2O$—, —$OCF_2$—, —$CH_2O$—, —$OCH_2$—, —CO—O—, —O—CO—, —$O_2F_4$—, —CF=CF—, —CH=CH—$CH_2O$— or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1
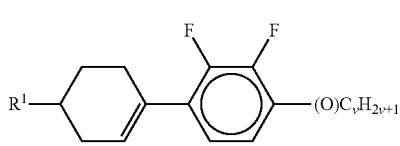

LY2
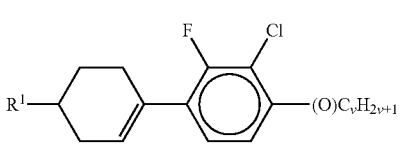

-continued
LY3 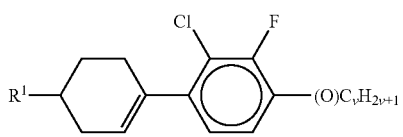
LY4 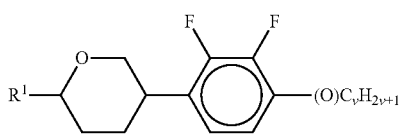
LY5 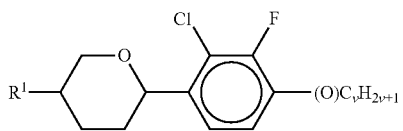
LY6 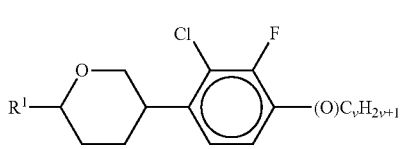
LY7 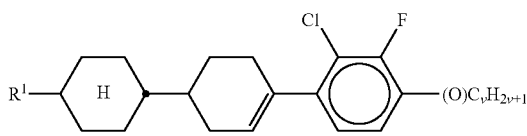
LY8 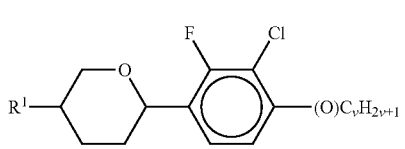
LY9 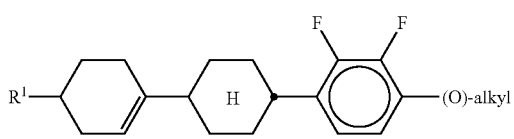
LY10 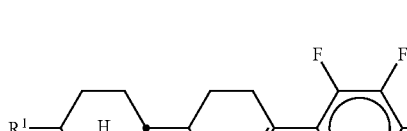
LY11 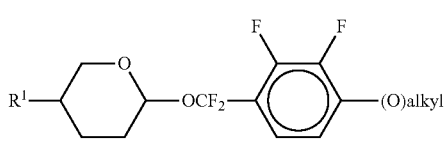
LY12 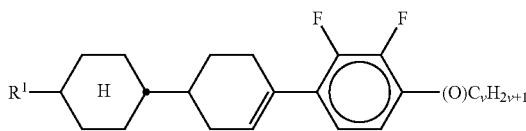
LY13 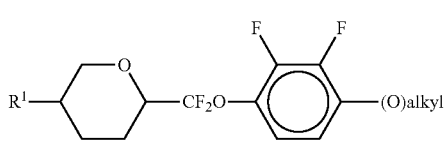
LY14 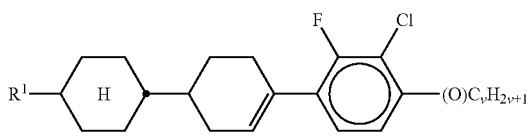
LY15 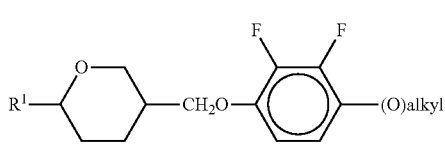
LY16 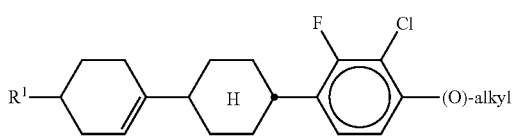
LY17 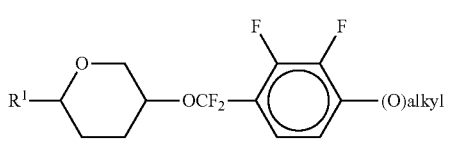
LY18 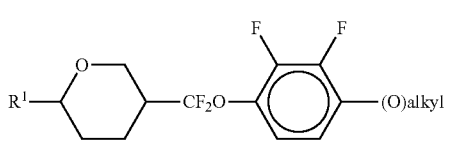
LY19 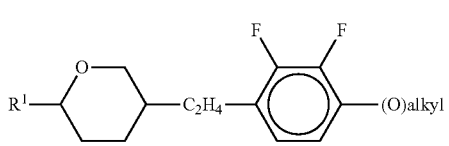
LY20
LY21
LY22

LY23

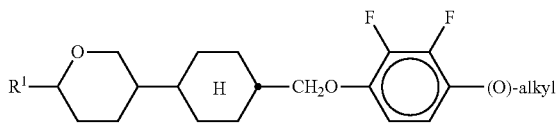

LY24

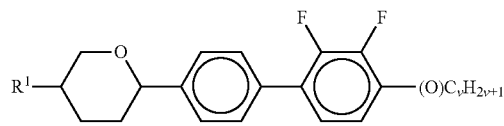

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, $n\text{-}C_3H_7$, $n\text{-}C_4H_9$, $n\text{-}C_5H_{11}$, $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

e) LC medium which additionally comprises one or more compounds selected from the group consisting of the following formulae:

G1

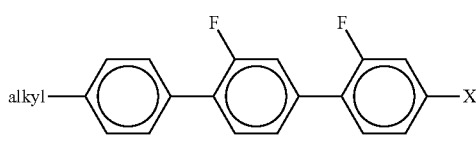

G2

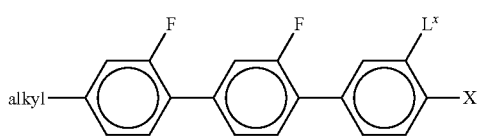

G3

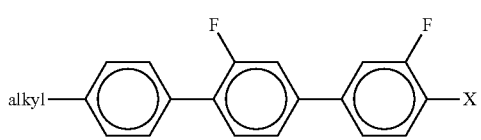

G4

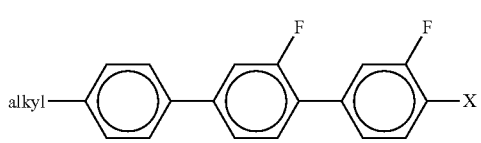

in which alkyl denotes $C_{1-6}$-alkyl, 12 denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the group consisting of the following formulae:

Y1

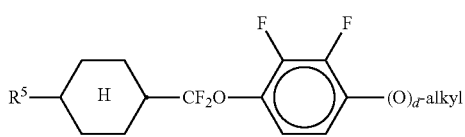

Y2

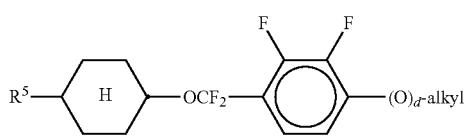

Y3

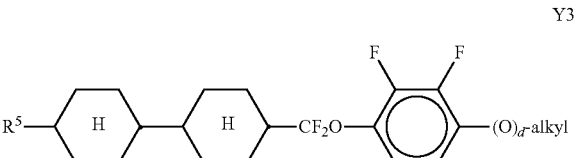

Y4

Y5

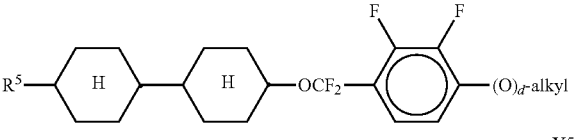

Y6

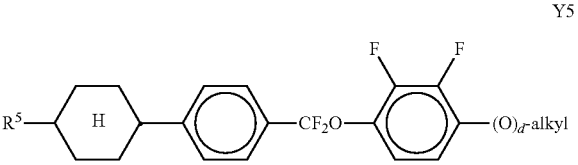

Y7

Y8

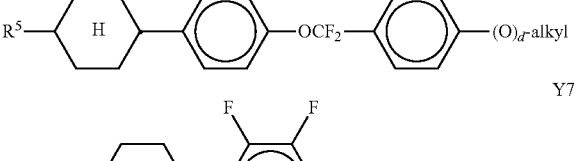

Y9

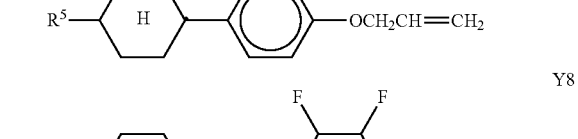

Y10

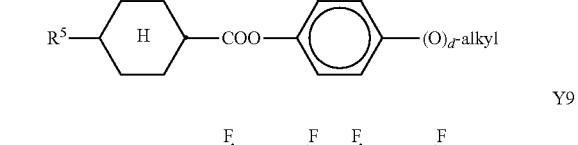

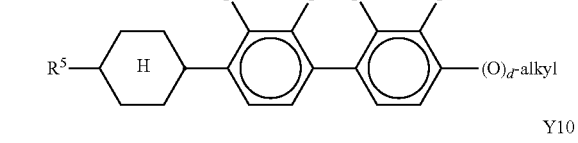

-continued

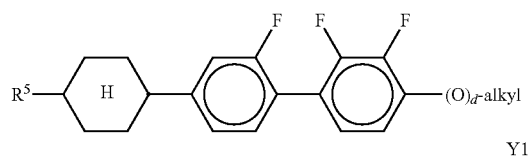
Y11

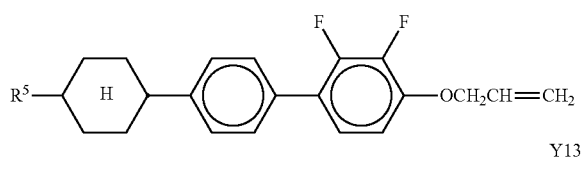
Y12

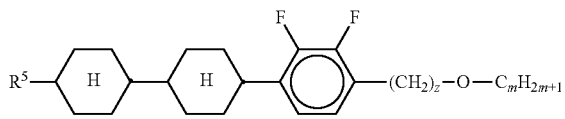
Y13

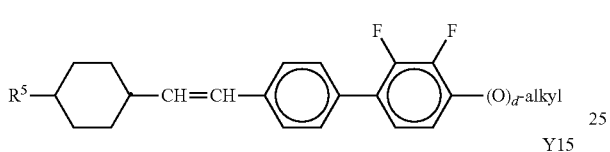
Y14

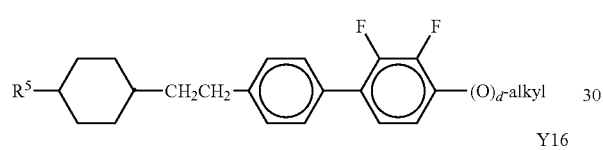
Y15

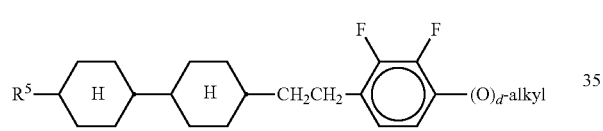
Y16 in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

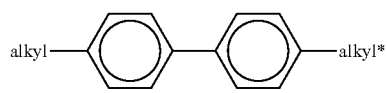
B1

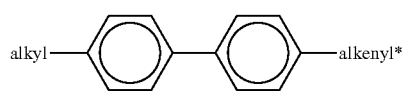
B2

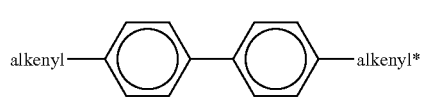
B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

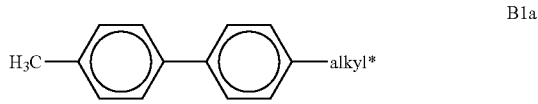
B1a

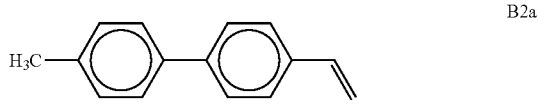
B2a

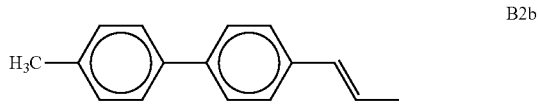
B2b

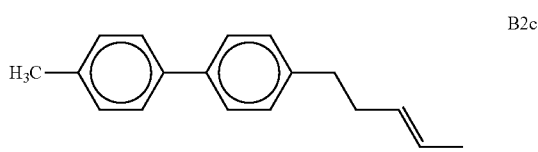
B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

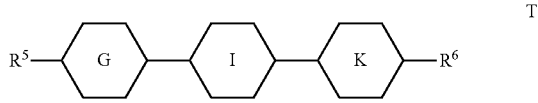
T in which $R^5$ and $R^6$ each, independently of one another, have one of the meanings indicated above for $R^1$, and

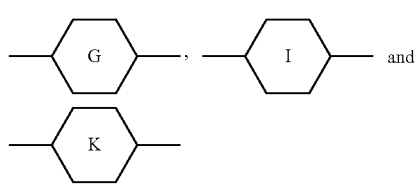

each, independently of one another, denote
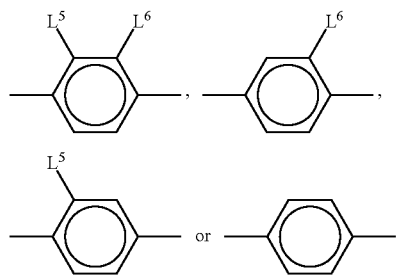
in which $L^5$ denotes F or Cl, preferably F, and $L^6$ denotes F, Cl, $OCF_3$, $CF_3$, $CH_3$, $CH_2F$ or $CHF_2$, preferably F.
The compounds of the formula T are preferably selected from the group consisting of the following sub-formulae:
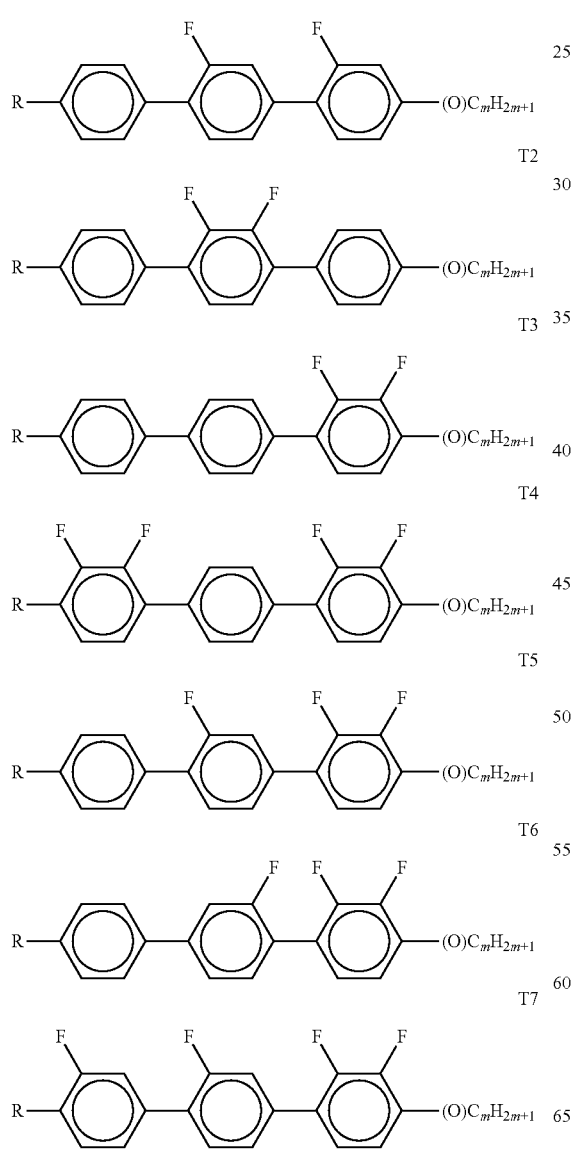
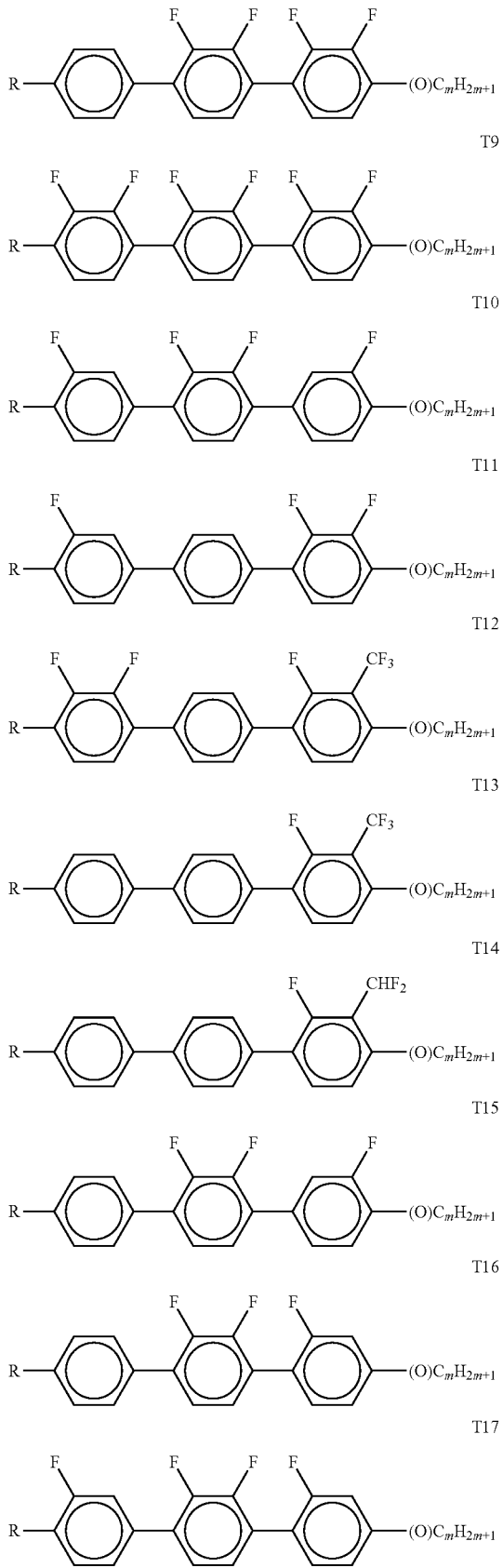

-continued

T18
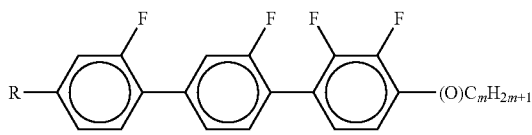

T19
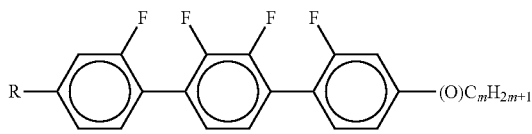

T20
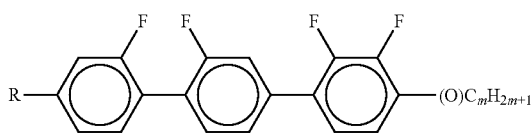

T21
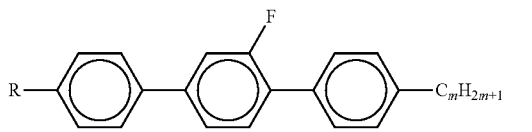

T22
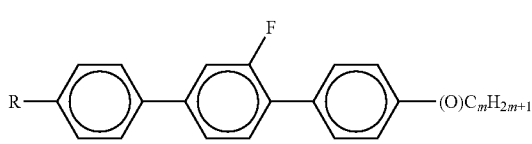

T23
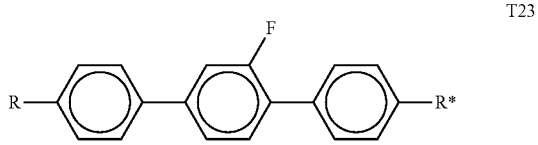

T24
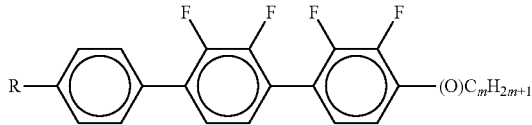

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be 0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

[O1 through O11 structures]

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

FI

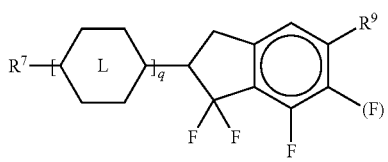

in which

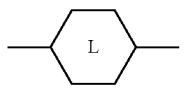

denotes

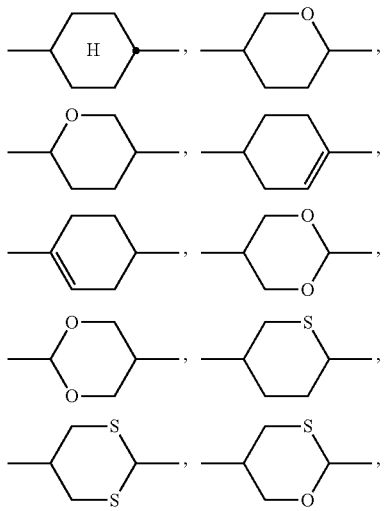

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula F1 are selected from the group consisting of the following sub-formulae:

FI1

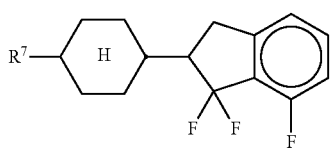

FI2

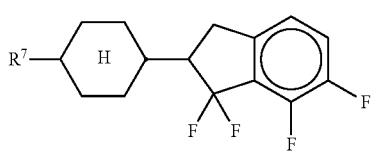

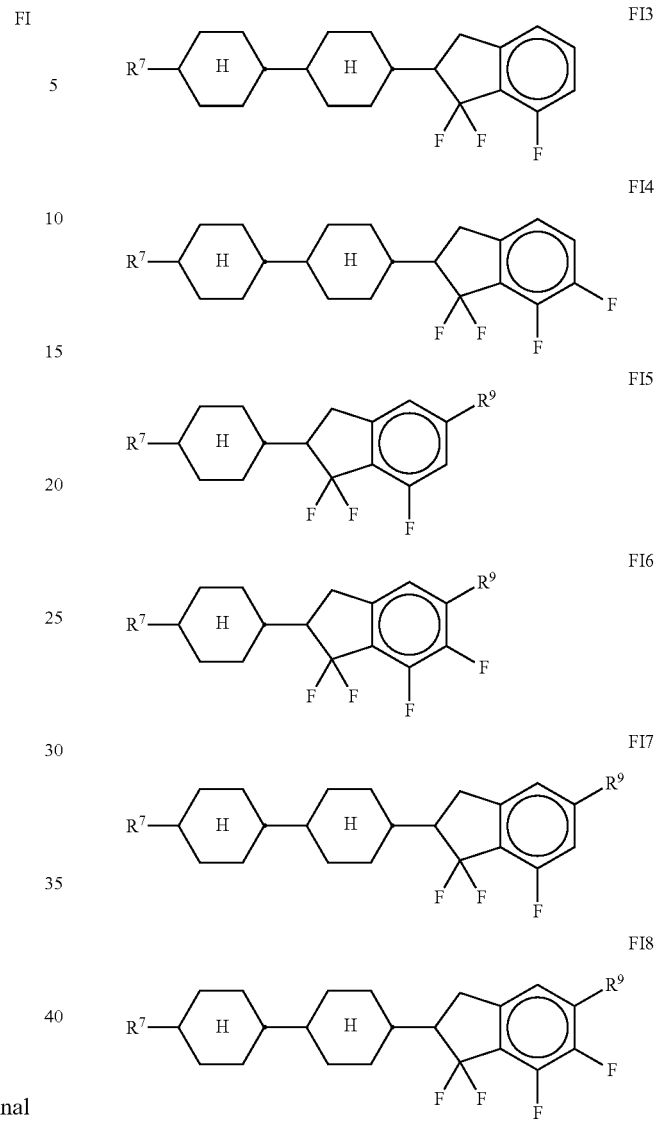

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

m) LC medium which additionally comprises one or more compounds selected from the group consisting of the following formulae:

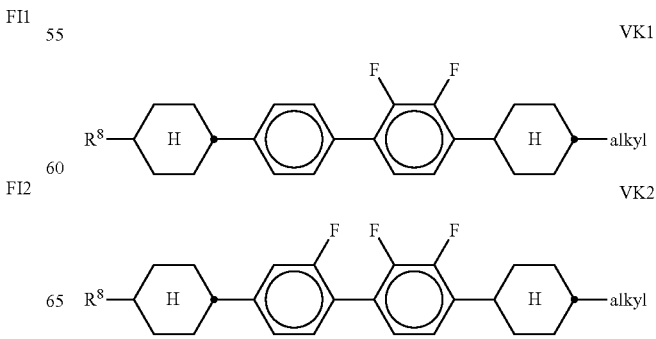

VK3

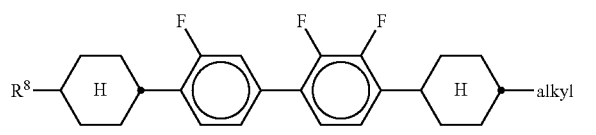

VK4

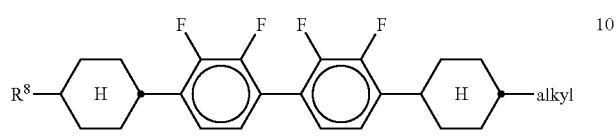

in which R⁸ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

N1

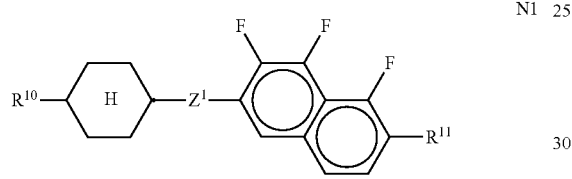

N2

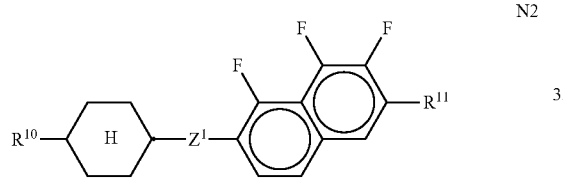

N3

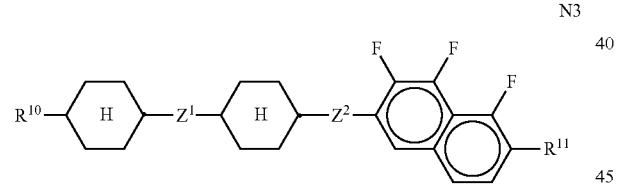

N4

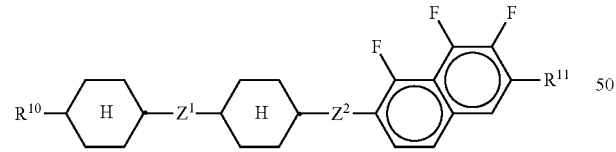

N5

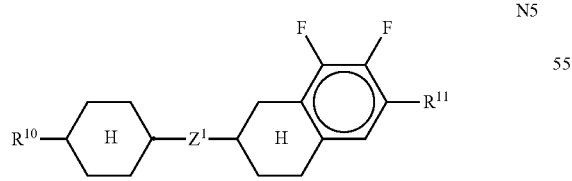

N6

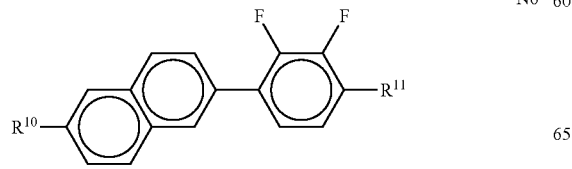

N7

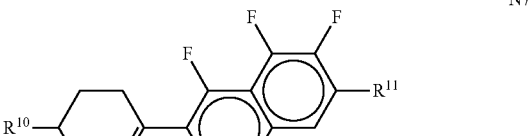

N8

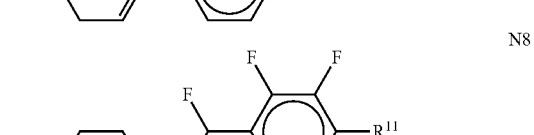

N9

N10

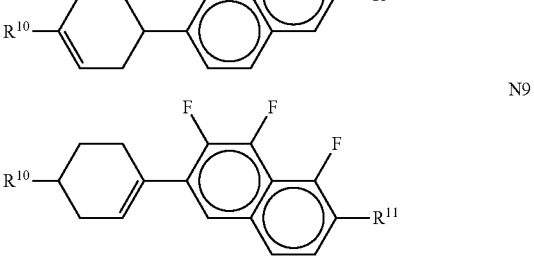

in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CH—$CH_2CH_2$—, —$CH_2CH_2$CH=CH—, —$CH_2O$—, —$OCH_2$—, —CO—O—, —O—CO—, —$C_2F_4$—, —CF=CF—, —CF=CH—, —CH=CF—, —$CH_2$— or a single bond.

o) LC medium which additionally comprises one or more difluoro-dibenzochromans and/or chromans of the following formulae:

BC

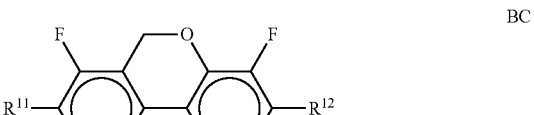

CR

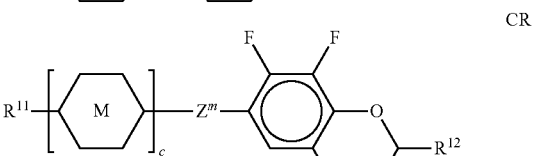

RC

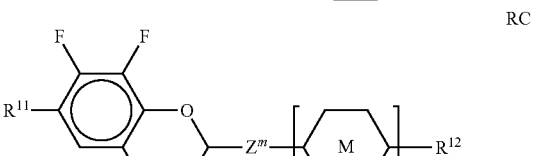

in which

R$^{11}$ and R$^{12}$ each, independently of one another, have the meanings indicated above, ring M is trans-1,4-cyclohexylene or 1,4-phenylene, Z$^m$ —C$_2$H$_4$—, —CH$_2$O—, —OCH$_2$—, —CO—O— or —O—CO—, c is 0 or 1, preferably in amounts of 3 to 20% by weight, in particular in amounts of 3 to 15% by weight.

Particularly preferred compounds of the formulae BC, CR and RC are selected from the group consisting of the following sub-formulae:

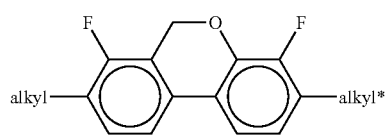
BC1

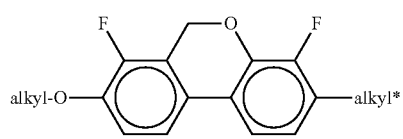
BC2

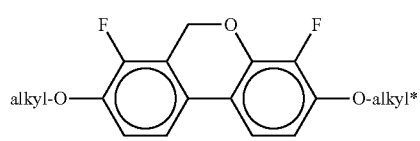
BC3

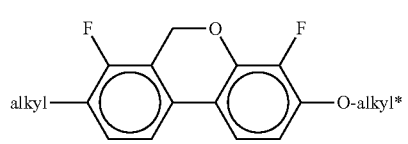
BC4

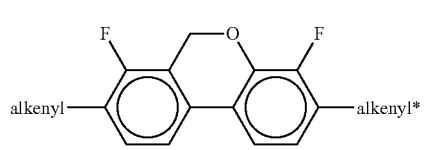
BC5

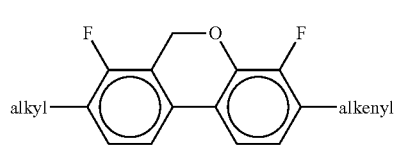
BC6

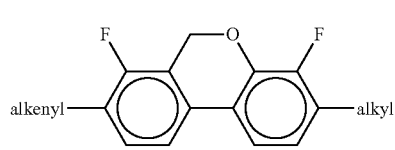
BC7

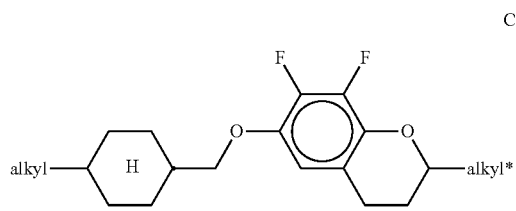
CR1

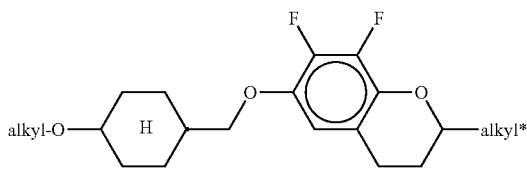
CR2

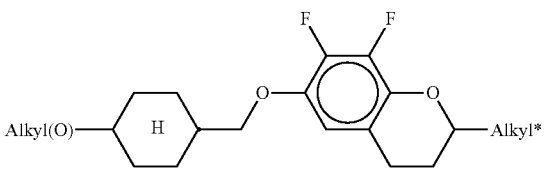
CR3

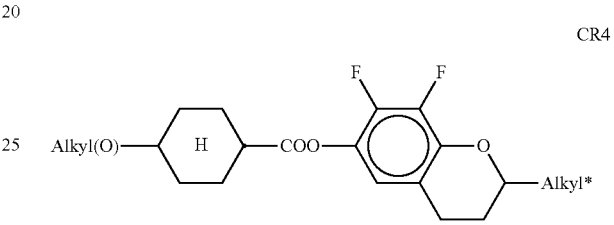
CR4

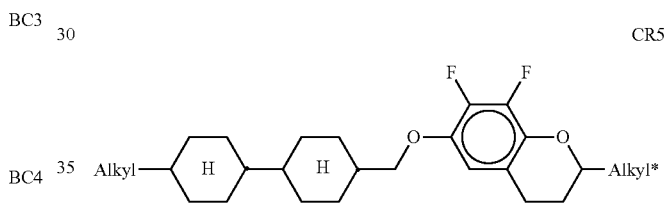
CR5

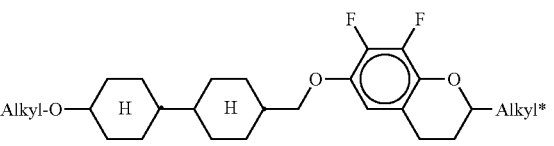
CR6

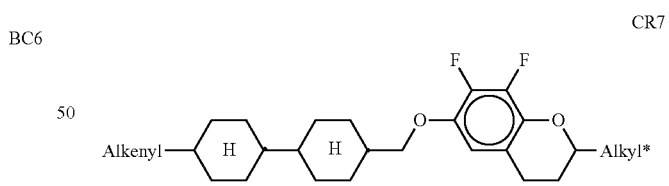
CR7

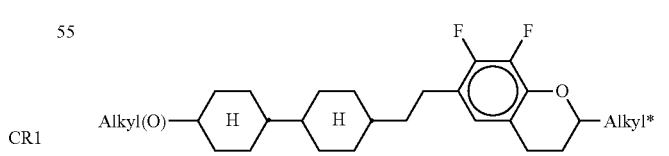
CR8

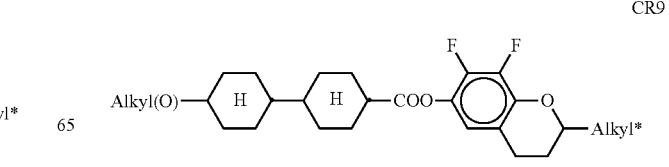
CR9

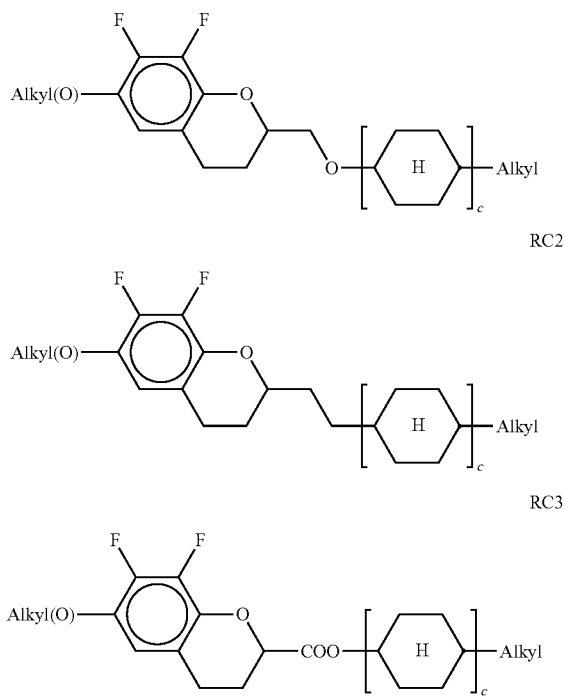

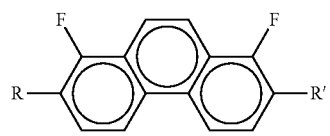

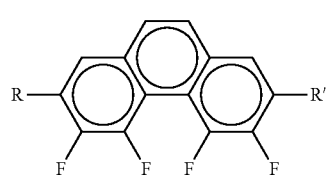

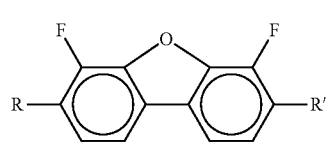

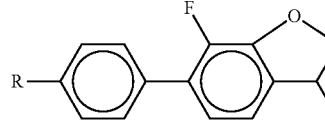

in which R and R' each, independently of one another, denote a straight-chain alkyl or alkoxy radical having 1-7 C atoms.

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

p) LC medium which additionally comprises one or more fluorinated phenanthrenes and/or dibenzofurans of the following formulae:

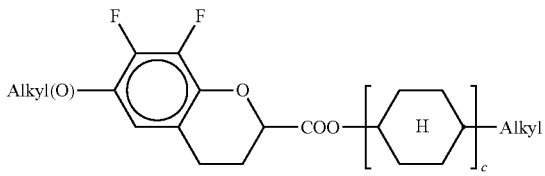

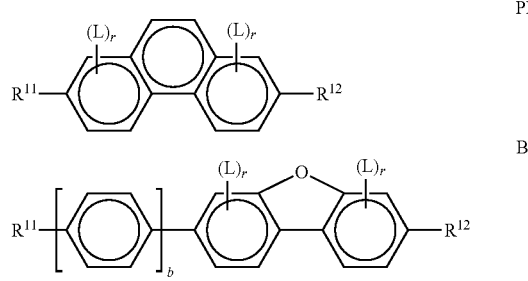

in which $R^{11}$ and $R^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

q) LC medium which, apart from the polymerisable compounds according to the invention, in particular of the formula I or sub-formulae thereof and the comonomers, comprises no compounds which contain a terminal vinyloxy group ($-O-CH=CH_2$).

r) LC medium which comprises 1 to 5, preferably 1, 2 or 3, polymerisable compounds, preferably selected from polymerisable compounds according to the invention, in particular of the formula I or sub-formulae thereof.

s) LC medium in which the proportion of polymerisable compounds, in particular of the formula I or sub-formulae thereof, in the mixture as a whole is 0.05 to 5%, preferably 0.1 to 1%.

t) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) PSA-VA display in which the pretilt angle is preferably 85°, particularly preferably 80°.

In a second preferred embodiment the LC medium contains an LC host mixture based on compounds with positive dielectric anisotropy. Such LC media are especially suitable for use in PSA-OCB-, PSA-TN-, PSA-Posi-VA-, PSA-IPS- oder PSA-FFS-displays.

Particularly preferred is an LC medium of this second preferred embodiment, which contains one or more compounds selected from the group consisting of compounds of formula AA and BB

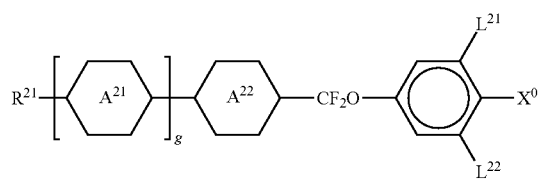

AA

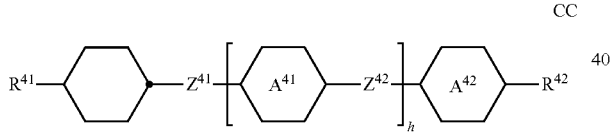

BB and optionally contains, in addition to the compounds of formula AA and/or BB, one or more compounds of formula CC

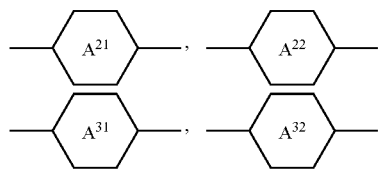

CC in which the individual radicals have the following meanings:

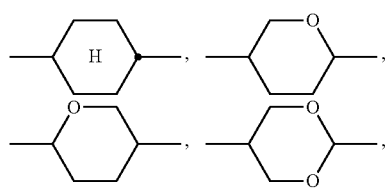

each, independently of one another, and on each occurrence, identically or differently

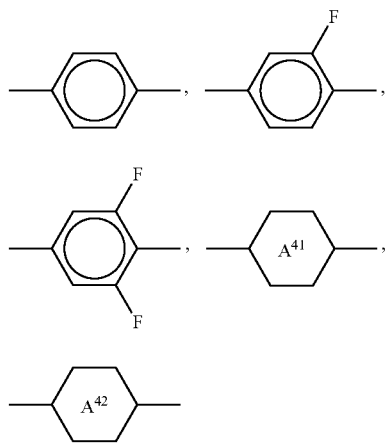

each, independently of one another, and on each occurrence, identically or differently

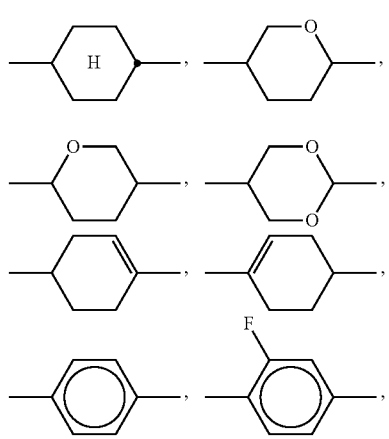

$R^{21}$, $R^{31}$, $R^{41}$, $R^{42}$ each, independently of one another, alkyl, alkoxy, oxaalkyl or fluoroalkyl having 1 to 9 C atoms or alkenyl having 2 to 9 C atoms, $X^0$ F, Cl, halogenated alkyl or alkoxy having 1 to 6 C atoms or halogenated alkenyl or alkenyloxy having 2 to 6 C atoms, $Z^{31}$ —$CH_2CH_2$—, —$CF_2CF_2$—, —COO—, trans- —CH=CH—, trans- —CF=CF—, —$CH_2O$— or a single bond, preferably —$CH_2CH_2$—, —COO—, trans- —CH=CH— or a single bond, particularly preferably —COO—, trans —CH=CH— or a single bond, $Z^{41}$, $Z^{42}$ —$CH_2CH_2$—, —COO—, trans- —CH=CH—, trans- —CF=CF—, —$CH_2O$—, —$CF_2O$—, —C≡C— or a single bond, preferably a single bond, $L^{21}$, $L^{22}$, $L^{31}$ $L^{32}$ H or F, g 1, 2 or 3, h 0, 1, 2 or 3.

$X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, very preferably F or $OCF_3$ The compounds of formula AA are preferably selected from the group consisting of the following formulae:

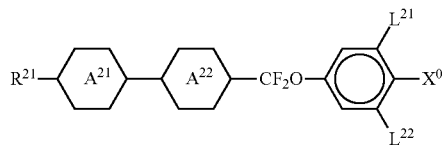 AA1

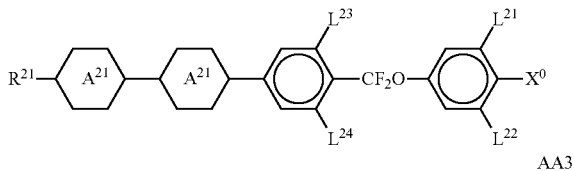 AA2

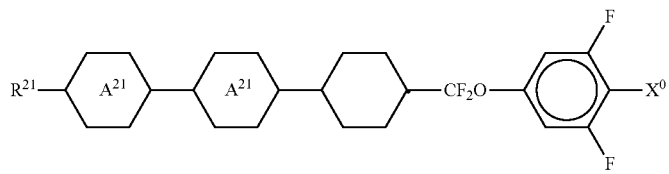 AA3

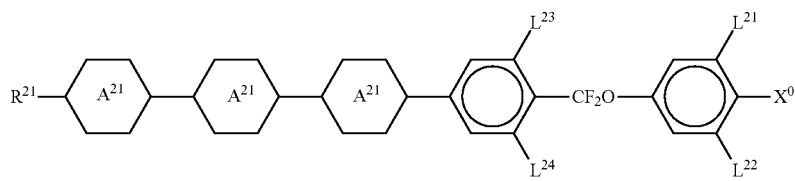 AA4 in which $A^{21}$, $R^{21}$, $X^0$, $L^{21}$ and $L^{22}$ have the meanings given in formula AA, $L^{23}$ and $L^{24}$ each, independently of one another, are H or F, and $X^0$ is preferably F. Particularly preferred are compounds of formulae AA1 and AA2.

Particularly preferred compounds of formula AA1 are selected from the group consisting of the following subformulae

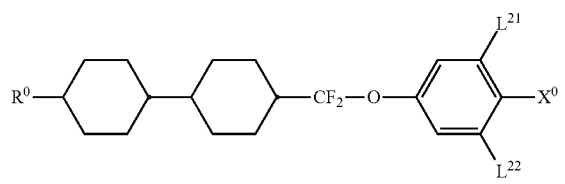 AA1a

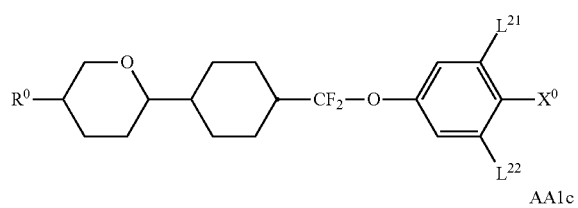 AA1b

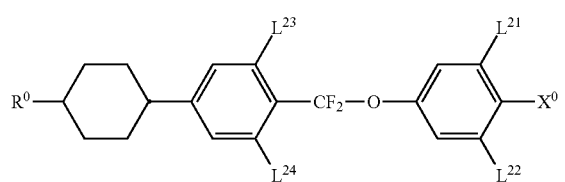 AA1c

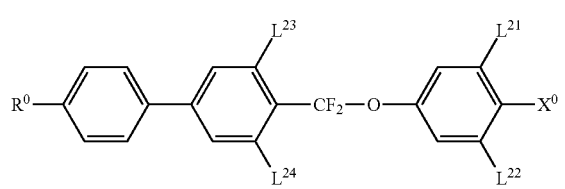 AA1d

-continued

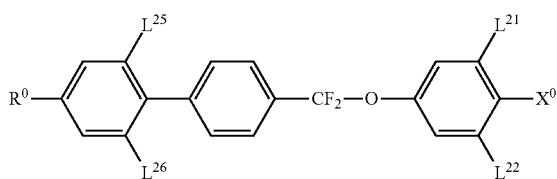 AA1e in which $R^0$ has one of the meanings given for $R^{21}$ in formula AA1, $X^0$, $L^{21}$ and $L^{22}$ have the meaning given in formula AA1, $L^{23}$, $L^{24}$, $L^{25}$ and $L^{26}$ are each, independently of one another, H or F, and $X^0$ is preferably F.

Very particularly preferred compounds of formula AA1 are selected from the group consisting of the following subformulae:

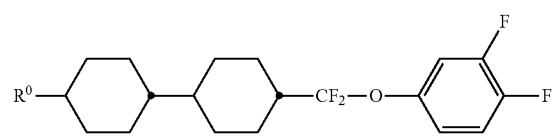 AA1a1

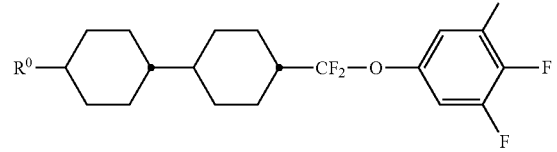 AA1a2

AA1b1

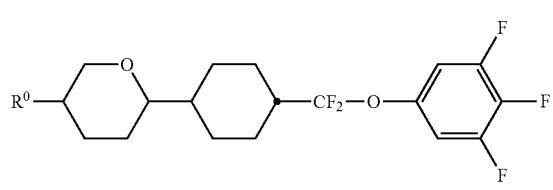

AA2e

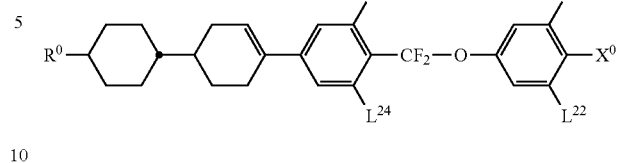

AA1c1

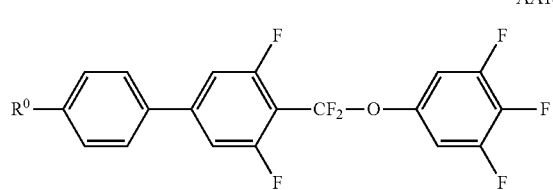

AA2f

AA2g

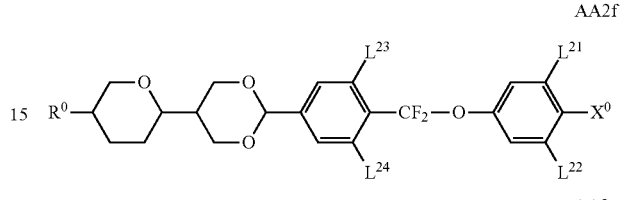

AA1e2

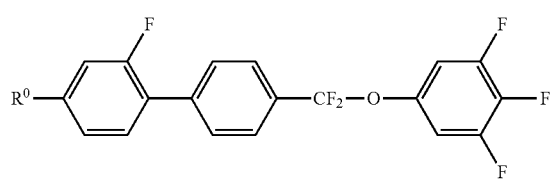

AA2h

AA2i

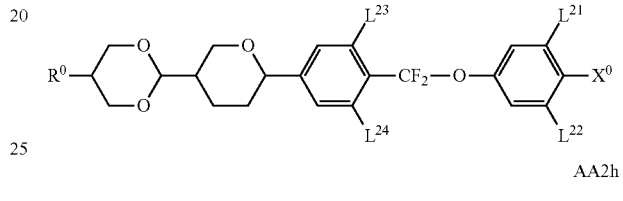

In which $R^0$ has the meaning given for $R^{21}$ in formula AA1.

Very preferred compounds of formula AA2 are selected from the group consisting of the following subformulae AA2a

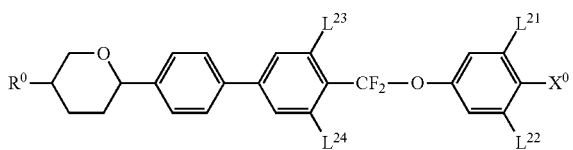

AA2j

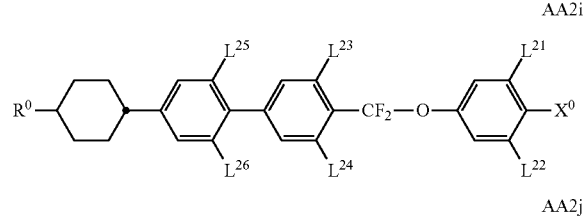

AA2b

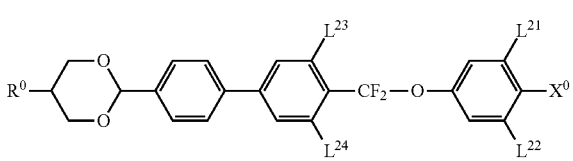

in which $R^0$ has the meaning given for $R^{21}$ in formula AA1, $X^0$, $L^{21}$ and $L^{22}$ have the meaning given in formula AA, $L^{23}$, $L^{24}$, $L^{25}$ and $L^{26}$ each, independently of one another, are H or F, and $X^0$ is preferably F.

Very particularly preferred compounds of formula AA2 are selected from the group consisting of the following subformulae AA2c

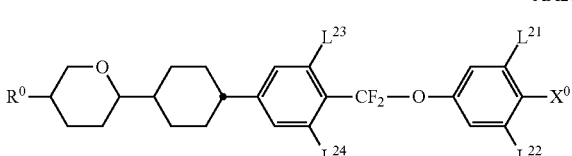

AA2d

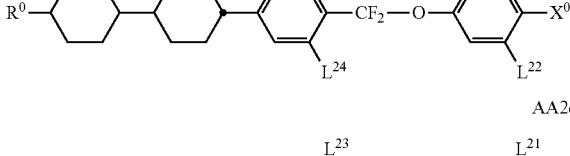

AA2a1

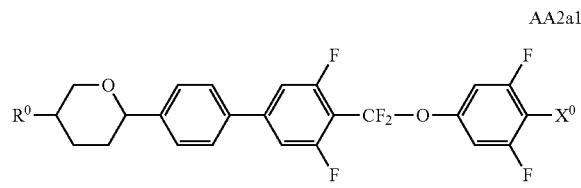

AA2c1
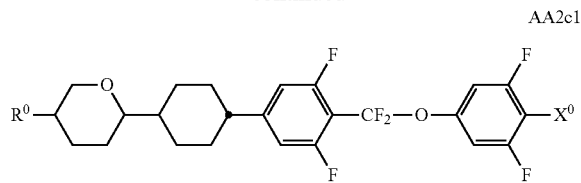

AA2d1
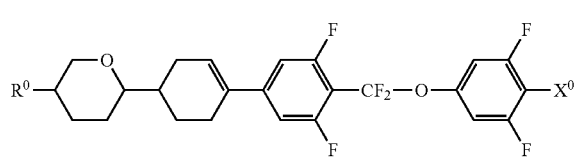

AA2e1
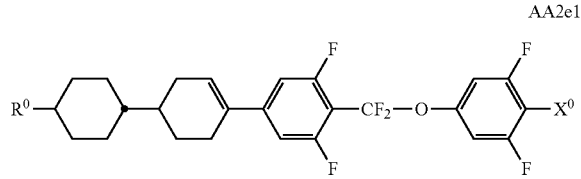

AA2f1
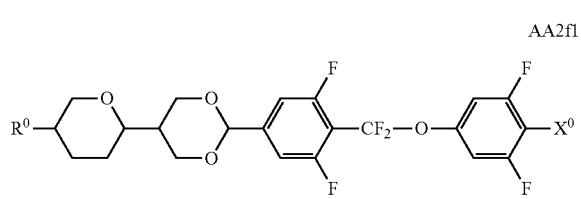

AA2h1
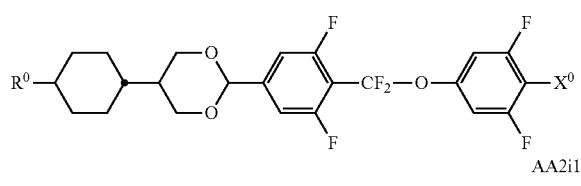

AA2i1
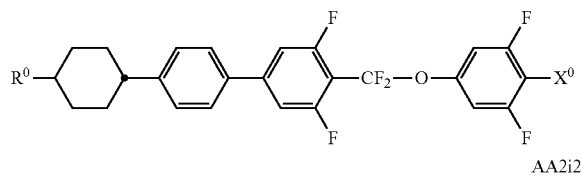

AA2i2
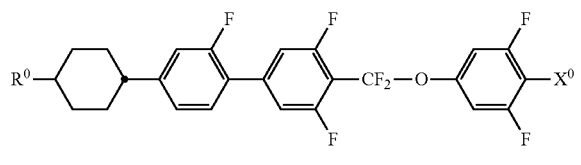

AA2j1
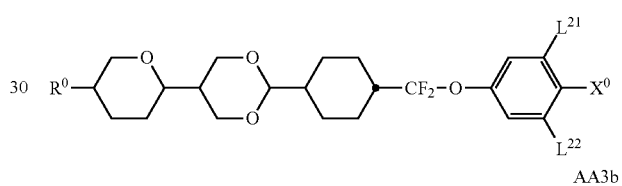

AA2j2
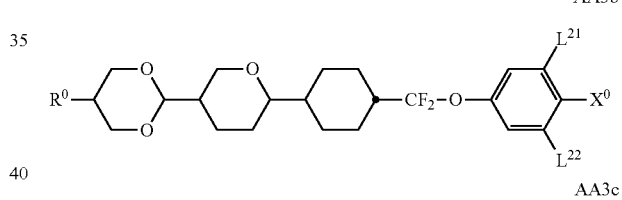

in which $R^0$ has the meaning given for $R^{21}$ in formula AA1.

Particularly preferred compounds of formula AA3 are selected from the group consisting of the following subformulae AA3a AA3b AA3c in which $R^0$ has the meaning given for $R^{21}$ in formula AA1, $X^0$, $L^{21}$ and $L^{22}$ have the meaning given in formula AA3, and $X^0$ is preferably F.

Particularly preferred compounds of formula AA4 are selected from the group consisting of the following subformulae AA4a
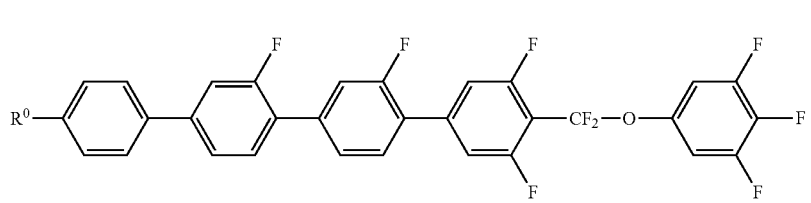

in which $R^0$ has the meaning given for $R^{21}$ in formula AA1.

The compounds of formula BB are preferably selected from the group consisting of the following formulae:

BB1

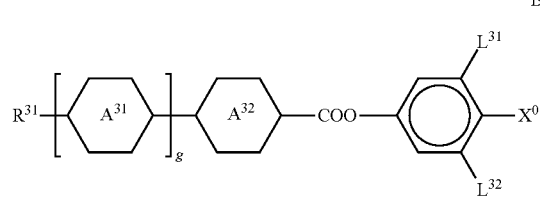

BB2

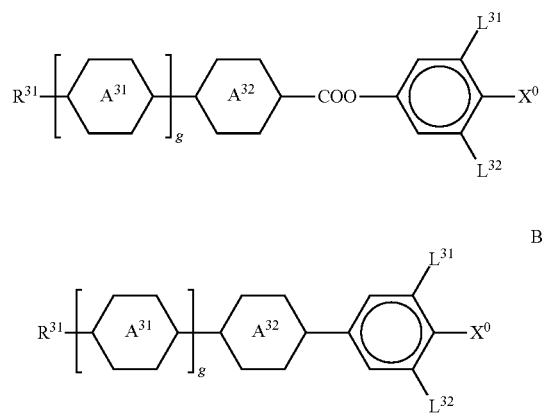

BB3 in which $A^{31}$, $A^{32}$, $R^{31}$, $X^0$, $L^{31}$ and $L^{32}$ have the meanings given in formula BB, and $X^0$ is preferably F. Particularly preferred are compounds of formulae BB1 and BB2.

Particularly preferred compounds of formula BB1 are selected from the group consisting of the following subformulae BB1a

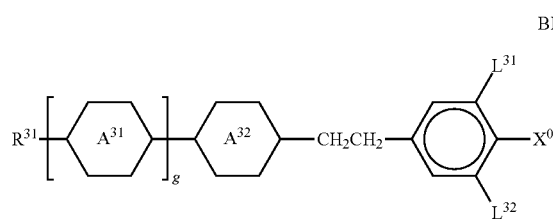

BB1b

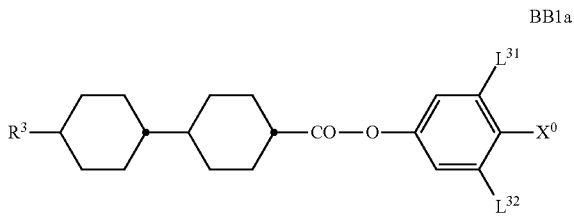

in which $R^3$ has the meaning given for $R^{31}$ in formula BB1, $X^0$, $L^{31}$ and $L^{32}$ have the meaning given in formula BB1, and $X^0$ is preferably F.

Very particularly preferred compounds of formula BB1a are selected from the group consisting of the following subformulae BB1a1

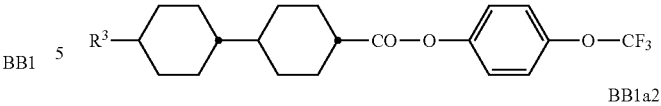

BB1a2

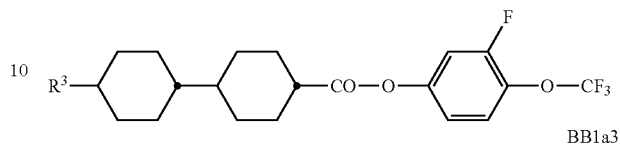

BB1a3

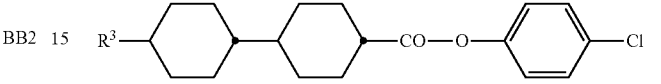

BB1a4

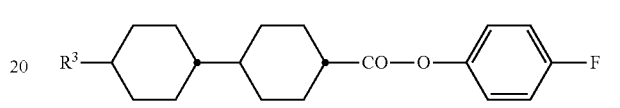

BB1a5

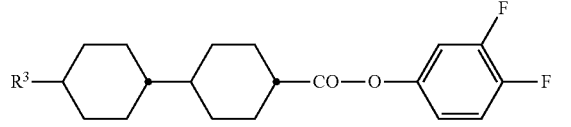

BB1a6

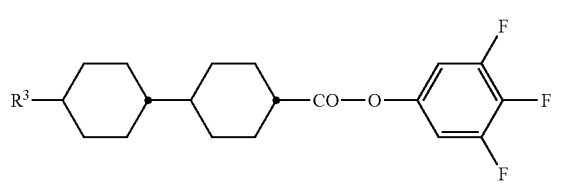

in which $R^3$ has the meaning given for $R^{31}$ in formula BB1.

Very particularly preferred compounds of formula BB1b are selected from the group consisting of the following subformulae BB1b1

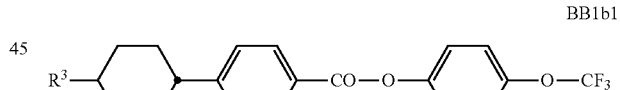

BB1b2

BB1b3

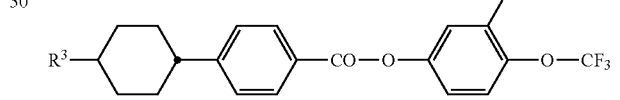

BB1b4

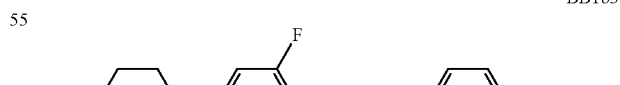

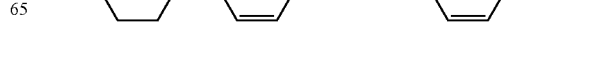

in which R³ has the meaning given for R³¹ in formula BB1.

Particularly preferred compounds of formula BB2 are selected from the group consisting of the following subformulae

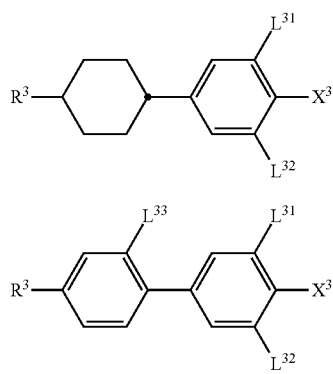
BB2a

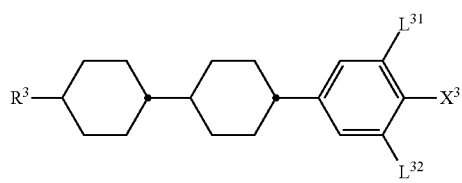
BB2b

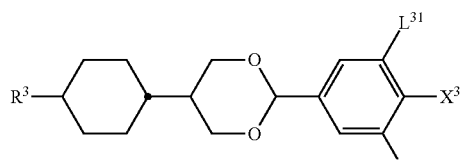
BB2c

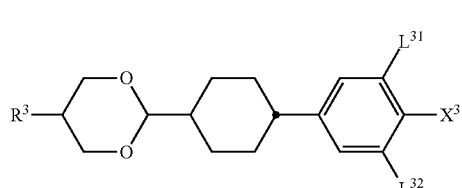
BB2d

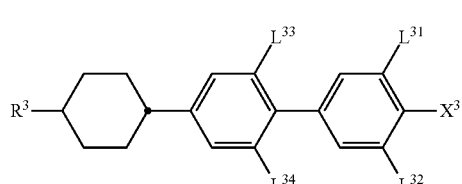
BB2e

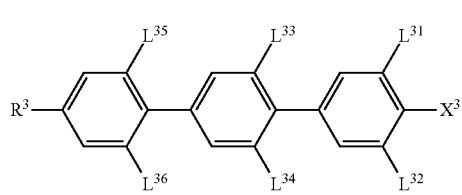
BB2f

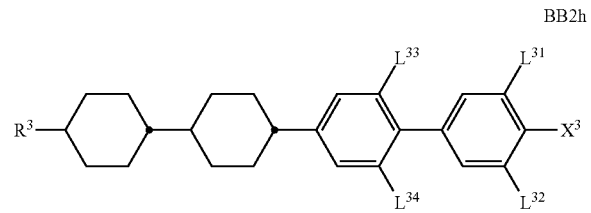
BB2g

BB2h

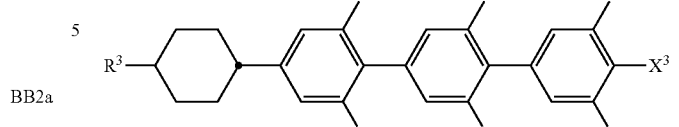
BB2i

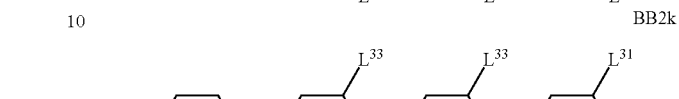
BB2k

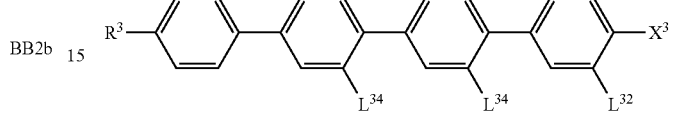

in which R⁰ has one of the meanings given for R²¹ in formula BB2, X⁰, L³¹ and L³² have the meaning given in formula BB2, L³³, L³⁴, L³⁵ and L³⁶ are each, independently of one another, H or F, and X⁰ is preferably F.

Very particularly preferred compounds of formula BB2 are selected from the group consisting of the following subformulae:

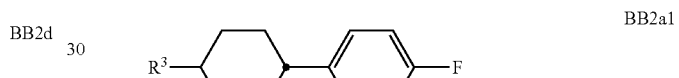
BB2a1

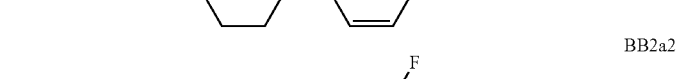
BB2a2

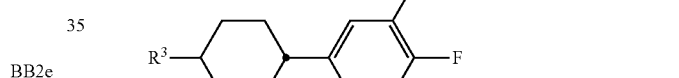
BB2a3

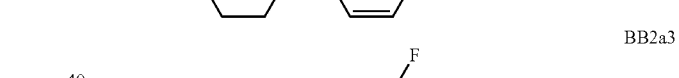

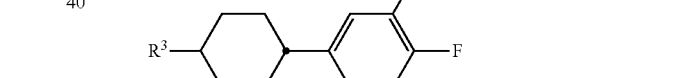
BB2a4

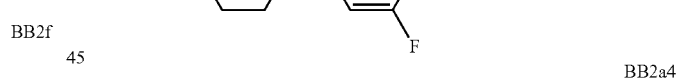
BB2a5

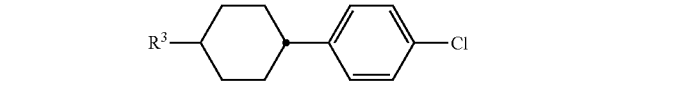

in which R³ has the meaning given for R³¹ in formula BB2.

Very particularly preferred compounds of formula BB2b are selected from the group consisting of the following subformulae

BB2b1

-continued

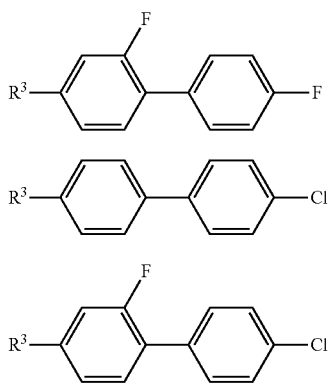
BB2b2
BB2b3
BB2b4 in which R³ has the meaning given for R³¹ in formula BB2.

Very particularly preferred compounds of formula BB2c are selected from the group consisting of the following subformulae

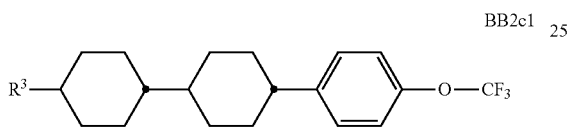
BB2c1

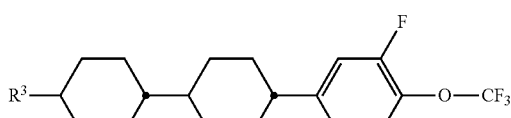
BB2c1

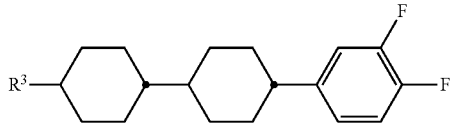
BB2c3

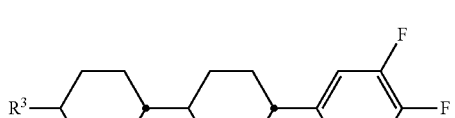
BB2c4

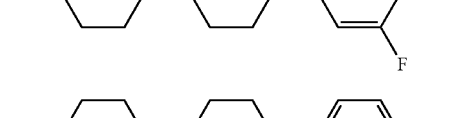

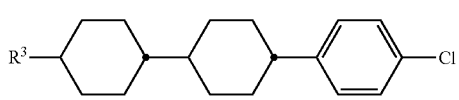
BB2c4 in which R³ has the meaning given for R³¹ in formula BB2.

Very particularly preferred compounds of formula BB2d and BB2e are selected from the group consisting of the following subformulae

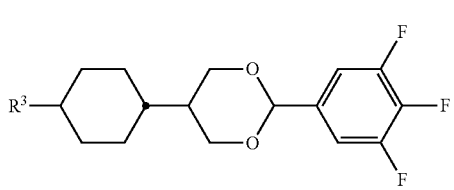
BB2d1

-continued

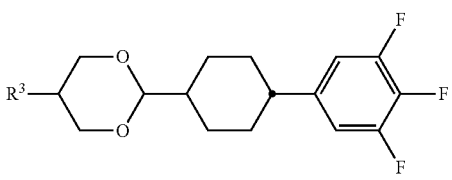
BB2e1 in which R³ has the meaning given for R³¹ in formula BB2.

Very particularly preferred compounds of formula BB2f are selected from the group consisting of the following subformulae

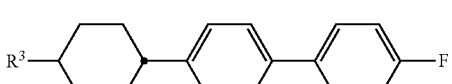
BB2f1

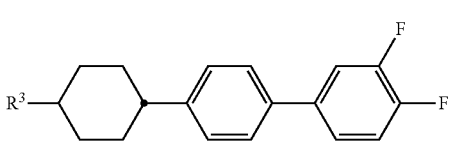
BB2f2

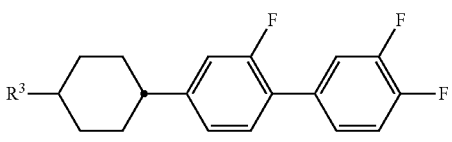
BB2f3

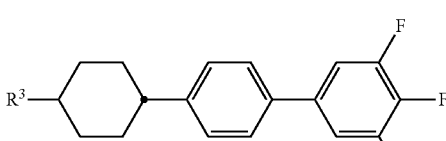
BB2f4

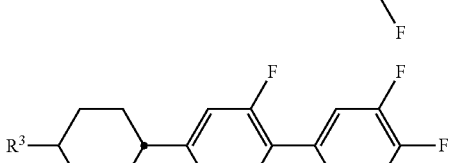
BB2f4 in which R³ has the meaning given for R³¹ in formula BB2.

Very particularly preferred compounds of formula BB2g are selected from the group consisting of the following subformulae

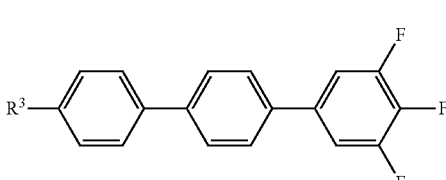
BB2g1

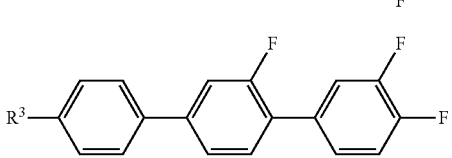
BB2g2

BB2g3
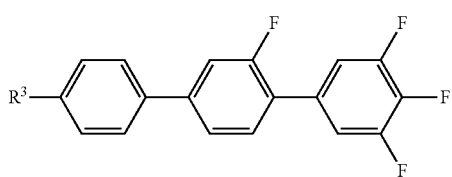

BB2g4
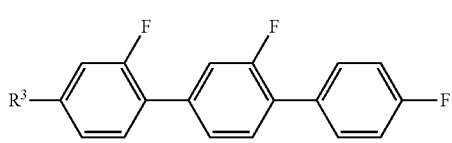

BB2g5
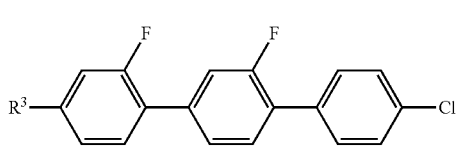

in which R³ has the meaning given for R³¹ in formula BB2.

Very particularly preferred compounds of formula BB2h are selected from the group consisting of the following subformulae BB2h1
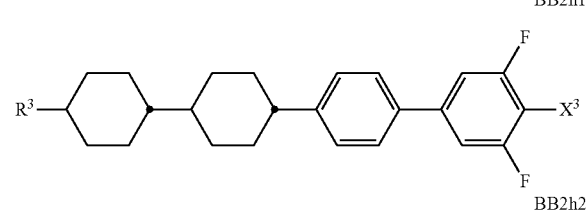

BB2h2
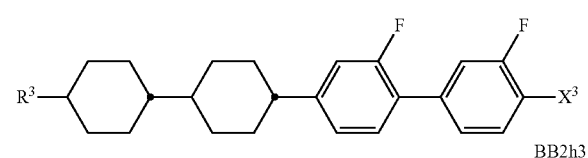

BB2h3
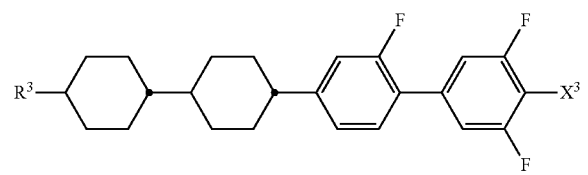

in which R³ has the meaning given for R³¹ in formula BB2.

Very particularly preferred compounds of formula BB2l are selected from the group consisting of the following subformulae BB2i1
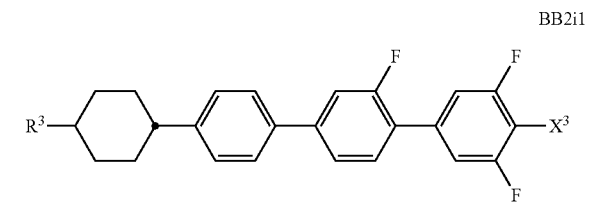

BB2i2
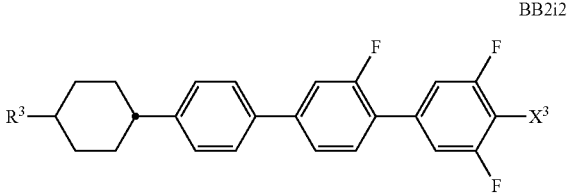

in which R³ has the meaning given for R³¹ in formula BB2.

Very particularly preferred compounds of formula BB2k are selected from the group consisting of the following subformulae BB2k1
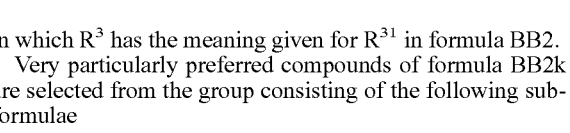

BB2k2
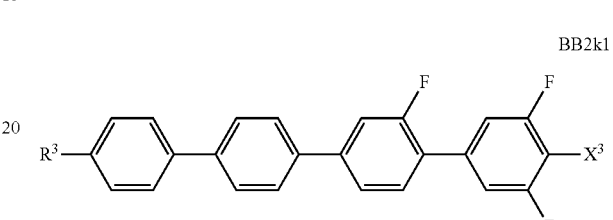

in which R³ has the meaning given for R³¹ in formula BB2.

Alternatively to, or in addition to, the compounds of formula BB1 and/or BB2 the LC media may also comprise one or more compounds of formula BB3 as defined above.

Particularly preferred compounds of formula BB3 are selected from the group consisting of the following subformulae BB3a
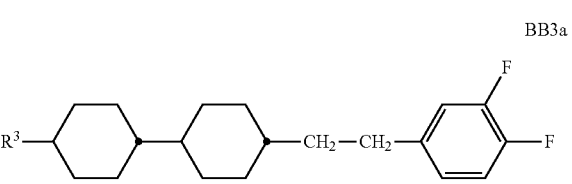

BB3b
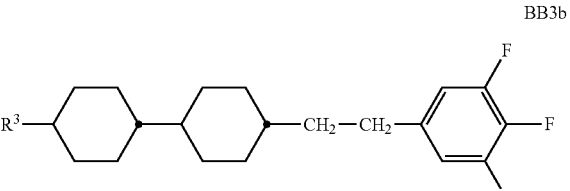

in which R³ has the meaning given for R³¹ in formula BB3.

Preferably the LC media according to this second preferred embodiment comprise, in addition to the compounds of formula AA and/or BB, one or more dielectrically neutral compounds having a dielectric anisotropy in the range from −1.5 to +3, preferably selected from the group of compounds of formula CC as defined above.

Particularly preferred compounds of formula CC are selected from the group consisting of the following subformulae

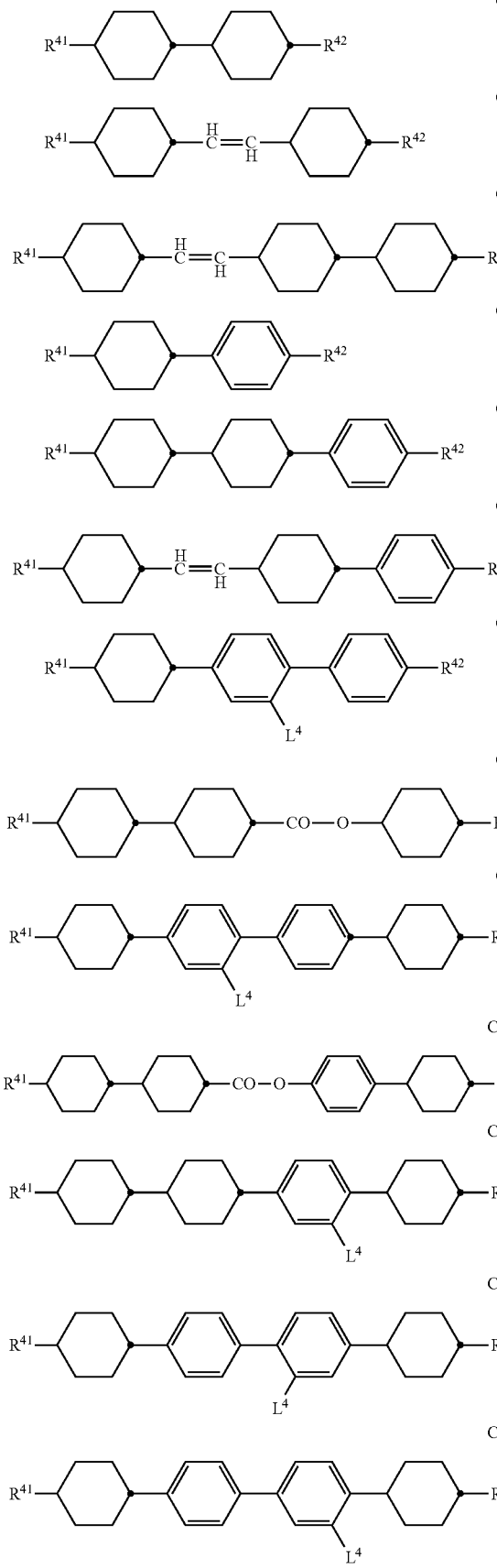
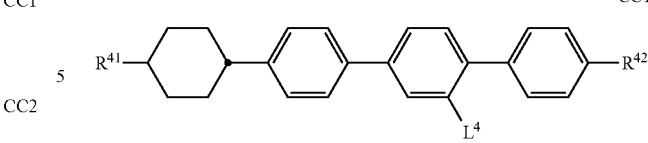

In which $R^{41}$ and $R^{42}$ have the meanings given in formula CC, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, and $L^4$ is H or F.

Preferably the LC media according to this second preferred embodiment comprise, in addition or alternatively to the dielectrically neutral compounds of formula CC, one or more dielectrically neutral compounds having a dielectric anisotropy in the range from −1.5 to +3, selected from the group of compounds of formula DD.

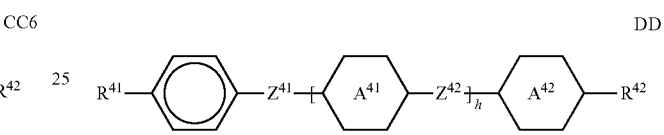

In which $A^{41}$, $A^{42}$, $Z^{41}$, $Z^{42}$, $R^{41}$, $R^{42}$ and h have the meanings given in formula CC.

Particularly preferred compounds of formula DD are selected from the group consisting of the following subformulae

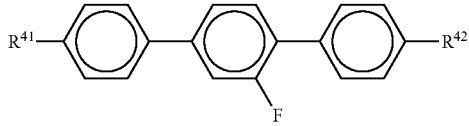

in which $R^{41}$ and $R^{42}$ have the meanings given in formula DD and $R^{41}$ preferably denotes alkyl bedeutet, and in formula DD1 $R^{42}$ preferably denotes alkenyl, particularly preferably vorzugsweise —$(CH_2)_2$—CH=CH—$CH_3$, and in formula DD2 $R^{42}$ preferably denotes alkyl, —$(CH_2)_2$—CH=$CH_2$ or —$(CH_2)_2$—CH=CH—$CH_3$.

The compounds of formula AA and BB are preferably used in the LC medium according to the invention in a concentration from 2% to 60%, more preferably from 3% to 35%, and very particularly preferably from 4% to 30% in the mixture as a whole.

The compounds of formula CC and DD are preferably used in the LC medium according to the invention in a concentration from 2% to 70%, more preferably from 5% to 65%, even more preferably from 10% to 60%, and very particularly preferably from 10%, preferably 15%, to 55% in the mixture as a whole.

The combination of compounds of the preferred embodiments a)-y) mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PSA-VA type, have a negative dielectric anisotropy $\Delta\epsilon$, preferably from −0.5 to −10, in particular from −2.5 to −7.5, at 20° C. and 1 kHz.

The birefringence $\Delta n$ in LC media according to the invention for use in displays of the PSA-VA type is preferably below 0.16, particularly preferably from 0.06 to 0.14, very particularly preferably from 0.07 to 0.12.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PSA-OCB type are preferably those based on compounds with positive dielectric anisotropy according to the second preferred embodiment, and preferably have a positive dielectric anisotropy $\Delta\epsilon$ from +4 to +17 at 20° C. and 1 kHz.

The birefringence $\Delta n$ in LC media according to the invention for use in displays of the PSA-OCB type is preferably from 0.14 to 0.22, particularly preferably from 0.16 to 0.22.

LC media according to the invention, based on compounds with positive dielectric anisotropy according to the second preferred embodiment, for use in displays of the PSA-TN-, PSA-posi-VA-, PSA-IPS-oder PSA-FFS-type, preferably have a positive dielectric anisotropy $\Delta\epsilon$ from +2 to +30, particularly preferably from +3 to +20, at 20° C. and 1 kHz.

The birefringence $\Delta n$ in LC media according to the invention for use in displays of the PSA-TN-, PSA-posi-VA-, PSA-IPS-oder PSA-FFS-type is preferably from 0.07 to 0.15, particularly preferably from 0.08 to 0.13.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

The LC media may, for example, comprise one or more chiral dopants, preferably those selected from the group consisting of compounds from Table B below.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The structure of the LC displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PSA-VA displays are described, for example, in US 2006/0066793 A1.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(m, m, z: in each case, independently of one another, 1, 2, 3, 4, 5 or 6)

TABLE A
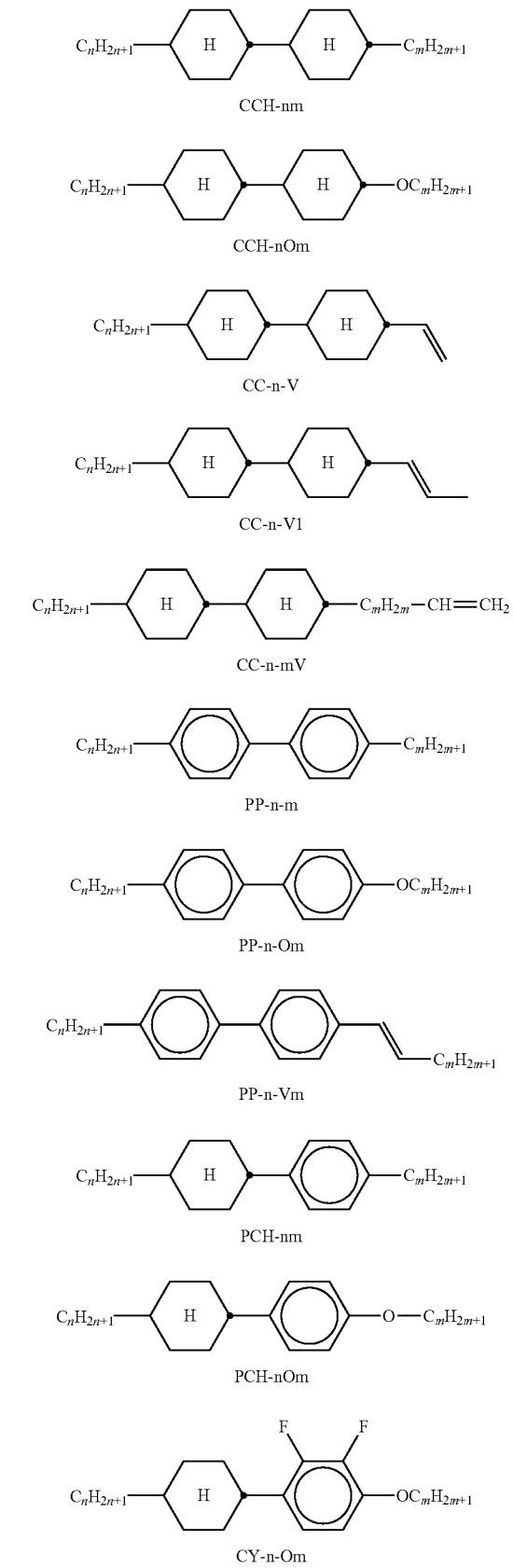

TABLE A-continued
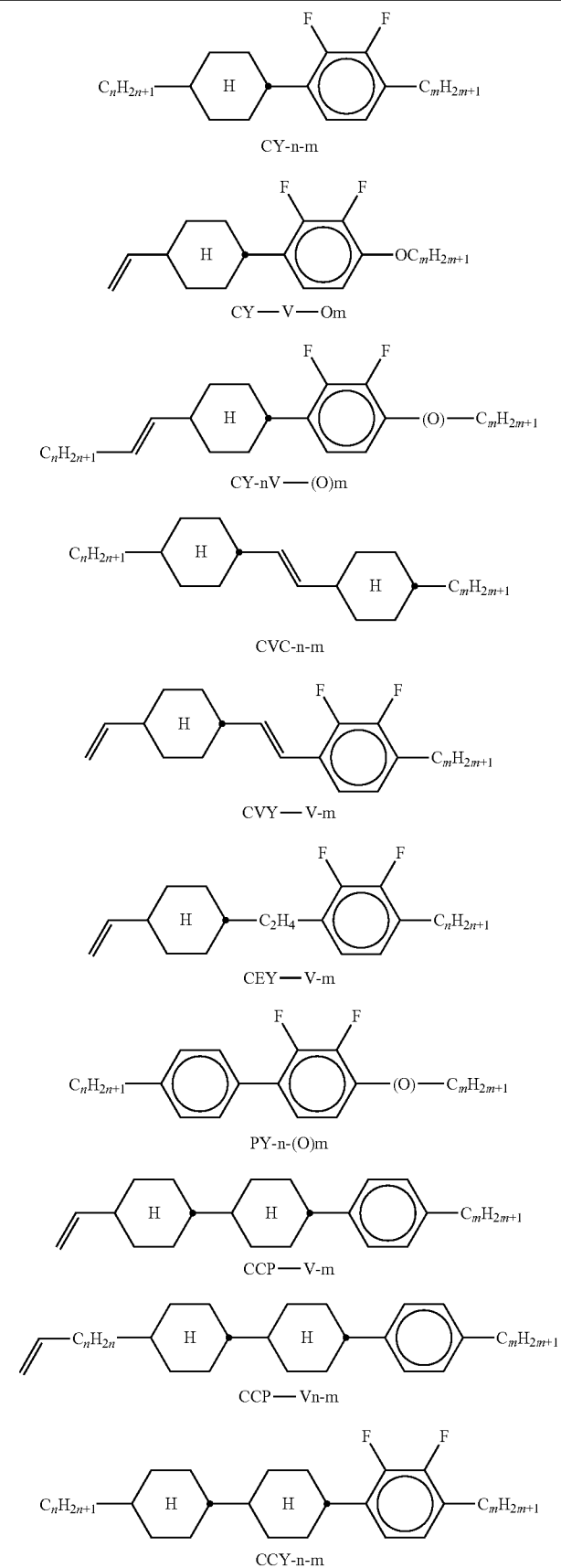

TABLE A-continued
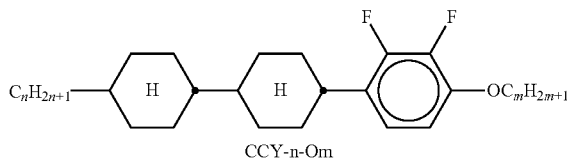
CCY-n-Om
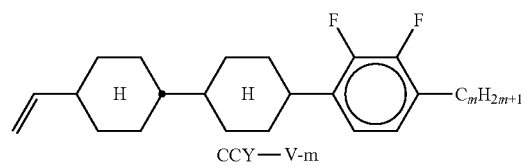
CCY—V-m
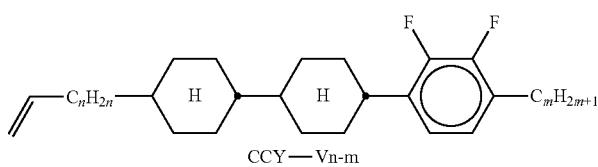
CCY—Vn-m
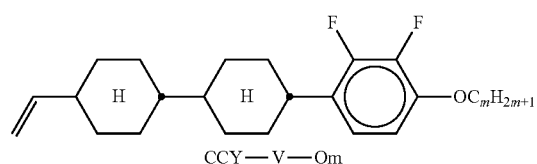
CCY—V—Om
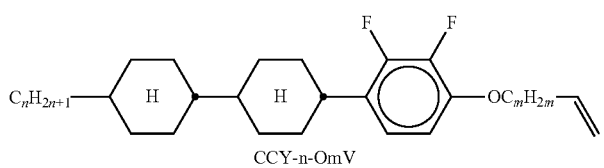
CCY-n-OmV
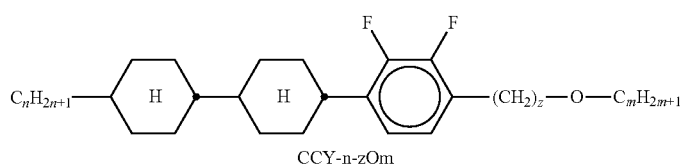
CCY-n-zOm
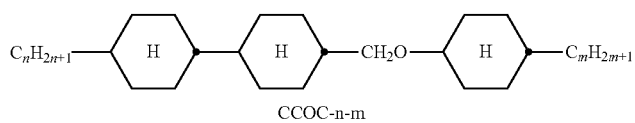
CCOC-n-m
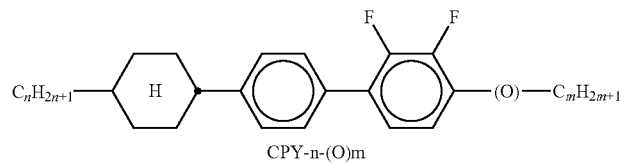
CPY-n-(O)m
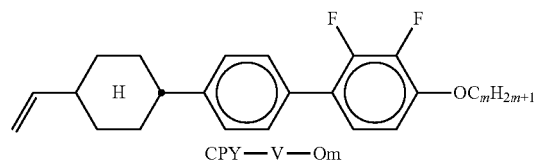
CPY—V—Om TABLE A-continued
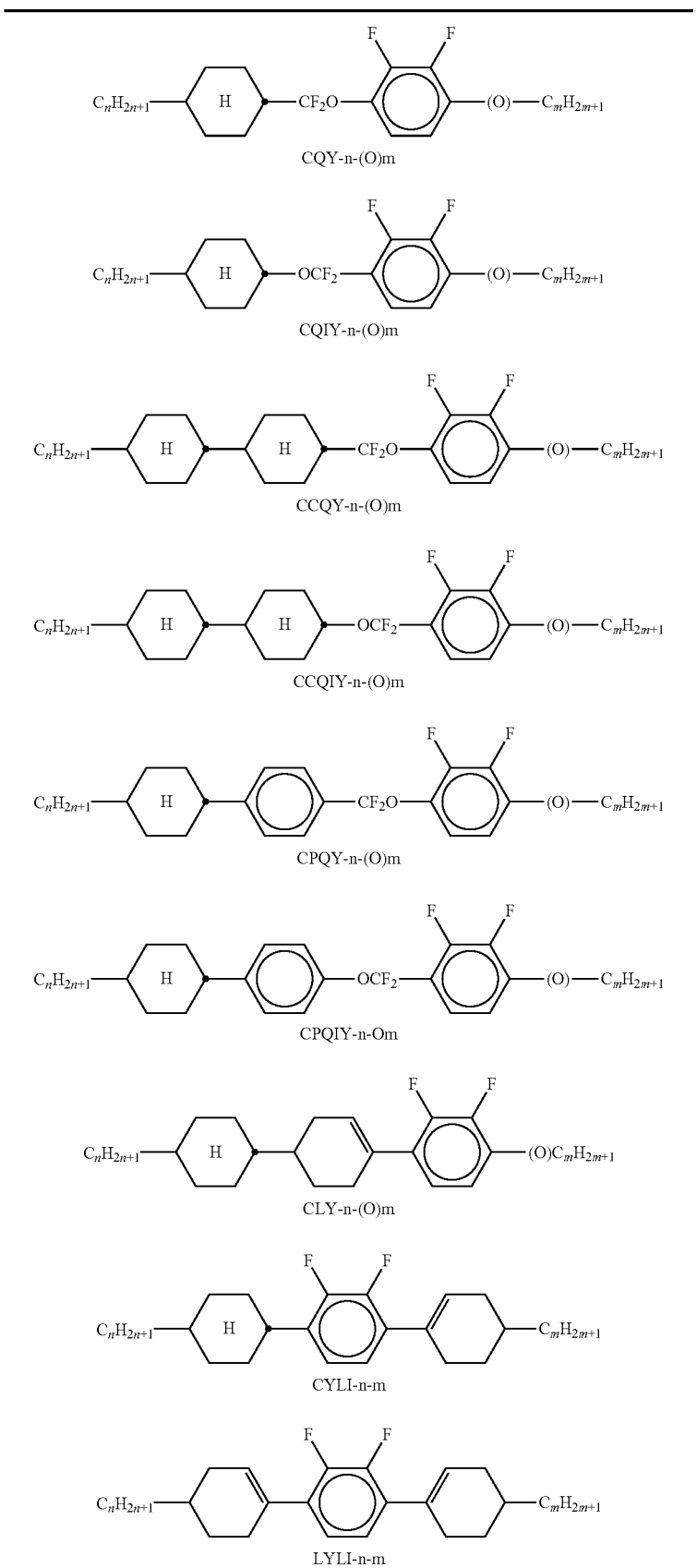

TABLE A-continued
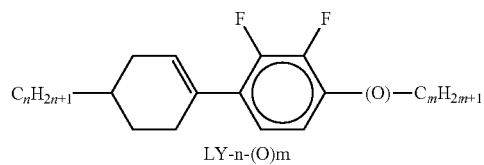
LY-n-(O)m
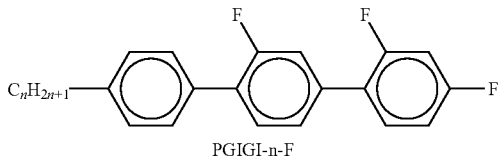
PGIGI-n-F
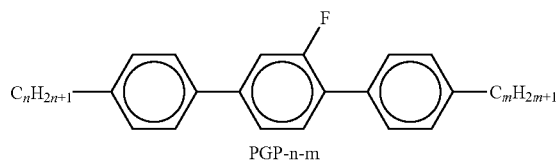
PGP-n-m
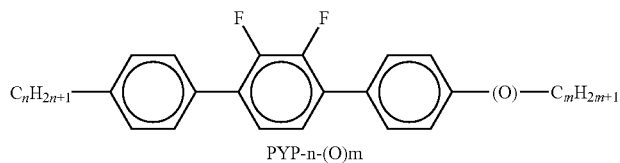
PYP-n-(O)m
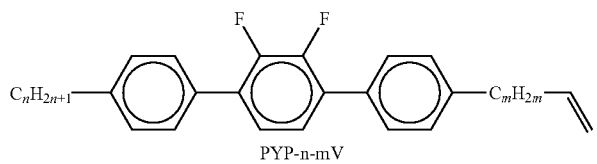
PYP-n-mV
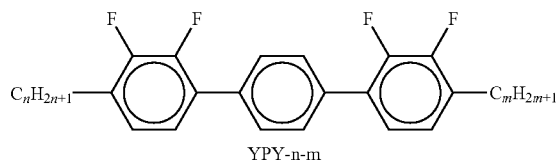
YPY-n-m
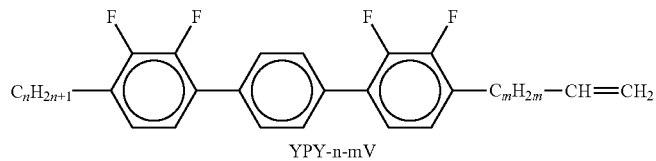
YPY-n-mV
BCH-nm
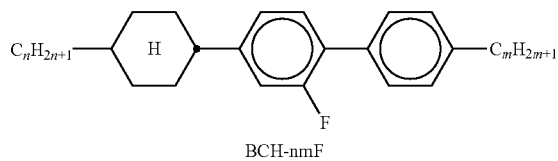
BCH-nmF TABLE A-continued
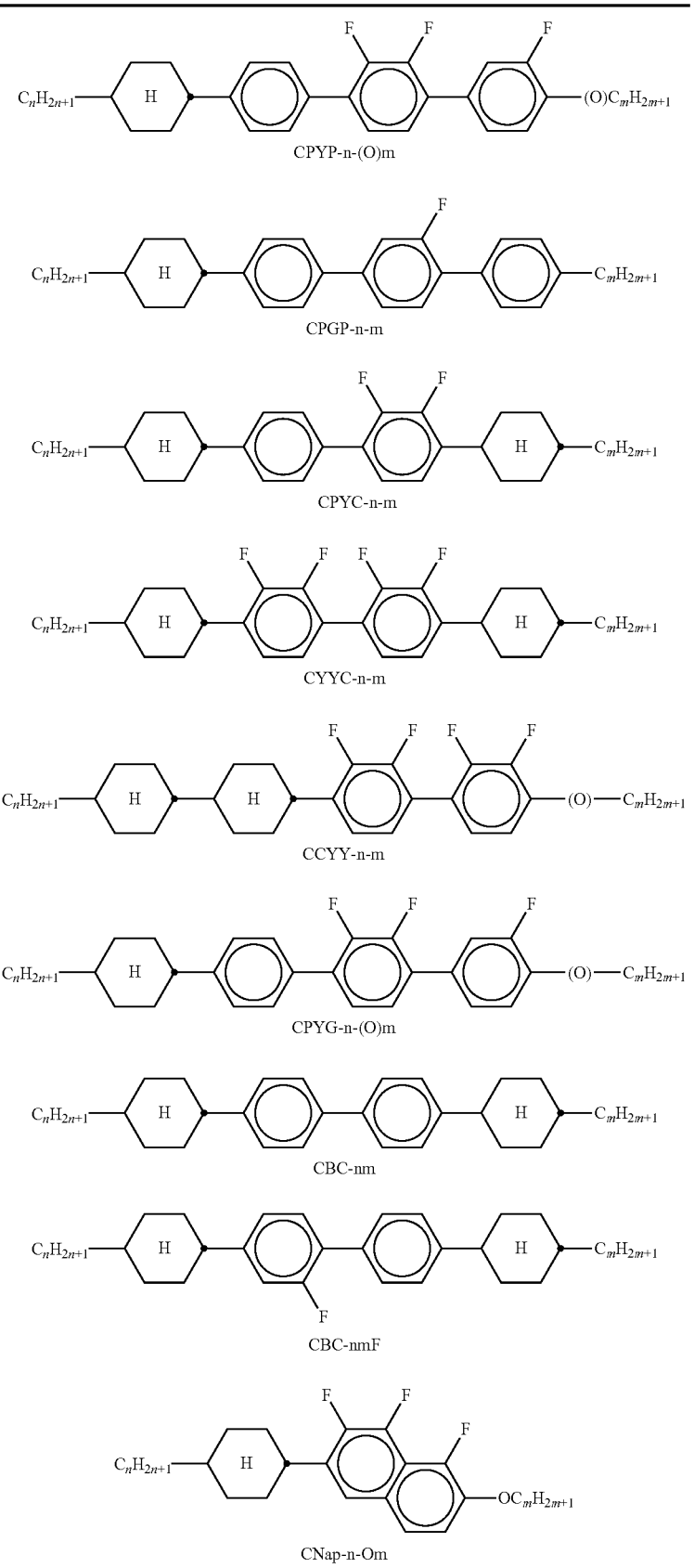

TABLE A-continued
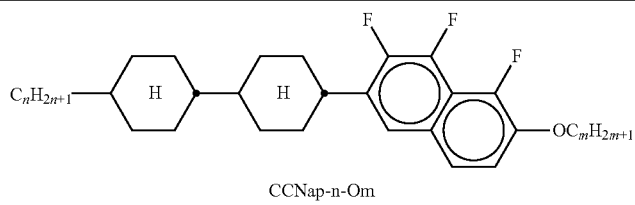
CCNap-n-Om
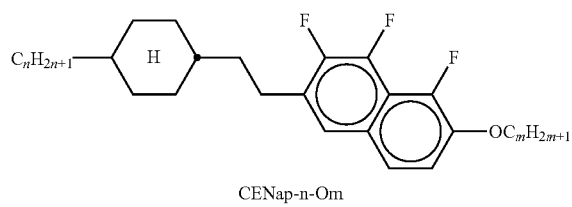
CENap-n-Om
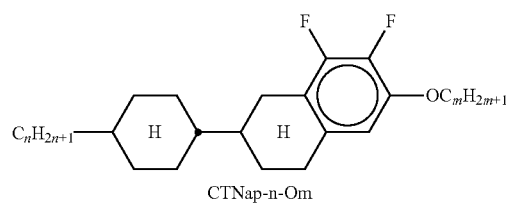
CTNap-n-Om
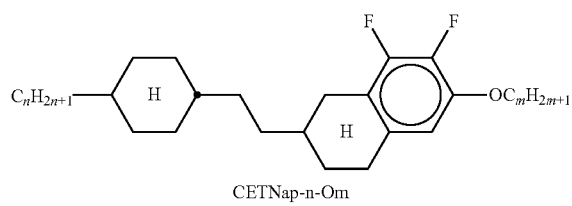
CETNap-n-Om
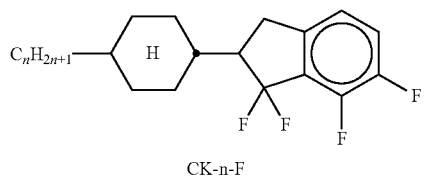
CK-n-F
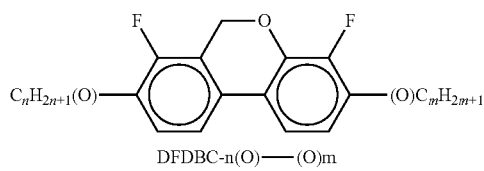
DFDBC-n(O)—(O)m
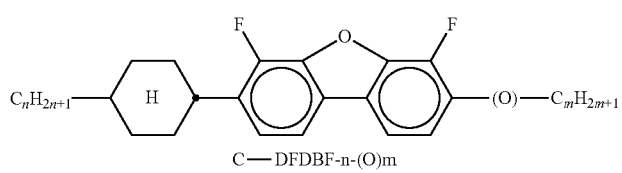
C—DFDBF-n-(O)m
In a preferred embodiment of the present invention, the LC media according to the invention comprise one or more compounds selected from the group consisting of compounds from Table A.

TABLE B
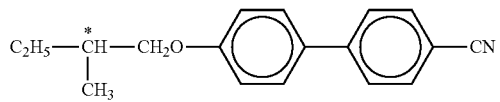
C 15
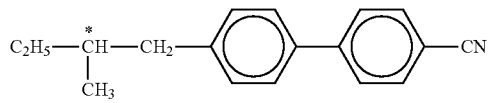
CB 15
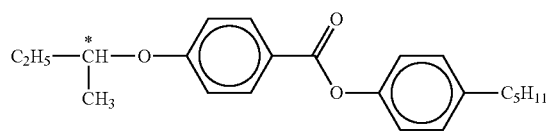
CM 21
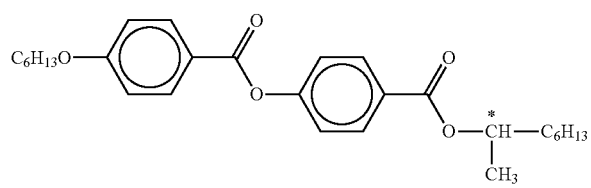
R/S-811
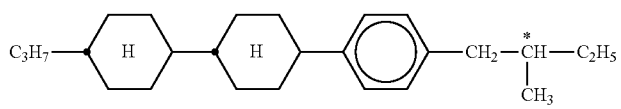
CM 44
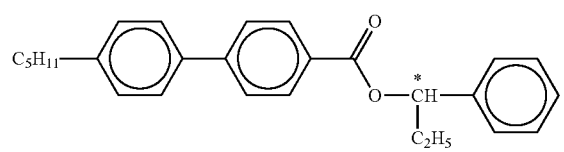
CM 45
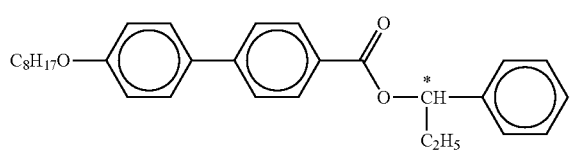
CM 47
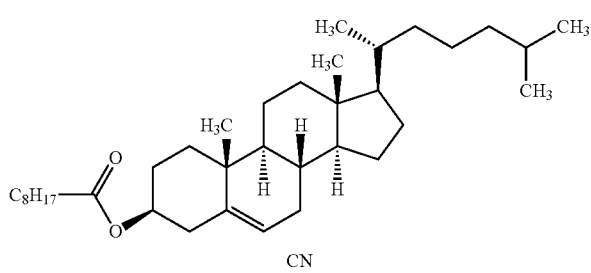
CN TABLE B-continued

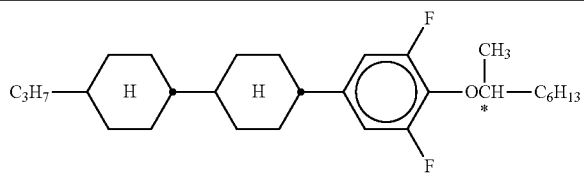
R/S-2011

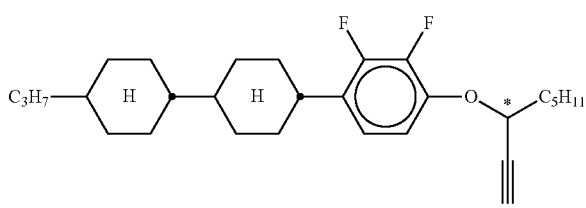
R/S-3011

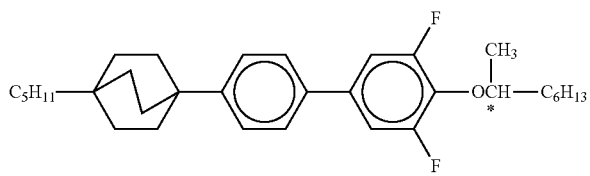
R/S-4011

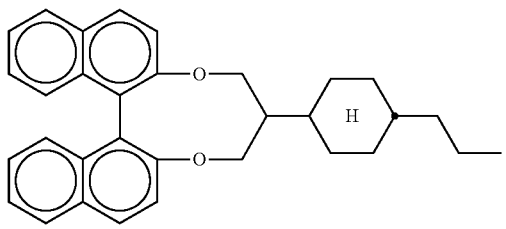
R/S-5011

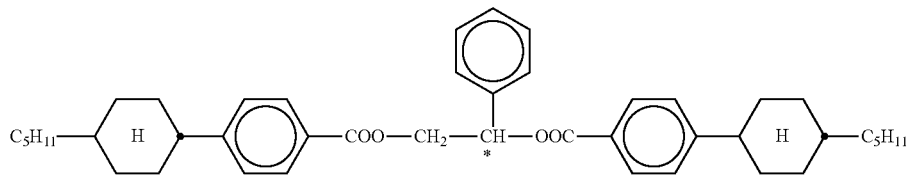
R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

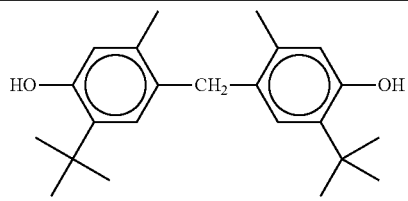

TABLE C-continued
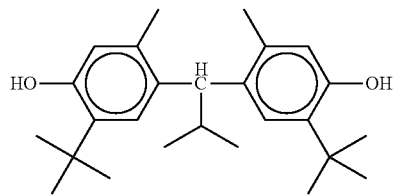
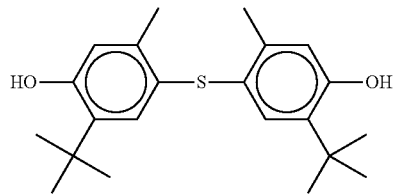
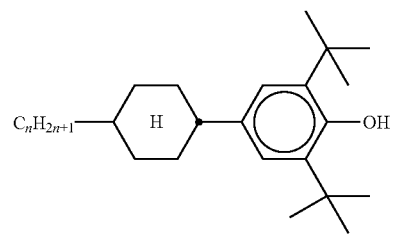
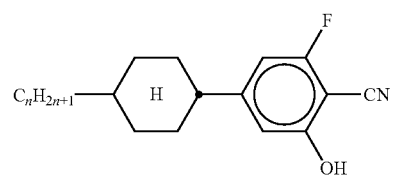
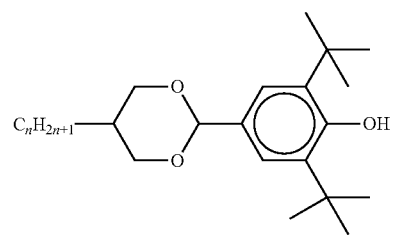
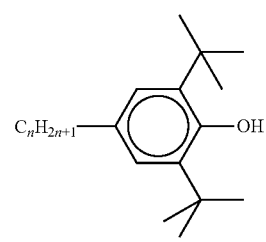
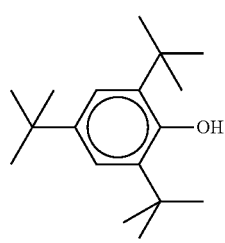

TABLE C-continued
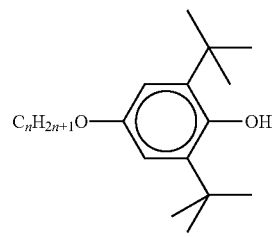
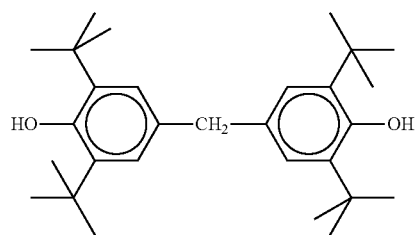
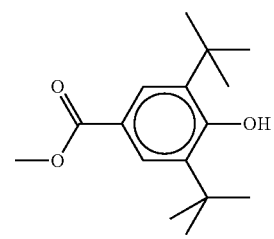
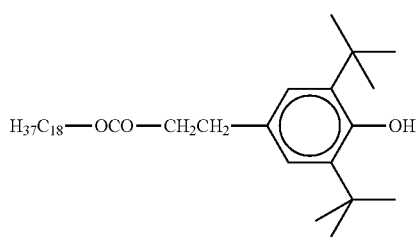
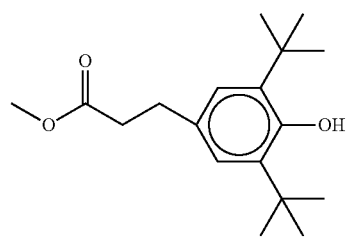
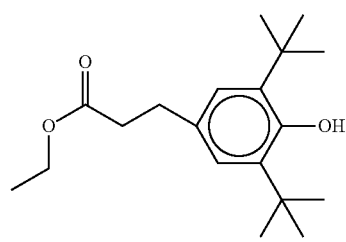

TABLE C-continued
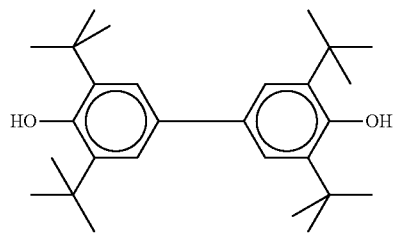
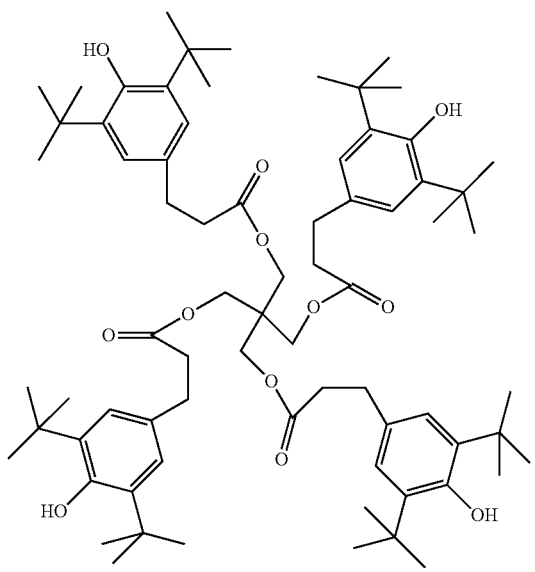 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
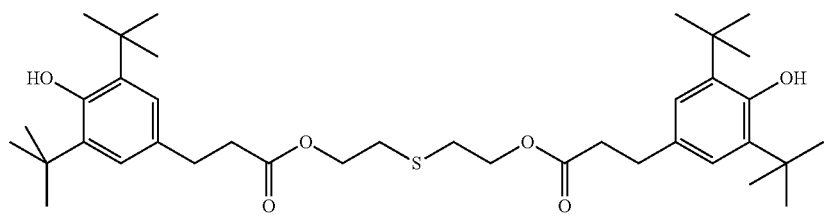 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
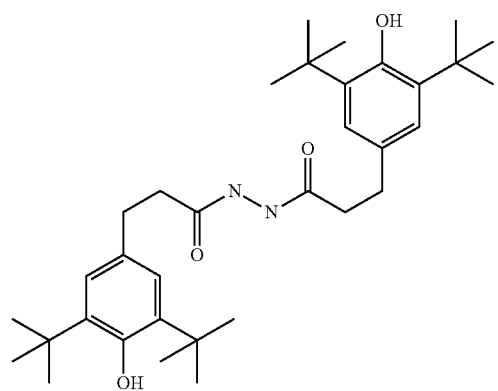 [SMILES: CC(C)(C)c1cc(CCC(=O)NNC(=O)CCc2cc(C(C)(C)C)c(O)c(C(C)(C)C)c2)cc(C(C)(C)C)c1O]

TABLE C-continued
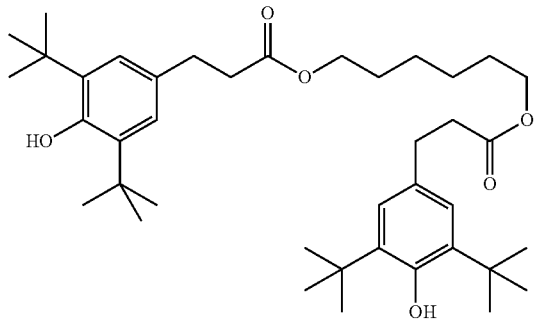 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
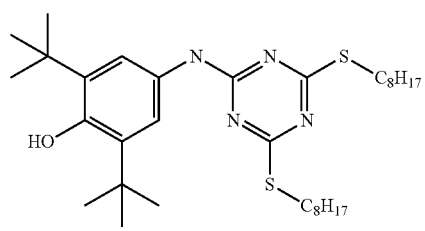
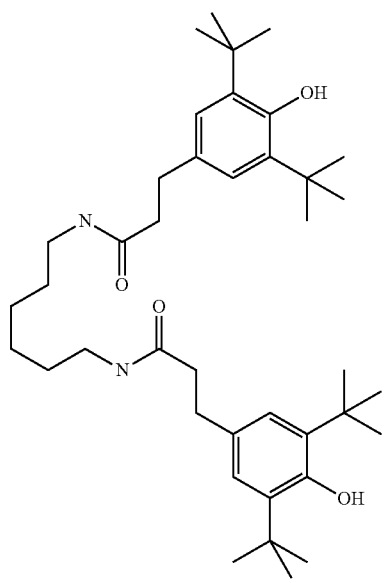 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
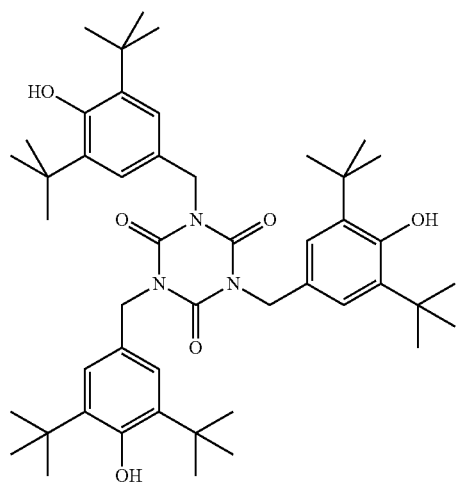 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
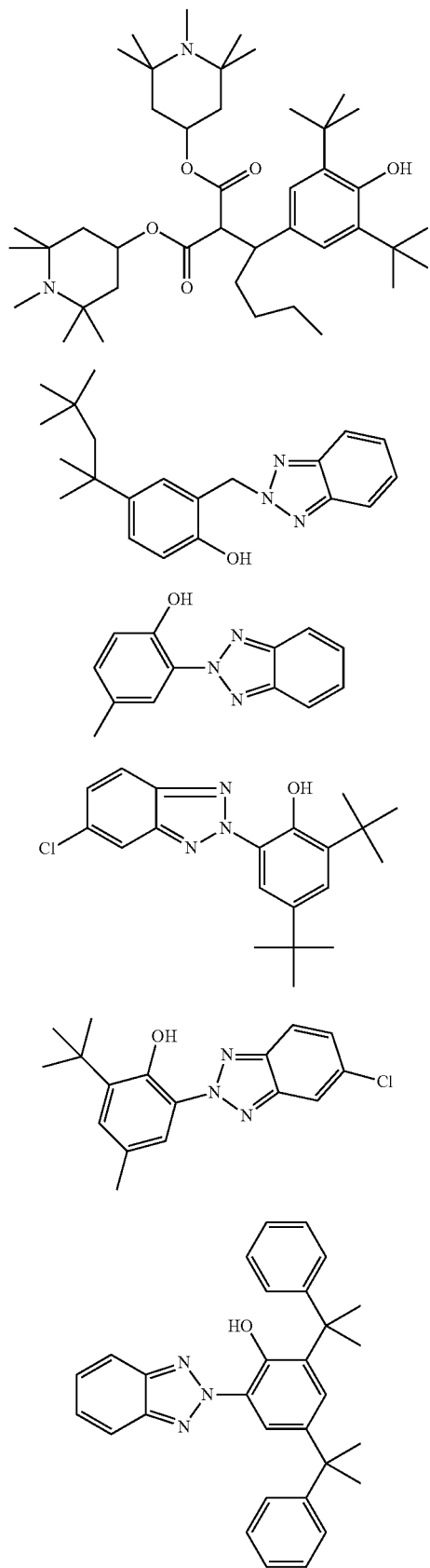

TABLE C-continued
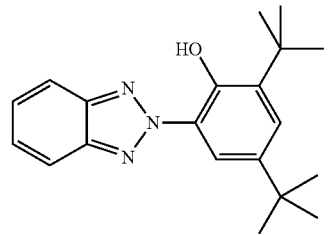 [SMILES: CC(C)(C)c1cc(-n2nc3ccccc3n2)c(O)c(C(C)(C)C)c1]
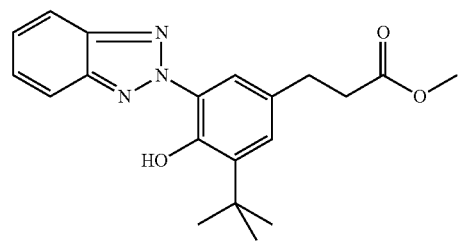 [SMILES: COC(=O)CCc1cc(-n2nc3ccccc3n2)c(O)c(C(C)(C)C)c1]
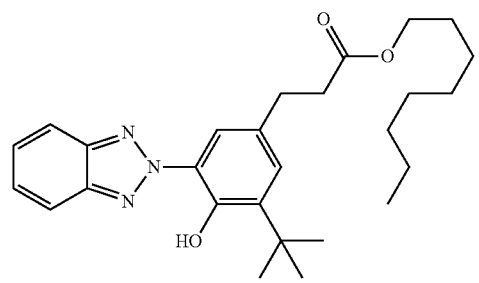 [SMILES: CCCCCCCCOC(=O)CCc1cc(-n2nc3ccccc3n2)c(O)c(C(C)(C)C)c1]
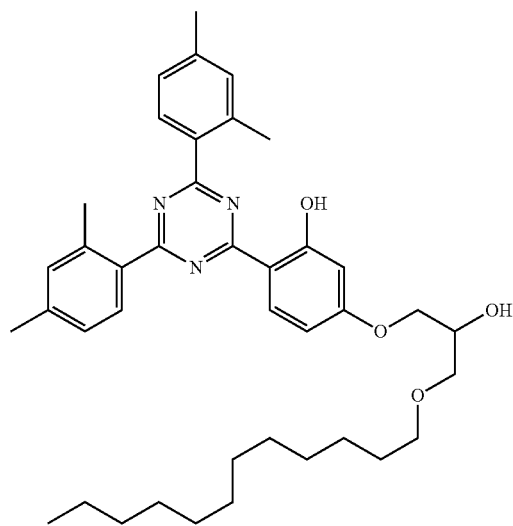 [SMILES: CCCCCCCCCCCCOCC(O)COc1ccc(-c2nc(-c3ccc(C)cc3C)nc(-c3ccc(C)cc3C)n2)c(O)c1]

TABLE C-continued

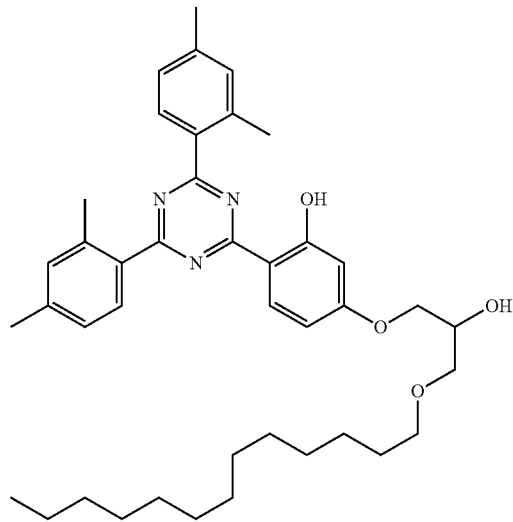 [SMILES: CCCCCCCCCCCCCOCC(O)COc1ccc(-c2nc(-c3ccc(C)cc3C)nc(-c3ccc(C)cc3C)n2)c(O)c1]

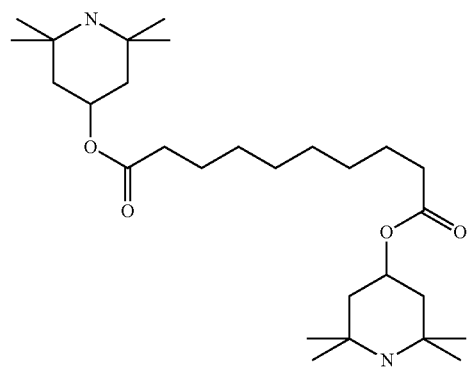

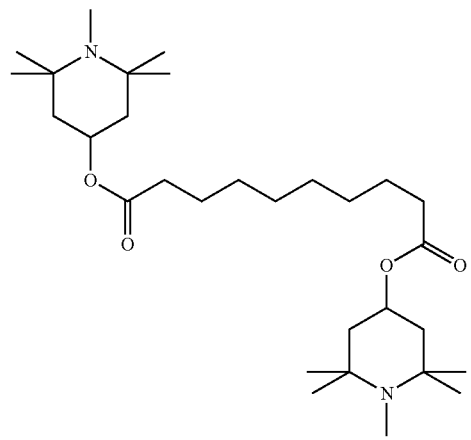

Table C shows possible stabilisers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D
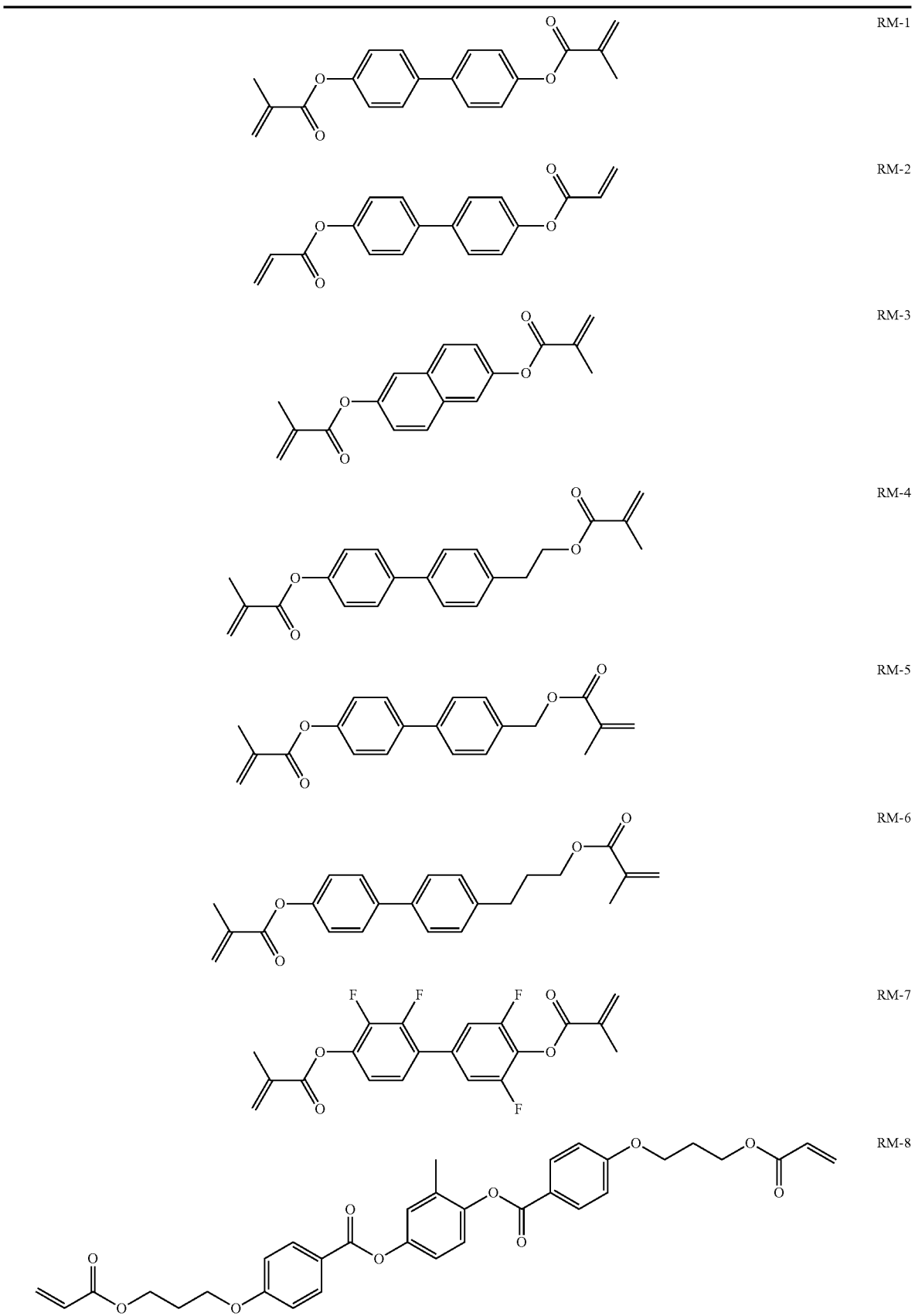

TABLE D-continued
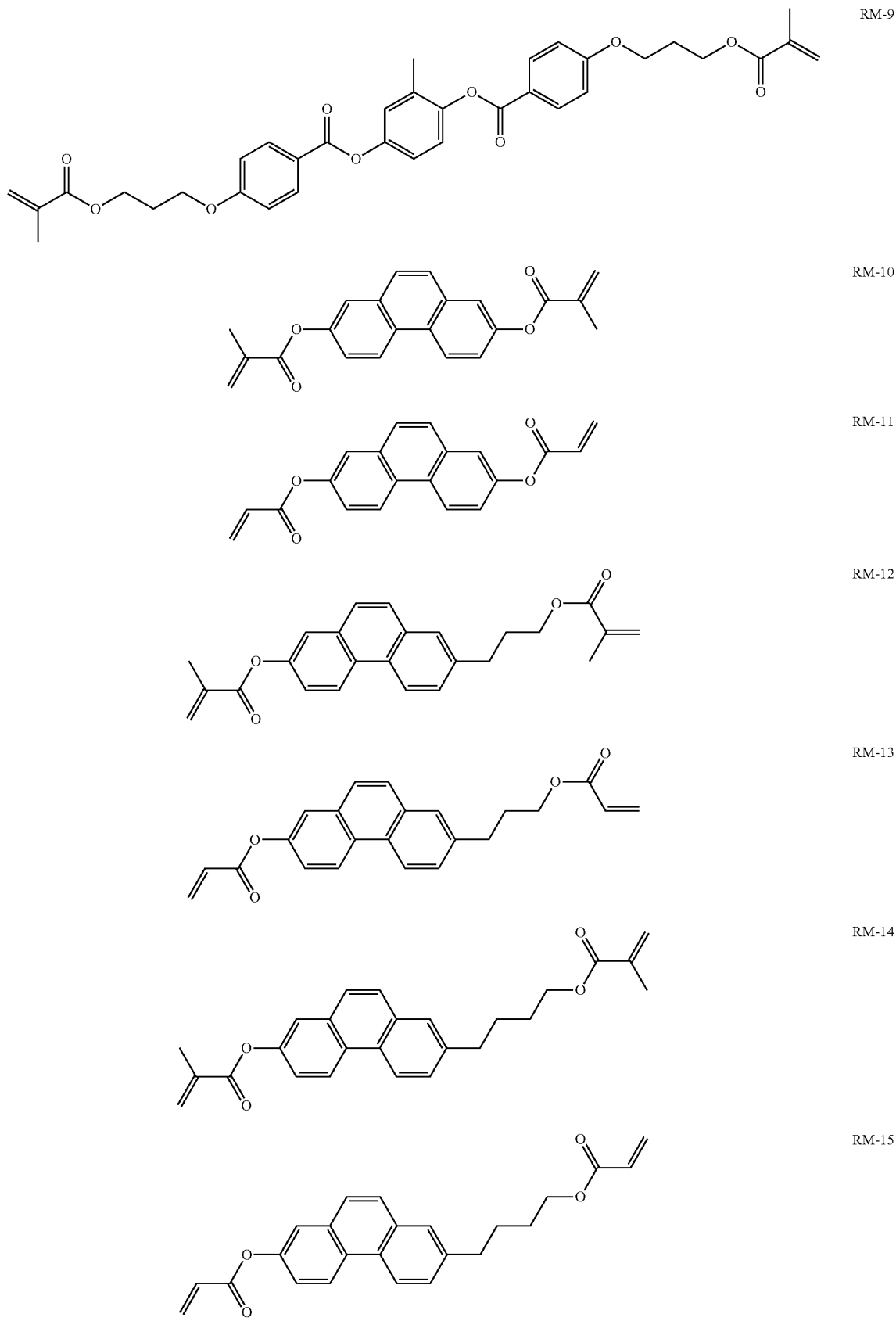

TABLE D-continued
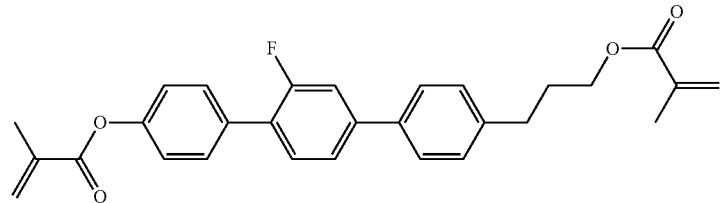 [SMILES: C=C(C)C(=O)OCCCc1ccc(-c2ccc(-c3ccc(OC(=O)C(=C)C)cc3)c(F)c2)cc1] RM-16
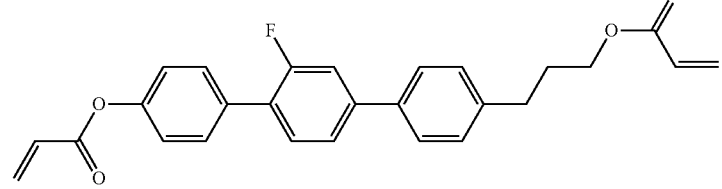 RM-17
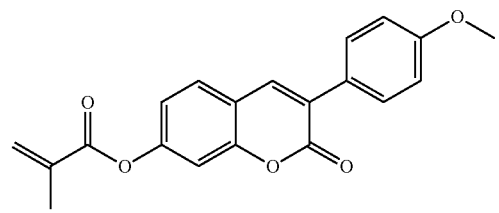 [SMILES: C=C(C)C(=O)Oc1ccc2cc(-c3ccc(OC)cc3)c(=O)oc2c1] RM-18
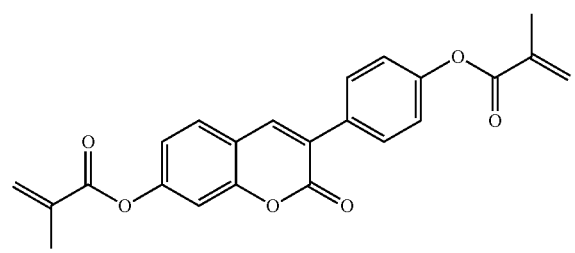 [SMILES: C=C(C)C(=O)Oc1ccc(-c2cc3ccc(OC(=O)C(=C)C)cc3oc2=O)cc1] RM-19
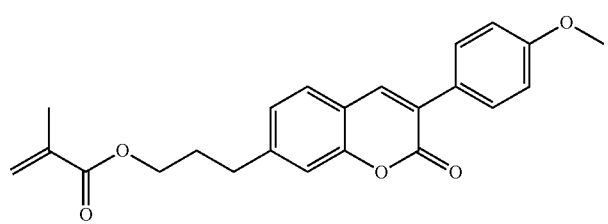 [SMILES: C=C(C)C(=O)OCCCc1ccc2cc(-c3ccc(OC)cc3)c(=O)oc2c1] RM-20
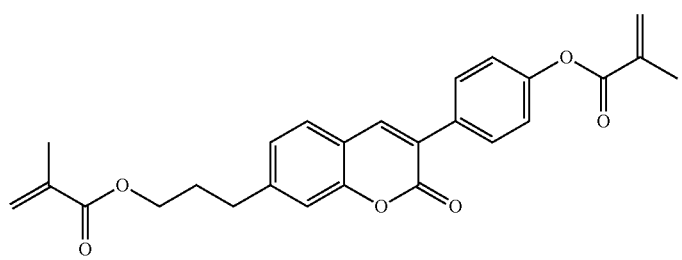 [SMILES: C=C(C)C(=O)OCCCc1ccc2cc(-c3ccc(OC(=O)C(=C)C)cc3)c(=O)oc2c1] RM-21
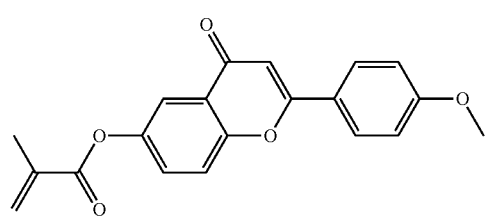 [SMILES: C=C(C)C(=O)Oc1ccc2oc(-c3ccc(OC)cc3)cc(=O)c2c1] RM-22

TABLE D-continued
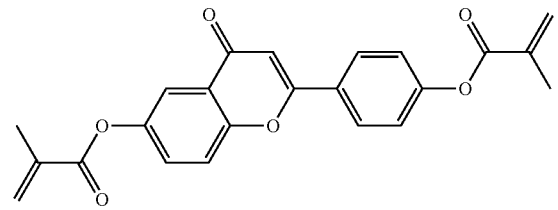 [SMILES: C=C(C)C(=O)Oc1ccc(-c2cc(=O)c3cc(OC(=O)C(=C)C)ccc3o2)cc1] RM-23
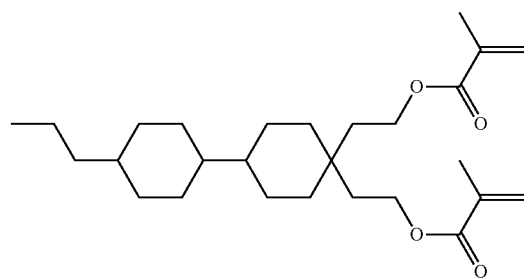 [SMILES: C=C(C)C(=O)OCCC1(CCOC(=O)C(=C)C)CCC(C2CCC(CCC)CC2)CC1] RM-24
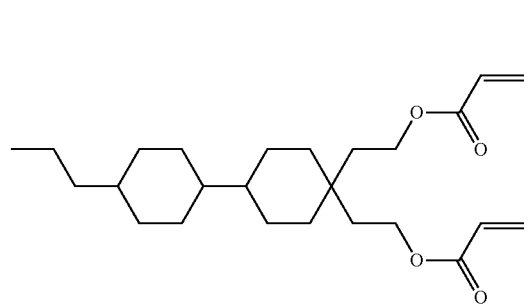 [SMILES: C=CC(=O)OCCC1(CCOC(=O)C=C)CCC(C2CCC(CCC)CC2)CC1] RM-25
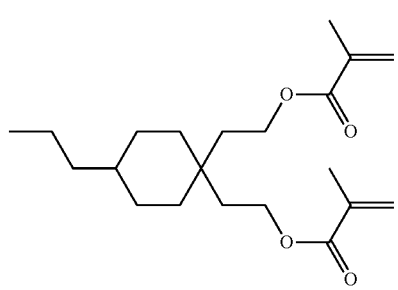 [SMILES: C=C(C)C(=O)OCCC1(CCOC(=O)C(=C)C)CCC(CCC)CC1] RM-26
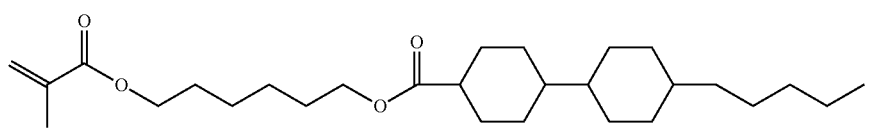 [SMILES: C=C(C)C(=O)OCCCCCCOC(=O)C1CCC(C2CCC(CCCCC)CC2)CC1] RM-27
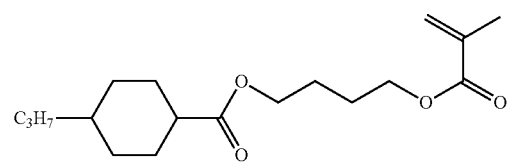 RM-28

TABLE D-continued
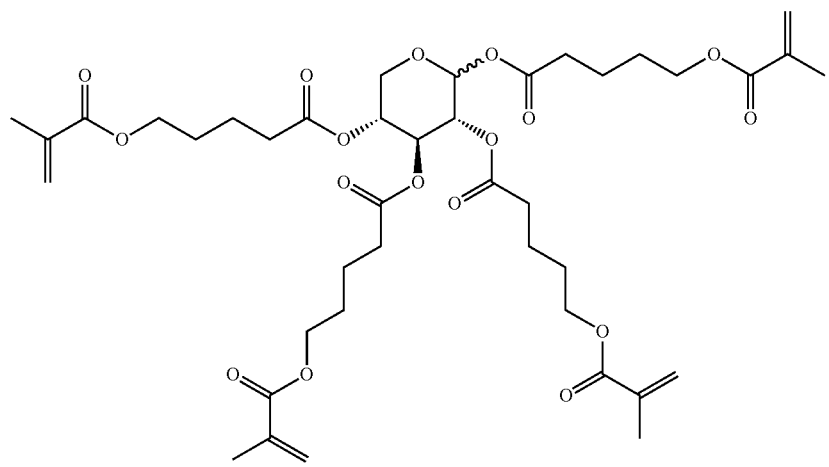 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-29
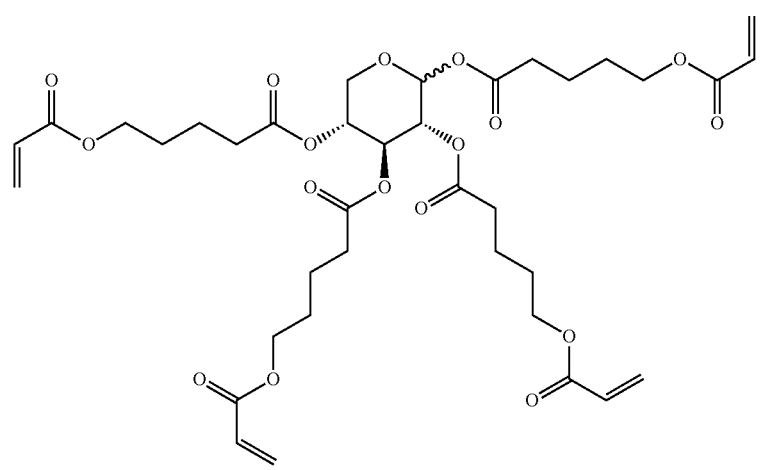 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-30
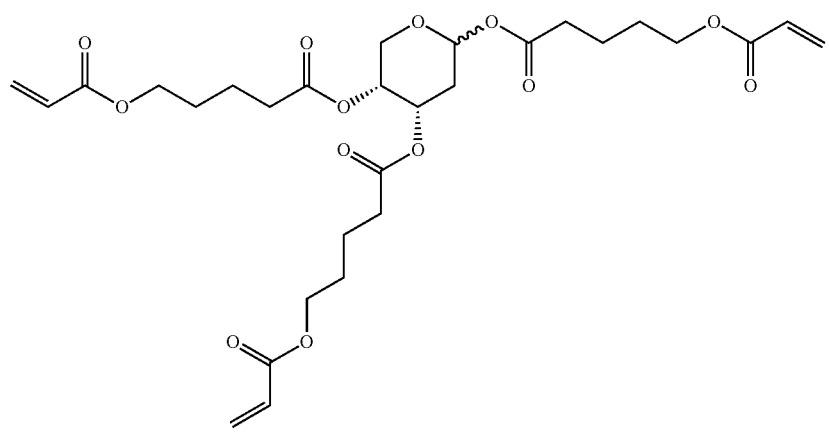 [SMILES: C=CC(=O)OCCCCC(=O)OC1C[C@H](OC(=O)CCCCOC(=O)C=C)[C@H](OC(=O)CCCCOC(=O)C=C)CO1]
RM-31
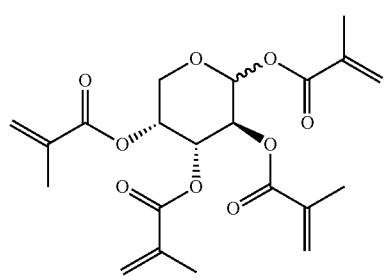 [SMILES: C=C(C)C(=O)OC1OC[C@@H](OC(=O)C(=C)C)[C@@H](OC(=O)C(=C)C)[C@@H]1OC(=O)C(=C)C]
RM-32

Table D shows illustrative compounds which can be used in the LC media in accordance with the present invention, preferably as reactive mesogenic compounds.

In a preferred embodiment of the present invention, the mesogenic media comprise one or more compounds selected from the group of the compounds from Table D.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\varepsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

The display used for measurement of the capacitive threshold voltage consists of two plane-parallel glass outer plates at a separation of 20 μm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 μm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light (usually 365 nm) of defined intensity for a prespecified time, with a voltage simultaneously being applied to the display (usually 10 V to 30 V alternating current, 1 kHz). In the examples, unless indicated otherwise, a 28 mW/cm² mercury vapour lamp is used, and the intensity is measured using a standard UV meter (model Ushio UNI meter) fitted with a 365 nm band-pass filter.

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into TN-VHR test cells (rubbed at 90°, TN-polyimide alignment layer, layer thickness d≈4 μm). The HR value is determined after 5 min at 100° C. before and after UV exposure for 2 h (sun test) at 1 V, 60 Hz, 64 μs pulse (measuring instrument: Autronic-Melchers VHRM-105).

EXAMPLE 1

4'-[4-(2-Methylacryloyloxy)but-1-ynyl]biphenyl-4-yl 2-methylacrylate (1)

1.1 4'-(4-Hydroxybut-1-ynyl)biphenyl-4-ol

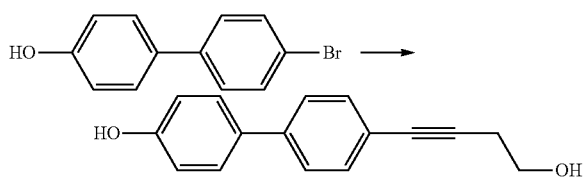

17.2 g (69.0 mmol) of 4-bromo-4'-hydroxybiphenyl, 10.0 g (143 mmol) of but-3-yn-1-ol, 2.00 g (2.85 mmol) of bis(triphenylphosphine)palladium(II) chloride, 0.7 g of copper(I) iodide and 25 ml (178 mmol) of diisopropylamine are heated under reflux overnight in 150 ml of THF. The batch is subsequently added to 200 ml of MTB ether, 400 ml of water are added, and the mixture is acidified using hydrochloric acid. The aqueous phase is separated off and extracted three times with ethyl acetate. The combined org. phases are evaporated in vacuo, and the residue is filtered through silica gel with dichloromethane/ethyl acetate (3:1). Crystallisation of the crude product from toluene gives 4'-(4-hydroxybut-1-ynyl)biphenyl-4-ol as a colourless solid.

1.2 4'-[4-(2-Methylacryloyloxy)but-1-ynyl]biphenyl-4-yl 2-methylacrylate (1)

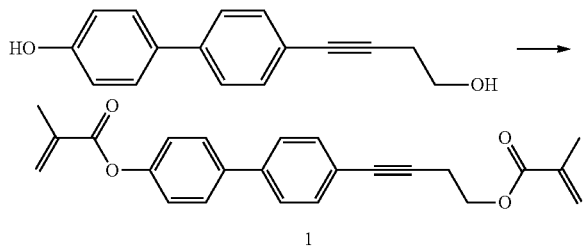

13.2 g (55.4 mmol) of 4'-(4-hydroxybut-1-ynyl)biphenyl-4-ol are dissolved in 100 ml of dichloromethane, and, after addition of 22 ml (159 mmol) of triethylamine with ice-cooling, a solution of 14.0 g (134 mmol) of acryloyl chloride in 10 ml of dichloromethane is added. After 1 h, the batch is filtered through basic aluminium oxide and silica gel and evaporated. Crystallisation from ethanol gives 4'-[4-(2-methylacryloyloxy)but-1-ynyl]-biphenyl-4-yl 2-methylacrylate 1 as colourless crystals of m.p. 86° C.

$^1$H-NMR (400 MHz, CDCl$_3$):

δ=1.98 ppm (m$_c$, 3H, Me), 2.08 (m$_c$, 3H, Me), 2.82 (t, J=6.9 Hz, 2H, CH$_2$CH$_2$O—), 4.35 (t, J=6.9 Hz, 2H, CH$_2$CH$_2$O—), 5.60 (quint., J=1.6 Hz, 1H, C=CH$_A$H$_B$), 5.78 (quint., J=1.6 Hz, 1H, C=CH$_A$H$_B$), 6.18 (m$_c$, 1H, C=CH$_A$H$_B$), 6.37 (m$_c$, 1H, C=CH$_A$H$_B$), 7.20 (AB-m$_c$, in which: J=8.7 Hz, 2H, Ar—H), 7.46 (AB-m$_c$, in which: J=8.5 Hz, 2H, Ar—H), 7.51 (AB-m$_c$, in which: J=8.5 Hz, 2H, Ar—H), 7.59 (AB-m$_c$, in which: J=8.7 Hz, 2H, Ar—H).

EXAMPLE 2

4-{4'-[4-(2-Methylacryloyloxy)but-1-ynyl]biphenyl-4-yl}but-3-ynyl 2-methylacrylate (2)

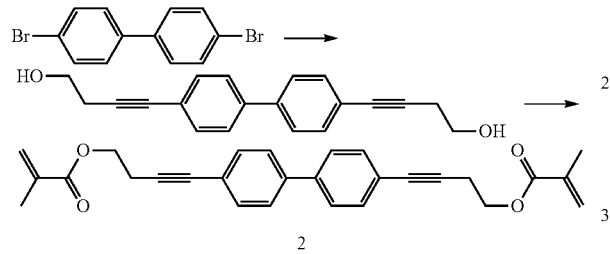

Analogously to Example 1, 4,4'-dibromobiphenyl gives 4-{4'-[4-(2-methylacryloyloxy)but-1-ynyl]biphenyl-4-yl}but-3-ynyl 2-methylacrylate 2 as a colourless solid of m.p. 86° C.

$^1$H-NMR (400 MHz, CDCl$_3$):

δ=1.98 ppm (m$_c$, 6 H, Me), 2.82 (t, J=6.9 Hz, 4H, —CECCH$_2$—), 4.35 (t, J=6.9 Hz, 4H, —CH$_2$O—), 5.60 (quint., J=1.6 Hz, 2H, —C=CH$_A$H$_B$—), 6.18 (m$_c$, 2 H, C=CH$_A$H$_B$), 7.48 (AB-m$_c$, in which: J=8.4 Hz, 8H, Ar—H).

EXAMPLE 3

4-{6-[4-(2-Methylacryloyloxy)but-1-ynyl]naphthalen-2-yl}but-3-ynyl 2-methylacrylate (3)

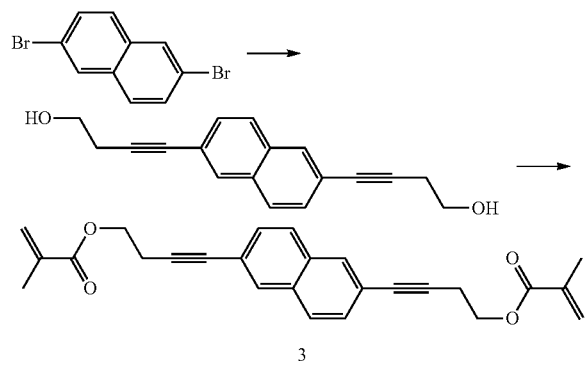

Analogously to Example 2, 2,5-dibromonaphthalene gives 4-{6-[4-(2-methylacryloyloxy)but-1-ynyl]naphthalen-2-yl}but-3-ynyl 2-methylacrylate 3 as a colourless solid of m.p. 93° C.

EXAMPLE 4

4'-[4-(2-Methylacryloyloxy)prop-1-ynyl]biphenyl-4-yl 2-methylacrylate (4)

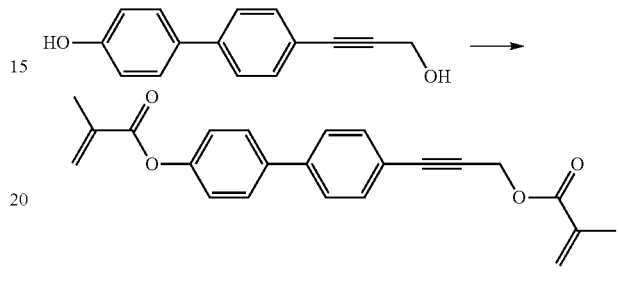

4'-[4-(2-Methylacryloyloxy)but-1-ynyl]biphenyl-4-yl 2-methylacrylate 4 is prepared analogously to Example 1, giving colourless crystals of m.p. 80° C.

$^1$H-NMR (400 MHz, CDCl$_3$):

δ=2.00 ppm (m$_c$, 3H, Me), 2.08 (m$_c$, 3H, Me), 5.01 (s, 2H, CH$_2$O—), 5.64 (quint., J=1.5 Hz, 1H, C=CH$_A$H$_B$), 5.78 (quint., J=1.5 Hz, 1H, C=CH$_A$H$_B$), 6.22 (m$_c$, 1H, C=CH$_A$H$_B$), 6.37 (m$_c$, 1H, C=CH$_A$H$_B$), 7.20 (AB-m$_c$, in which: J=8.7 Hz, 2H, Ar—H), 7.53 (s, 4H, Ar—H), 7.59 (AB-m$_c$, in which: J=8.7 Hz, 2H, Ar—H).

EXAMPLE 5

6-[3-(2-Methylacryloyloxy)prop-1-ynyl]naphthalen-2-yl 2-methylacrylate (5)

5.1 6-(3-Hydroxyprop-1-ynyl)naphthalen-2-ol

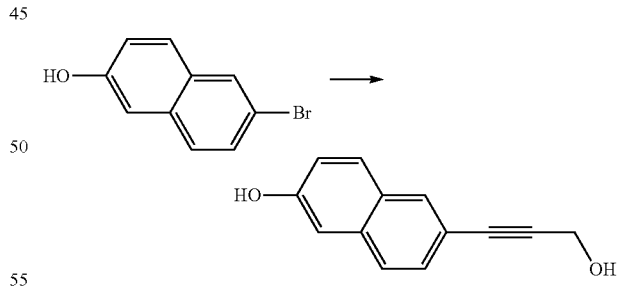

9.00 g (40.3 mmol) of 6-bromonaphthalen-2-ol, 3.5 g (62.4 mmol) of prop-2-yn-1-ol, 1.00 g (1.43 mmol) of bis(triphenylphosphine)palladium(II) chloride, 0.5 g (2.63 mmol) of copper(I) iodide and 10 ml of diisopropylamine are left to stir overnight at 80° C. in 60 ml of DMF. The batch is subsequently added to 200 ml of ethyl acetate, 400 ml of water are added, and the mixture is acidified using hydrochloric acid. The aqueous phase is separated off and extracted three times with ethyl acetate. The combined org. phases are evaporated in vacuo, and the residue is filtered through silica gel with toluene/ethyl acetate (2:1). Crystallisation of the crude product from toluene/heptane gives 6-(3-hydroxyprop-1-ynyl)naphthalen-2-ol as a colourless solid.

¹H-NMR (400 MHz, CDCl₃):

δ=1.67 ppm (t, J=6.2 Hz, 1H, OH), 4.54 (d, J=6.2 Hz, 2H, —CH₂OH), 5.10 (s, 1H, OH), 7.12 (s, br., 2H, Ar—H), 7.43 (dd, J=1.6 Hz, J=8.5 Hz, 1H, Ar—H), 7.61 (d, J=8.5 Hz, 1H, Ar—H), 7.71 (dd, J=1.4 Hz, J=8.4 Hz, 1H, Ar—H), 7.89 (s, 1H, Ar—H).

5.2 6-[3-(2-Methylacryloyloxy)prop-1-ynyl]naphthalen-2-yl 2-methylacrylate (5)

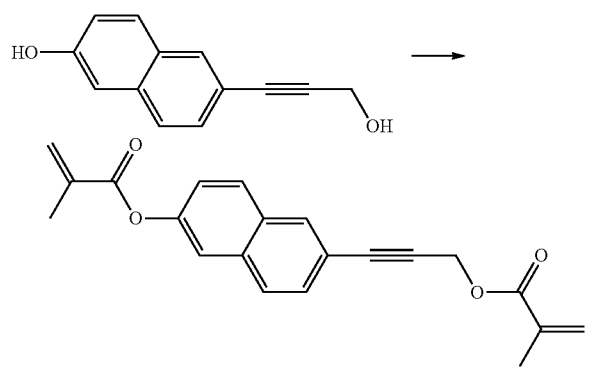

Analogously to Example 1.2, 6-(3-hydroxyprop-1-ynyl)naphthalen-2-ol gives 6-[3-(2-methylacryloyloxy)prop-1-ynyl]naphthalen-2-yl 2-methylacrylate 5 as colourless crystals of m.p. 60° C.

¹H-NMR (400 MHz, CDCl₃):

δ=2.00 ppm (m_c, 3H, Me), 2.10 (m_c, 3H, Me), 5.03 (s, 2H, CH₂O—), 5.65 (quint., J=1.5 Hz, 1H, C=CH_AH_B), 5.80 (quint., J=1.5 Hz, 1H, C=CH_AH_B), 6.23 (m_c, 1H, C=CH_AH_B), 6.40 (m_c, 1H, C=CH_AH_B), 7.28 (dd, J=2.3 Hz, J=8.9 Hz, 1H, Ar—H), 7.51 (dd, J=1.6 Hz, J=8.5 Hz, 1H, Ar—H), 7.58 (d, J=2.2 Hz, 1H, Ar—H), 7.74 (d, J=9.0 Hz, Ar—H), 7.82 (Ar—H), 8.00 (s, 1H, Ar—H).

EXAMPLE 6

4-[7-(2-Methylacryloyloxy)-9,10-dihydrophenanthren-2-yl]but-3-ynyl 2-methylacrylate (6)

6.1 7-Iodo-9,10-dihydrophenanthren-2-ol

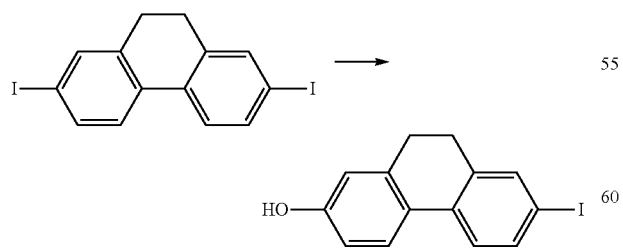

8.8 g (20.4 mmol) of 2,7-diiodo-9,10-dihydrophenanthrene are dissolved in 250 ml of THF, and, after addition of 7.0 ml (30.5 mmol) of triisopropyl borate at −70° C., 16.5 ml of a 15 percent solution of n-butyllithium in hexane are added. After 1 h, the batch is hydrolysed using 2 N hydrochloric acid and warmed to room temp. The solution is extracted twice with MTB ether, dried over sodium sulfate, the solvent is removed in vacuo, and the crude product obtained is suspended in 80 ml of toluene and 30 ml of 2 N sodium hydroxide solution with vigorous stirring. After addition of 8 ml of 30 percent hydrogen peroxide, the batch is stirred at 30-40° C. for 30 min with cooling, 200 ml of water are added, and the mixture is acidified using 2 N hydrochloric acid. The aqueous phase is separated off and extracted three times with ethyl acetate. The combined org. phases are washed with dil. ammonium iron(II) sulfate solution and dried over sodium sulfate. The solvent is removed in vacuo, and the residue is filtered through silica gel with dichloromethane, giving 7-iodo-9,10-dihydro-phenanthren-2-ol as a colourless solid.

¹H-NMR (400 MHz, DMSO-d₆):

δ=2.72 ppm (m_c, 4 H, —CH₂CH₂—), 6.66 (6, J=2.4 Hz, 1H, Ar—H), 6.70 (dd, J=2.4 Hz, J=8.5 Hz, 1H, Ar—H), 7.47 (d, J=8.0 Hz, 1H, Ar—H), 7.60 (m_c, 2 H, Ar—H), 9.57 (s, br., 1H, OH).

6.2 7-(4-Hydroxybut-1-ynyl)-9,10-dihydrophenanthren-2-ol

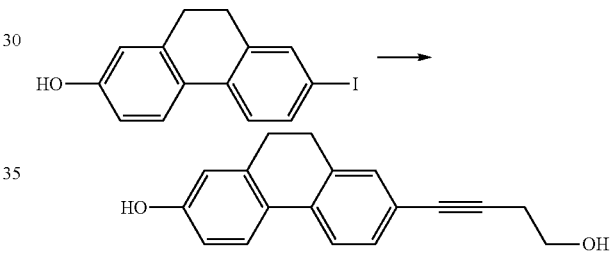

9.0 g (24.6 mmol) of 7-iodo-9,10-dihydrophenanthren-2-ol are initially introduced in 100 ml of THF, 1.0 g (1.43 mmol) of bis(triphenylphosphine)-palladium(II) chloride, 0.3 g (1.58 mmol) of copper(I) iodide and 11 ml of diisopropylamine are added, and a solution of 3.0 g (42.8 mmol) of 1-butyne in 20 ml of THF is subsequently added dropwise with cooling at max. 30° C. The batch is left to stir at room temp. for 1.5 h, added to water and acidified using 2 N hydrochloric acid. The aqueous phase is separated off and extracted three times with ethyl acetate. The combined org. phases are washed with water, dried over sodium sulfate, and the solvent is removed in vacuo. The crude product is filtered through silica gel with dichloromethane/ethyl acetate (3:1) and recrystallised from toluene, giving 7-(4-hydroxybut-1-ynyl)-9,10-dihydrophenanthren-2-ol as a colourless solid.

6.3 4-[7-(2-Methylacryloyloxy)-9,10-dihydrophenanthren-2-yl]but-3-ynyl 2-methylacrylate (6)

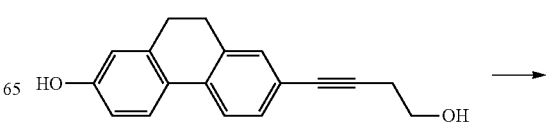

-continued

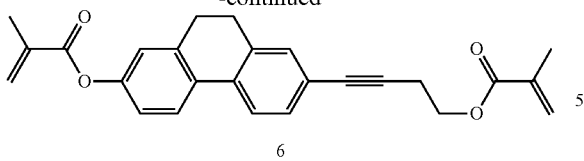

6

Analogously to Example 1.2, 7-(4-hydroxybut-1-ynyl)-9,10-dihydrophenanthren-2-ol gives 4-[7-(2-methylacryloyloxy)-9,10-dihydrophenanthren-2-yl]-but-3-ynyl 2-methylacrylate 6 as a colourless solid of m.p. 72° C.

$^1$H-NMR (400 MHz, CDCl$_3$):

δ=1.98 ppm (s, 3H, CH$_3$), 2.07 (s, 3H, CH$_3$), 2.77-2.88 (m$_c$, 6 H, —CH$_2$CH$_2$— and CH$_2$CH$_2$—O—), 4.35 (t, J=6.9 Hz, 2H, —CH$_2$CH$_2$O—), 5.60 (m$_c$, 1H, CH$_2$=C(Me)—C(O)O—), 5.76 (m$_c$, 1H, CH$_2$=C(Me)—C(O)O—), 6.17 (m$_c$, 1H, CH$_2$=C(Me)—C(O)O—), 6.35 (m$_c$, 1H, CH$_2$=C(Me)—C(O)O—), 6.99-7.09 (m, 2H, Ar—H), 7.26-7.35 (m, 2H, Ar—H), 7.63 (d, J=8.0 Hz, 1H, Ar—H), 7.72 (d, J=8.4 Hz, 1H, Ar—H).

EXAMPLE 7

4-[7-(2-Methylacryloyloxy)-9,10-dihydrophenanthren-2-yl]prop-1-ynyl 2-methylacrylate (7)

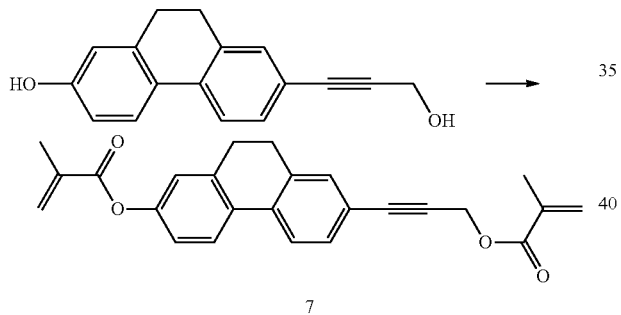

4-[7-(2-Methylacryloyloxy)-9,10-dihydrophenanthren-2-yl]prop-1-ynyl 2-methylacrylate 7 is prepared in a corresponding manner to Example 6, giving colourless crystals of m.p. 103° C.

EXAMPLE 8

7-[3-(2-Methylacryloyloxy)prop-1-ynyl]phenanthren-2-yl 2-methylacrylate (8)

8.1 2-Bromo-7-hydroxyphenanthrene

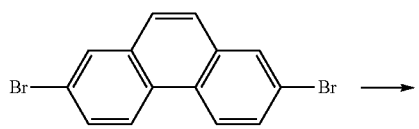

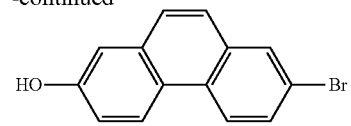

25.0 g (74.4 mmol) of 2,7-dibromophenanthrene (CAS No. 62325-30-8) and 24.0 ml (104 mmol) of triisopropyl borate are initially introduced in 750 ml of THF, and 61 ml (97 mmol) of a 15 percent solution of n-butyllithium in hexane are added dropwise at −70° C. When the addition is complete, the batch is left to stir for a further 1 h, hydrolysed using 2 N hydrochloric acid, and the cooling is removed. After addition of MTB ether, the aqueous phase is removed and extracted with MTB ether. The combined org. phases are dried over sodium sulfate, evaporated, and the residue is recrystallised from heptane. 30 ml of 30 percent hydrogen peroxide are added to the resultant boronic acid in 350 ml of toluene and 150 ml of 2 N sodium hydroxide solution with vigorous stirring at such a rate that the temp. does not exceed 45° C. When the addition is complete, the batch is left to stir for a further 30 min, added to 200 ml of water and acidified using 2 N hydrochloric acid. The aqueous phase is separated off and extracted three times with ethyl acetate. The combined org. phases are washed with dil. ammonium iron(II) sulfate solution and water and dried over sodium sulfate. The solvent is removed in vacuo, and the residue is filtered through silica gel with dichloromethane and recrystallised from toluene, giving 2-bromo-7-hydroxyphenanthrene as colourless crystals.

$^1$H-NMR (400 MHz, DMSO-d$_6$):

δ=7.20-7.27 ppm (m, 2H), 7.73 (m$_c$, 3H), 8.17 (d, J=2.2 Hz, 1H), 8.63 (t, J=9.2 Hz, 2H), 9.95 (s, br., exchangeable, OH).

8.2 7-(3-Hydroxyprop-1-ynyl)phenanthren-2-ol

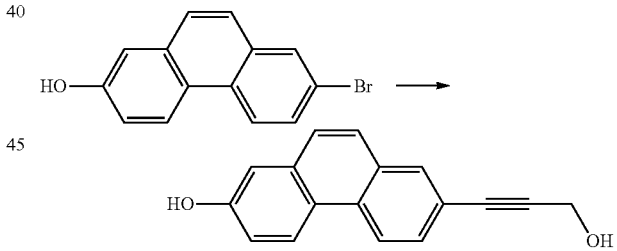

37.2 g (133 mmol) of 7-(3-hydroxyprop-1-ynyl)phenanthren-2-ol and 10.0 g (178 mmol) of 2-propyn-1-ol are initially introduced in 400 ml of DMF and 40 ml of triethylamine, and, after addition of 7.0 g (10.0 mmol) of bis(triphenylphosphine)palladium(II) chloride and 2.0 g (10.5 mmol) of copper(I) iodide, the mixture is left to stir overnight at 80° C. The batch is subsequently added to water, acidified using 2 N hydrochloric acid and extracted three times with ethyl acetate. The combined org. phases are washed with sat. sodium chloride solution and dried over sodium sulfate. The solvent is removed in vacuo, and the residue is purified by chromatography on silica gel with dichloromethane/ethyl acetate (9:1). Crystallisation from toluene gives 7-(3-hydroxyprop-1-ynyl)phenanthren-2-ol as colourless crystals.

$^1$H-NMR (400 MHz, DMSO-d$_6$):

δ=4.36 ppm (s, 2H, CH$_2$O), 5.39 (s, br., 1H, CH$_2$OH), 7.20 (dd, J=2.6 Hz, J=8.9 Hz, 1H, Ar—H), 7.24 (d, J=2.6 Hz, 1H, Ar—H), 7.60 (dd, J=1.6 Hz, J=8.6 Hz, 1H, Ar—H), 7.70 (AB-d, J=9.1 Hz, 1H, Ar—H), 7.74 (AB-d, J=9.1 Hz, 1H, Ar—H), 8.01 (d, J=1.6 Hz, 1H, Ar—H), 8.62 (d, J=5.8 Hz, 1H, Ar—H), 8.64 (d, J=5.5 Hz, 1H, Ar—H), 10.0 (s, br., 1H, OH).

8.3 7-[3-(2-Methylacryloyloxy)prop-1-ynyl]phenanthren-2-yl2-methylacrylate (8)

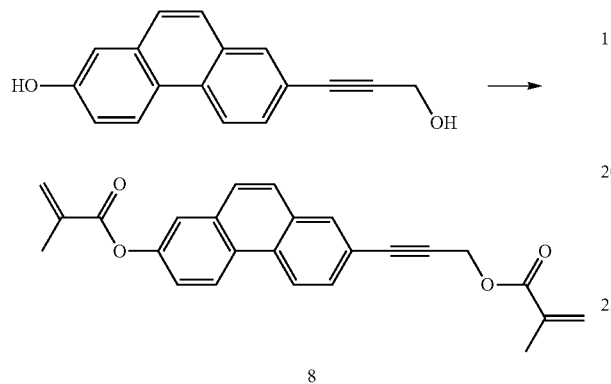

8

Analogously to Ex. 1.2, 7-(3-hydroxyprop-1-ynyl)phenanthren-2-ol gives 7-[3-(2-methylacryloyloxy)prop-1-ynyl]phenanthren-2-yl 2-methylacrylate 8 as colourless crystals of m.p. 105° C.

¹H-NMR (400 MHz, CDCl₃):

δ=2.01 ppm (m_c, 3H, Me), 2.12 (m_c, 3H, Me), 5.06 (s, 2H, CH₂O—), 5.66 (quint., J=1.6 Hz, 1H, C=CH_AH_B), 5.82 (quint., J=1.6 Hz, 1H, C=CH_AH_B), 6.24 (m_c, 1H, C=CH_AH_B), 6.43 (m_c, 1H, C=CH_AH_B), 7.45 (dd, J=2.5 Hz, J=9.0 Hz, 1H, Ar—H), 7.66 (d, J=2.4 Hz, 1H, Ar—H), 7.70 (m_c, 3H, Ar—H), 8.02 (d, J=1.5 Hz, 1H, Ar—H), 8.57 (d, J=8.6 Hz, 1H, Ar—H), 8.65 (d, J=9.1 Hz, 1H, Ar—H).

EXAMPLE 9

7-[4-(2-Methylacryloyloxy)but-1-ynyl]phenanthren-2-yl 2-methylacrylate (9)

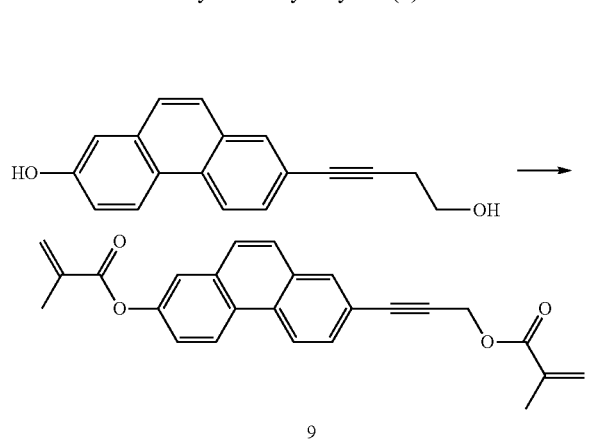

9

7-[4-(2-Methylacryloyloxy)but-1-ynyl]phenanthren-2-yl 2-methylacrylate 9 is prepared analogously to Example 8, giving colourless crystals of m.p. 91° C.

EXAMPLE 10

3-[3-(4-Methoxyphenyl)-2-oxo-2H-chromen-7-yl]prop-2-ynyl (2-methylacrylate) (10)

10.1 3-(4-Methoxyphenyl)-2-oxo-2H-chromen-7-yl trifluoromethanesulfonate

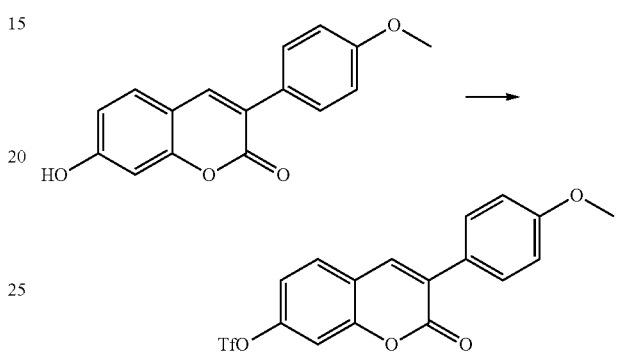

7.0 g (26.1 mmol) of 7-hydroxy-3-(4-methoxyphenyl)chromen-2-one are suspended in 200 ml of dichloromethane, and, after addition of 5 ml (36 mmol) of triethylamine and 100 mg (0.819 mmol) of DMAP with ice-cooling, 5.3 ml (32.3 mmol) of trifluoromethanesulfonic anhydride are added dropwise. After 2 h, the solution is washed with ice-water, and the solvent is removed in vacuo. Chromatography of the crude product on silica gel with toluene/ethyl acetate gives 3-(4-methoxyphenyl)-2-oxo-2H-chromen-7-yl trifluoromethanesulfonate as a yellow solid.

¹H-NMR (400 MHz, CDCl₃):

δ=3.86 (s, 3H, OCH₃), 6.99 (m_c, 2 H, Ar—H), 7.23 (dd, J=2.4 Hz, J=8.6 Hz, 1H, Ar—H), 7.30 (d, J=2.4 Hz, 1H, Ar—H), 7.62 (d, J=8.6 Hz, 1H, Ar—H), 7.67 (m_c, 2 H, Ar—H), 7.76 (s, 1H, —C=CH—).

10.2 7-(3-Hydroxyprop-1-ynyl)-3-(4-methoxyphenyl)chromen-2-one

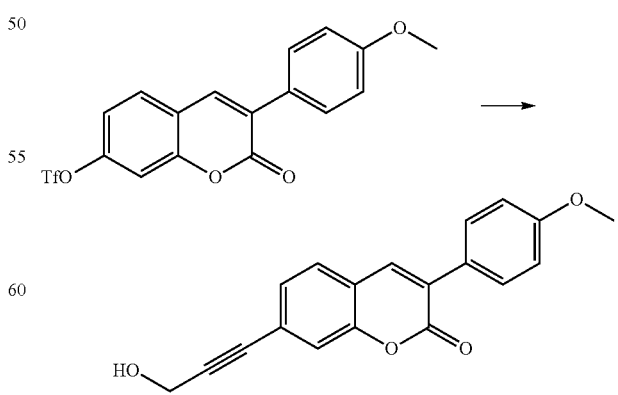

6.90 g (17.2 mmol) of 3-(4-methoxyphenyl)-2-oxo-2H-chromen-7-yl trifluoromethanesulfonate, 1.5 ml (25.4 mmol)

of propyn-1-ol, 12.0 g (36.8 mmol) of caesium carbonate, 150 mg (0.578 mmol) of bis(acetonitrile)palladium(II) chloride and 800 mg (1.68 mmol) of 2-dicyclohexylphosphino-2',4', 6'-triisopropylbiphenyl are left to stir at 60° C. for 3 h in 100 ml of dioxane, added to 400 ml of water and acidified using 2 N hydrochloric acid. The aqueous phase is extracted three times with ethyl acetate, and the combined org. phases are washed with water and dried over sodium sulfate. The solvent is removed in vacuo, and the residue is filtered through silica gel with toluene/ethyl acetate (4:1). Crystallisation of the crude product from toluene/ethyl acetate (10:1) gives 7-(3-hydroxyprop-1-ynyl)-3-(4-methoxyphenyl)chromen-2-one as yellow crystals.

¹H-NMR (400 MHz, CDCl₃):

δ=1.74 ppm (t, br., OH), 3.86 (s, 3H, OCH₃), 4.45 (d, br., J=4.0 Hz, 2H, CH₂OH), 6.98 (m_c, 2 H, Ar—H), 7.33 (dd, J=1.5 Hz, J=8.0 Hz, 1H, Ar—H), 7.40 (s, br., 1H), 7.46 (d, J=8.0 Hz, 1H, Ar—H), 7.68 (m_c, 2 H, Ar—H), 7.73 (s, 1H, —C=CH—).

10.3 3-[3-(4-Methoxyphenyl)-2-oxo-2H-chromen-7-yl]prop-2-ynyl 2-methylacrylate (10)

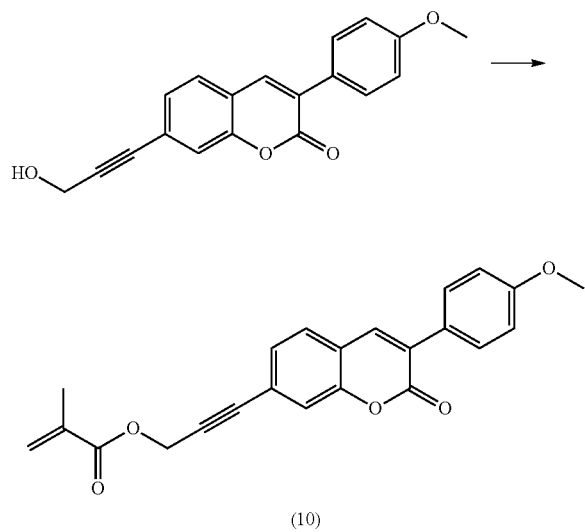

700 mg (2.29 mmol) of 7-(3-hydroxyprop-1-ynyl)-3-(4-methoxyphenyl)-chromen-2-one are suspended in 15 ml of dichloromethane, 0.3 ml (3.7 mmol) of pyridine and 10 mg of DMAP are added, and a solution of 450 mg (2.9 mmol) of methacrylic anhydride in 5 ml of dichloromethane is added dropwise with ice-cooling. After 30 min, the cooling is removed, and the batch is left to stir at room temp. for 3.5 h. The solvent is removed in vacuo, the residue is filtered through silica gel with dichloromethane/ethyl acetate (95:5), and the crude product is recrystallised from diethyl ether/ethyl acetate (2:3), giving 3-[3-(4-methoxyphenyl)-2-oxo-2H-chromen-7-yl]-prop-2-ynyl 2-methacrylate as yellow crystals of m.p. 143° C.

EXAMPLE 11

3-{4-[6-(2-Methylacryloyloxy)naphthalen-2-yl]phenyl}prop-2-ynyl 2-methylacrylate (11)

11.1 6-[4-(3-Hydroxyprop-1-ynyl)phenyl]naphthalen-2-ol

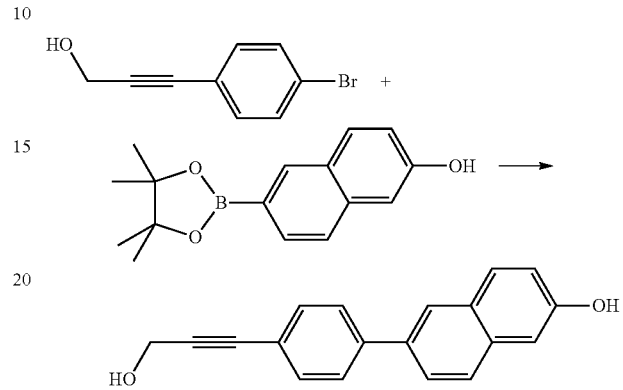

13.0 g (0.047 mol) of sodium metaborate octahydrate are initially introduced in 100 ml of water, and a solution of 7.00 g (33.1 mmol) of 3-(4-bromophenyl)prop-2-yn-1-ol (CAS No. 37614-58-7) and 9.00 g (33.3 mmol) of 6-(4,4,5,5-tetramethyl-1,3,2-dioxaborolan-2-yl)naphthalen-2-ol (CAS No. 269410-21-1) in 200 ml of THF is added. After addition of 1.00 g (1.40 mmol) of bis(triphenylphosphine)palladium (II) chloride, the batch is heated under reflux for 5 h, 100 ml of ethyl acetate are subsequently added, and the mixture is acidified using 2 M hydrochloric acid. The org. phase is separated off, dried over sodium sulfate and evaporated. The residue is filtered through silica gel with toluene/ethyl acetate (3:2), and the crude product is recrystallised from toluene/ethyl acetate, giving 6-[4-(3-hydroxyprop-1-ynyl)phenyl]naphthalen-2-ol as a colourless solid.

11.2 3-{4-[6-(2-Methylacryloyloxy)naphthalen-2-yl]phenyl}prop-2-ynyl 2-methylacrylate

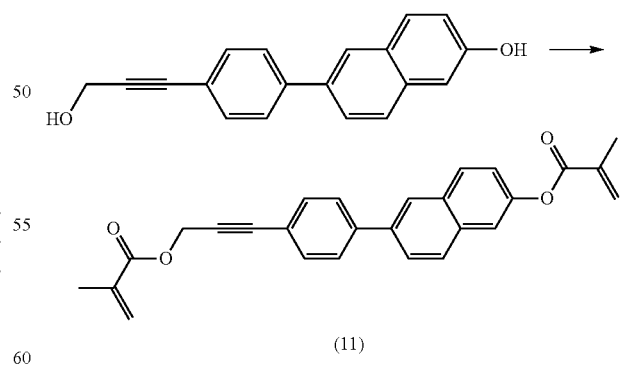

Analogously to Example 1, 6-[4-(3-hydroxyprop-1-ynyl)phenyl]naphthalen-2-ol gives 3-{4-[6-(2-methylacryloyloxy)naphthalen-2-yl]phenyl}prop-2-ynyl 2-methylacrylate as colourless crystals.

Phase behaviour Tg −23 C 110 SmE 110 SmA 159 I (decomp.).

EXAMPLE 12

6-{4-[4-(2-Methylacryloyloxy)but-1-ynyl]phenyl}naphthalen-2-yl 2-methylacrylate (12) is prepared analogously to Example 11.

Phase behaviour C 108 Sm (89) SmE (107) 5 mA 170 I (decomp.)

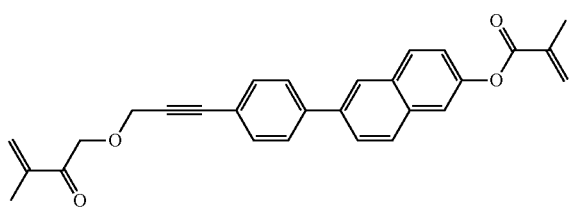

(12)

EXAMPLE 13

3-[2',3'-Difluoro-4-(2-methylacryloyloxy)[1,1';4',1"]terphenyl-4"-yl]prop-2-ynyl 2-methylacrylate (13)

13.1 4'-Benzyloxy-2,3-difluorobiphenyl-4-boronic acid

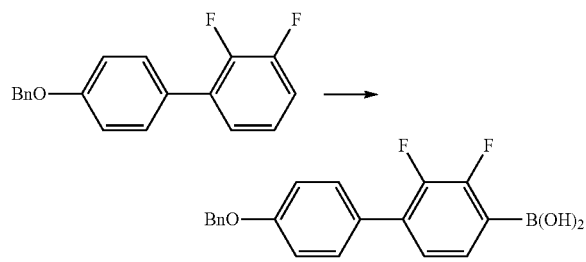

32.0 g (106 mmol) of 4'-benzyloxy-2,3-difluorobiphenyl (CAS No. 305366-70-5) are dissolved in 250 ml of THF, and 75.0 ml (119 mmol) of a 15% solution of n-butyllithium in hexane are added dropwise at −70° C. When the addition is complete, the mixture is stirred for a further 1 h, and a solution of 13.5 ml (119 mmol) of trimethyl borate in 50 ml of THF is added dropwise. After 1 h, the batch is left to thaw, MTB ether is added, and the mixture is acidified using 2 M hydrochloric acid. The org. phase is separated off, washed with sat. sodium chloride solution and dried over sodium sulfate. The solvent is removed in vacuo, and the residue is heated to 70° C. in 200 ml of heptane/toluene (1:1) with stirring and filtered off with suction after cooling, giving 4'-benzyloxy-2,3-difluorobiphenyl-4-boronic acid as a colourless solid, which is employed in the next step without further purification.

13.2 4'-Hydroxy-2,3-difluorobiphenyl-4-boronic acid

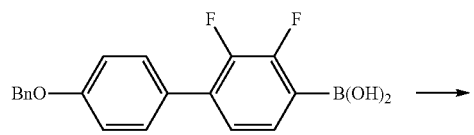

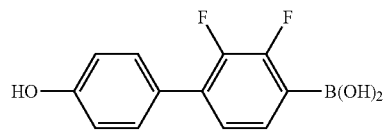

27.0 g (79.4 mmol) of 4'-benzyloxy-2,3-difluorobiphenyl-4-boronic acid are hydrogenated to completion on palladium/active carbon catalyst in THF. The catalyst is filtered off, and the solvent is removed in vacuo. The crude product is heated to 80° C. with 110 ml of toluene/ethyl acetate (10:1) with stirring and filtered off with suction after cooling, giving 4'-hydroxy-2,3-difluorobiphenyl-4-boronic acid as a colourless solid, which is employed in the next step without further purification.

13.3 2',3'-Difluoro-4"-(3-hydroxyprop-1-ynyl)-[1,1';4',1"]terphenyl-4-ol

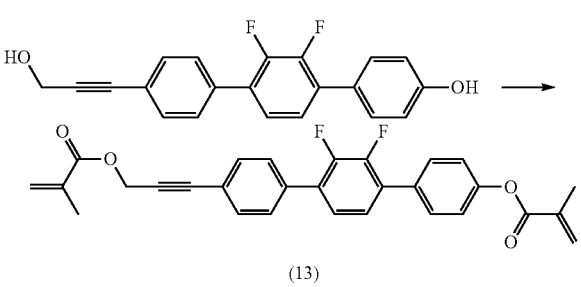

Analogously to Example 11.2, 4'-hydroxy-2,3-difluorobiphenyl-4-boronic acid and 3-(4-bromophenyl)prop-2-yn-1-ol give 2',3'-difluoro-4"-(3-hydroxyprop-1-ynyl)-[1,1';4',1"]terphenyl-4-ol as a colourless solid.

13.4 3-[2',3'-Difluoro-4-(2-methylacryloyloxy)-[1,1';4',1"]terphenyl-4"-yl]-prop-2-ynyl 2-methylacrylate Analogously to Example 1, 2',3'-difluoro-4"-(3-hydroxyprop-1-ynyl)-[1,1';4',1"]terphenyl-4-ol gives 3-[2',3'-difluoro-4-(2-methylacryloyloxy)-[1,1';4',1"]terphenyl-4"-yl]prop-2-ynyl 2-methylacrylate as a colourless solid.

Phase behaviour C 122 N 133 I.

EXAMPLE 14

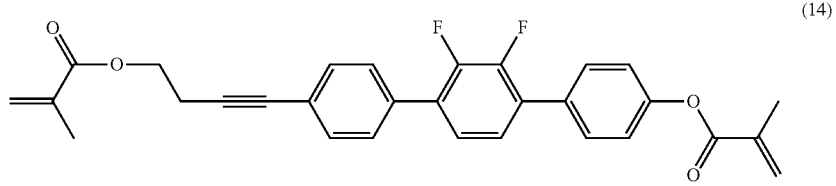 [SMILES: C=C(C)C(=O)OCCC#Cc1ccc(-c2ccc(-c3ccc(OC(=O)C(=C)C)cc3)c(F)c2F)cc1]

(14)

4-[2',3'-Difluoro-4-(2-methylacryloyloxy)-[1,1';4',1"]terphenyl-4"-yl]but-3-ynyl 2-methylacrylate (14) is prepared analogously to Example 13.

Phase behaviour C 112 N 150 (decomp.)

MIXTURE EXAMPLE A

The nematic LC mixture N1 is formulated as follows:

| | | | |
|---|---|---|---|
| CCH-501 | 9.00% | cl.p. | +70.0 |
| CCH-35 | 14.00% | Δn | 0.0825 |
| PCH-53 | 8.00% | Δε | −3.5 |
| CY-3-O4 | 14.00% | $\varepsilon_\parallel$ | 3.5 |
| CY-5-O4 | 13.00% | $K_3/K_1$ | 1.00 |
| CCY-3-O2 | 8.00% | γ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

In each case, 0.3% of a polymerisable monomeric compound of the formulae M1-M10 shown below from Examples 1-10 are added to the LC mixture N1, and the resultant mixtures (see Tables 1 and 2) are introduced into VA e/o test cells (rubbed antiparallel, VA-polyimide alignment layer, layer thickness d≈4 μm). The cells are irradiated with UV light having an intensity of 50 mW/cm² for the time indicated with application of a voltage of 24 V (alternating current), causing polymerisation of the monomeric compound. The tilt angle is determined before and after the UV irradiation by a crystal rotation experiment (Autronic-Melchers TBA-105).

In order to determine the polymerisation rate, the residual content of unpolymerised RM (in % by weight) in the test cells is measured by the HPLC method after various exposure times. To this end, each mixture is polymerised in the test cell under the stated conditions. The mixture is then rinsed out of the test cell using MEK (methyl ethyl ketone) and measured.

For comparative purposes, the experiments described above are carried out with structurally analogous polymerisable compounds C1-C10 known from the prior art (for example WO 2009/030329 A1).

Ex. 1

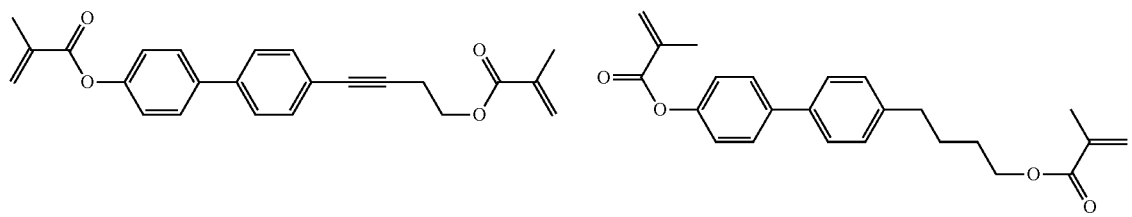

M1      C1

Ex. 2

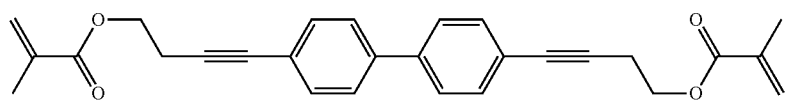

M2

Ex. 4

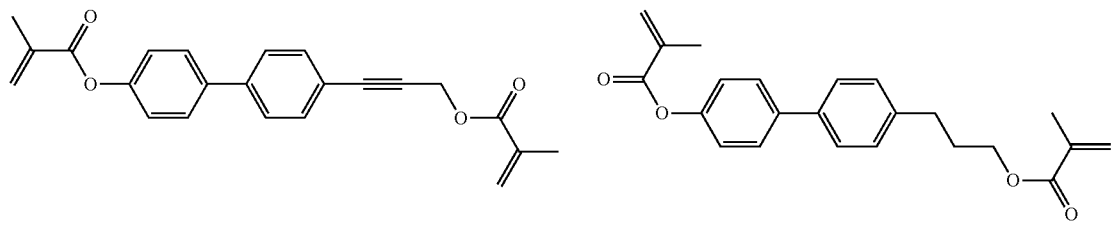

M4      C4

-continued
Ex. 5
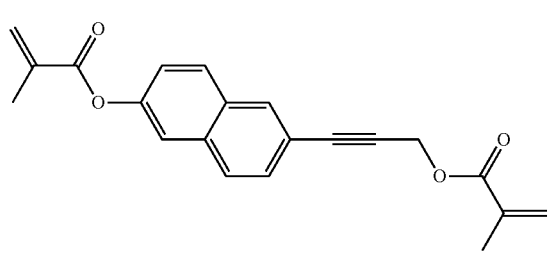
M5
Ex. 7
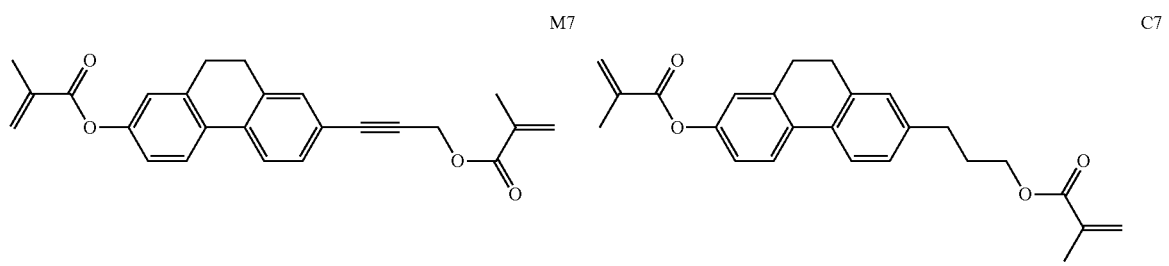
M7     C7
Ex. 8
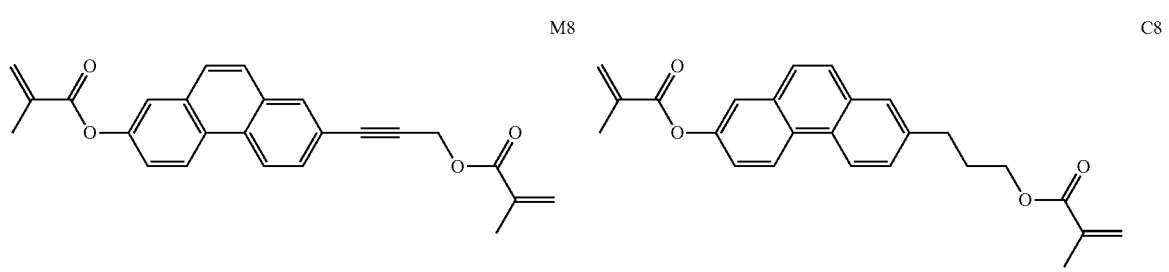
M8     C8
Ex. 9
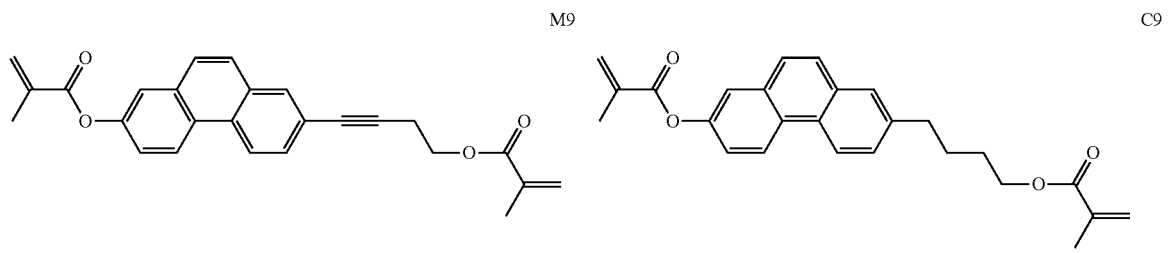
M9     C9
Ex. 10
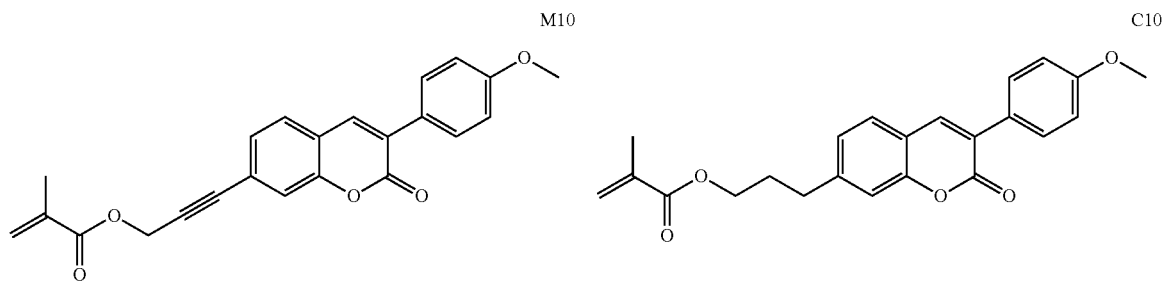
M10     C10

The comparative tilt-angle results for monomers M1-M10 and C1-C10 are shown in Tables 1 and 2. The RM concentrations after various exposure times are summarised in Tables 3 and 4.

TABLE 1

(t = exposure time)

| t/s | C1 | M1 | C4 | M4 | C7 | M7 | M2 |
|---|---|---|---|---|---|---|---|
| | | | | Tilt angle/° | | | |
| 0 | 89.8 | 88.7 | 87.0 | 89.4 | 89.1 | 88.5 | 89.4 |
| 30 | 89.7 | 89.1 | 86.3 | 88.9 | 88.0 | 85.9 | 88.6 |
| 60 | 89.0 | 86.2 | 87.6 | 87.1 | 86.8 | 80.5 | 88.2 |
| 120 | 87.7 | 81.4 | 85.9 | 83.7 | 80.7 | 76.9 | 87.7 |
| 240 | 84.8 | 76.4 | 82.6 | 79.9 | 72.3 | 70.4 | 84.3 |
| 360 | 81.9 | 73.7 | — | 77.4 | 67.7 | 65.9 | 82.1 |

TABLE 2

(t = exposure time)

| t/s | C8 | M8 | C9 | M9 | C10 | M10 | M5 |
|---|---|---|---|---|---|---|---|
| | | | | Tilt angle/° | | | |
| 0 | 88.9 | 89.5 | 88.9 | 88.4 | 88.7 | 89.7 | 88.8 |
| 30 | 88.8 | 87.6 | 89.3 | 87.4 | 90.0 | 86.6 | 89.0 |
| 60 | 85.9 | 83.0 | 86.9 | 82.0 | 89.6 | 84.3 | 87.0 |
| 120 | 81.6 | 76.6 | 82.1 | 77.9 | 88.1 | 80.7 | 82.8 |
| 240 | 77.2 | 71.0 | 78.7 | 73.8 | 85.2 | 77.6 | 74.7 |
| 360 | 75.6 | 68.5 | 76.0 | 72.8 | 82.5 | 75.2 | 66.4 |

TABLE 3

(t = exposure time)

| t/s | C1 | M1 | C4 | M4 | C7 | M7 | M5 |
|---|---|---|---|---|---|---|---|
| | | | | RM concentration/% | | | |
| 0 | 0.300 | 0.300 | 0.300 | 0.300 | 0.300 | 0.300 | 0.300 |
| 120 | 0.280 | 0.232 | 0.271 | 0.257 | 0.202 | 0.054 | 0.188 |
| 240 | 0.256 | 0.161 | 0.277 | 0.167 | 0.112 | 0.000 | 0.106 |
| 360 | 0.225 | 0.083 | 0.241 | 0.104 | 0.050 | 0.000 | 0.080 |

TABLE 4

(t = exposure time)

| t/s | C8 | M8 | C9 | M9 |
|---|---|---|---|---|
| | | | RM concentration/% | |
| 0 | 0.300 | 0.300 | 0.300 | 0.300 |
| 120 | 0.170 | 0.110 | 0.179 | 0.081 |
| 240 | 0.100 | 0.026 | 0.099 | 0.011 |
| 360 | 0.070 | 0.018 | 0.065 | 0.000 |

As can be seen from Tables 1 and 2, a small tilt angle after polymerisation is achieved more quickly in PSA displays containing monomers M1-M10 according to the invention than in PSA displays containing the corresponding structurally analogous, saturated monomers C1-C10 from the prior art.

As can be seen from Tables 3 and 4, significantly more rapid and complete polymerisation is achieved in PSA displays containing the monomers M1-M9 according to the invention than in PSA displays containing the corresponding structurally analogous, saturated monomers C1-C9 from the prior art.

MIXTURE EXAMPLE B

Test cells are produced as described in Example A using monomers 11-14 from Examples 11-14 and nematic LC mixture N1 from Example A, and the tilt angle and the residual RM content are determined. The results are summarised in Tables 5 and 6.

TABLE 5

(t = exposure time)

| t/s | Ex. 11 | Ex. 12 | Ex. 13 | Ex. 14 |
|---|---|---|---|---|
| | | Tilt angle/° | | |
| 0 | 87.8 | 87.6 | 89.0 | 89.0 |
| 30 | 82.8 | 83.6 | 87.7 | 86.3 |
| 60 | 77.5 | 79.6 | 83.6 | 81.4 |
| 120 | 73.5 | 74.8 | 81.2 | 78.6 |
| 240 | 71.2 | 70.9 | 78.6 | 76.3 |
| 360 | 66.4 | 69.4 | 77.0 | 76.3 |

TABLE 6

(t = exposure time)

| t/s | Ex. 11 | Ex. 12 | Ex. 13 | Ex. 14 |
|---|---|---|---|---|
| | | RM concentration/% | | |
| 0 | N/A | N/A | 0.300 | 0.300 |
| 120 | | | 0.128 | 0.130 |
| 240 | | | 0.030 | 0.030 |
| 360 | | | 0.000 | 0.000 |

As can be seen from Tables 5 and 6, rapid and complete polymerisation and a small tilt angle after polymerisation are achieved with the monomers from Examples 11-14.

The invention claimed is:
1. A liquid crystal medium comprising:
a polymerisable component A) comprising one or more polymerisable compounds, and
a liquid-crystalline component B) comprising one or more low-molecular-weight compounds that are monomeric and unpolymerisable,
wherein component A) comprises one or more polymerisable compounds selected from formula I

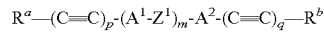

$$R^a-(C\equiv C)_p-(A^1-Z^1)_m-A^2-(C\equiv C)_q-R^b \qquad I$$

in which the individual radicals have the following meanings:
$R^a$, $R^b$ each, independently of one another, denote P-Sp-, H, F, Cl, Br, I, —CN, —NO$_2$—, —NCO, —NCS, —OCN, —SCN, SF$_5$, straight-chain or branched alkyl having 1 to 25 C atoms, in which, in addition, one or more non-adjacent CH$_2$ groups are each optionally replaced, independently of one another, by arylene, —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another and in which, in addition, one or more H atoms are each optionally replaced by F, Cl, Br, I, CN or P-Sp-, or aryl or heteroaryl which optionally contain two or more fused rings and which are optionally mono- or polysubstituted by L,
where at least one of the radicals $R^a$ and $R^b$ denotes or contains a group P-Sp-,
P on each occurrence, identically or differently, denotes a polymerisable group,
Sp on each occurrence, identically or differently, denotes a spacer group or a single bond, $A^1$, $A^2$ each, independently of one another, denote an aromatic, hetero aromatic, alicyclic or heterocyclic group, which optionally contains fused rings and which is optionally mono- or polysubstituted by L, L on each occurrence, identically or differently, denotes P-Sp-, H, OH, CH$_2$OH, halogen, SF$_5$, NO$_2$, a carbon group or hydrocarbon group, $Z^1$ denotes —O—, —S—, —CO—, —CO—O—, O—CO—, —O—CO—O—, —OCH$_2$— —CH$_2$O—, —SCH$_2$—, —CH$_2$S—, —CF$_2$O—, —OCF$_2$—, —CF$_2$S—, —SCF$_2$—, —(CH$_2$)$_n$—, —CH$_2$CH$_2$—, —CH$_2$CF$_2$—, —(CF$_2$)$_n$—, CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —C(R$^0$R$^{00}$)—, —C(R$^y$R$^z$)— or a single bond, R$^0$, R$^{00}$ each, independently of one another and identically or differently on each occurrence, denote H or alkyl having 1 to 12 C atoms, R$^y$, R$^z$ each, independently of one another, denote H, F, CH$_3$ or CF$_3$, m denotes 0, 1, 2, 3 or 4, n on each occurrence, identically or differently, denotes 1, 2, 3 or 4, p, q each, independently of one another, denote 0 or 1, where p+q≥1.

2. The liquid crystal medium according to claim 1, wherein said one or more polymerisable compounds are selected from the following sub-formulae:

I1
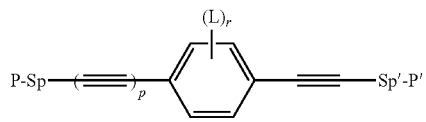

I2
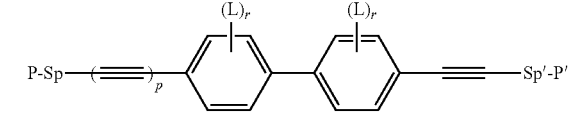

I3
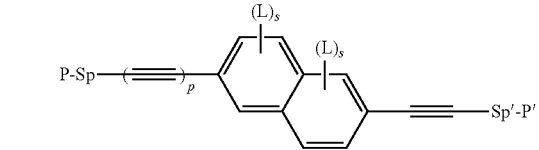

I4
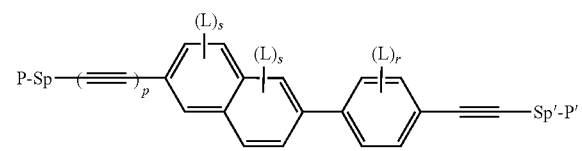

I5
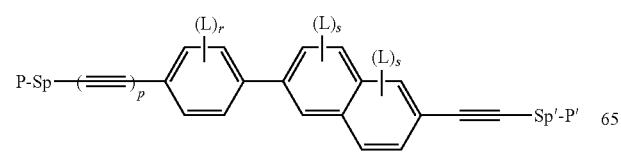

I6
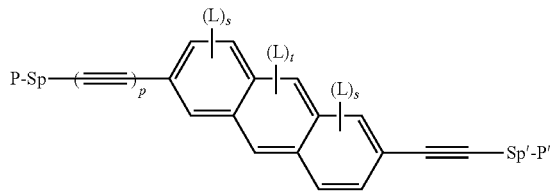

I7
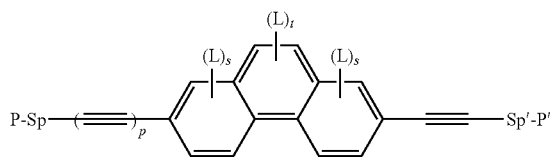

I8
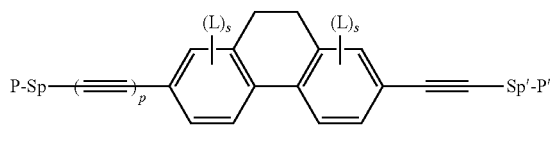

I9
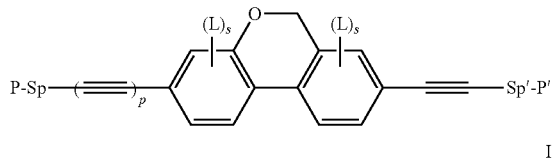

I10
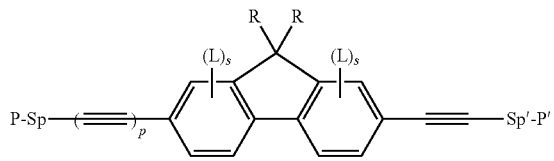

I11
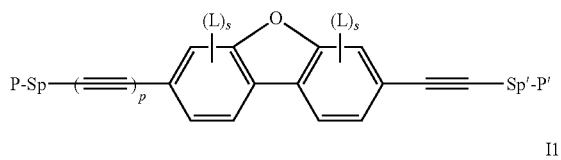

I12
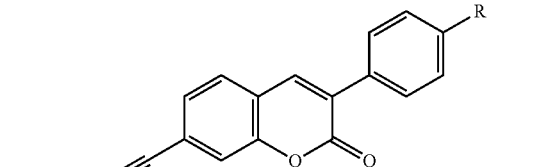

I13
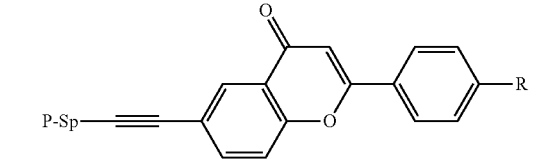

I14

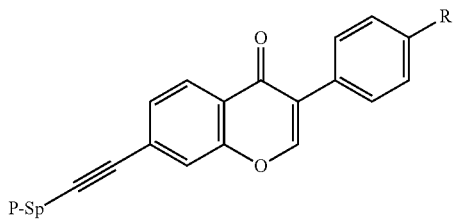

I15

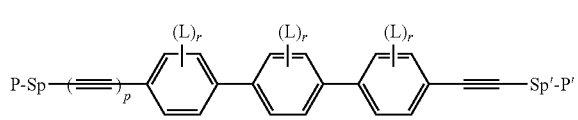

in which p, P, Sp and L have the meanings indicated in claim 1, the radicals R each, independently of one another, denote P-Sp-, H, F, Cl, Br, I, —CN, —NO₂, —NCO, —NCS, —OCN, —SCN, SF₅, straight-chain or branched alkyl having 1 to 25 C atoms, in which, in addition, one or more non-adjacent CH₂ groups are each optionally replaced, independently of one another, by arylene, —C(R⁰)═C(R⁰⁰)—, —C≡C—, —N(R⁰)—, —O—, —S—, —CO—, —CO—O—, —O—CO—, —O—CO—O— in such a way that O and/or S atoms are not linked directly to one another and in which, in addition, one or more H atoms are each optionally replaced by F, Cl, Br, I, CN or P-Sp-, or aryl or heteroaryl which optionally contain two or more fused rings and which are optionally mono- or polysubstituted by L, P' on each occurrence, identically or differently, denotes a polymerisable group, Sp' on each occurrence, identically or differently, denotes a spacer group or a single bond, r denotes 0, 1, 2, 3 or 4, s denotes 0, 1, 2 or 3, and t denotes 0, 1 or 2.

3. The liquid crystal medium according to claim 1, wherein component B comprises one or more compounds of the formulae CY and/or PY:

CY

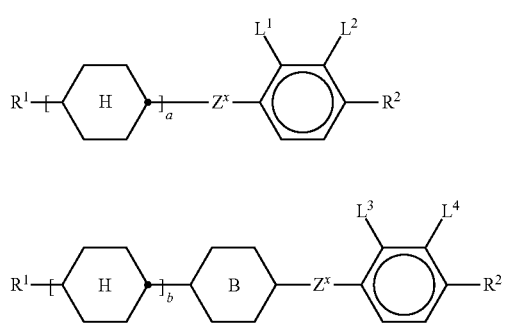

PY in which the individual radicals have the following meanings:

a denotes 1 or 2, b denotes 0 or 1,

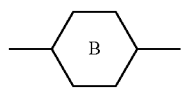

denotes

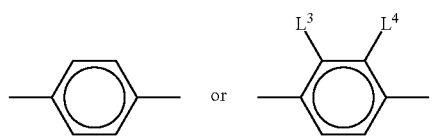

R¹ and R² each, independently of one another, denote alkyl having 1 to 12 C atoms, where, in addition, one or two non-adjacent CH₂ groups are each optionally replaced by —O—, —CH═CH—, —CO—, —O—CO— or —CO—O— in such a way that O atoms are not linked directly to one another, Zˣ denotes —CH═CH—, —CH₂O—, —OCH₂—, —CF₂O—, —OCF₂—, —O—, —CH₂—, —CH₂CH₂— or a single bond, and L¹⁻⁴ each, independently of one another, denote F, Cl, OCF₃, CF₃, CH₃, CH₂F, or CHF₂.

4. The liquid crystal medium according to claim 1, wherein component B comprises one or more compounds of the following formula:

ZK

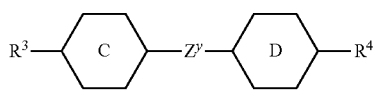

in which the individual radicals have the following meanings:

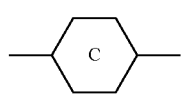

denotes

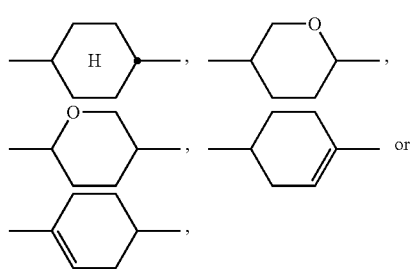

D denotes

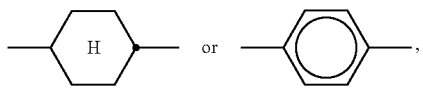

$R^3$ and $R^4$ each, independently of one another, denote alkyl having 1 to 12 C atoms, in which, in addition, one or two non-adjacent CH$_2$ groups are each optionally replaced by —O—, —CH=CH—, —CO—, —O—CO— or —CO—O— in such a way that O atoms are not linked directly to one another, $Z^y$ denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

5. A liquid crystal display containing a liquid crystal medium according to claim 1.

6. The liquid crystal display according to claim 5, characterised in that it is a PSA-VA, PSA-OCB, PS-IPS, PS-FFS or PS-TN display.

7. A polymerisable compound selected from formula I:

$$R^a\text{—}(C\!\!\equiv\!\!C)_p\text{-}(A^1\text{-}Z^1)_m\text{-}A^2\text{-}(C\!\!\equiv\!\!C)_q\text{-}R^b \qquad \text{I}$$

in which the individual radicals have the following meanings:
$R^a$, $R^b$ each, independently of one another, denote P-Sp-, H, F, Cl, Br, I, —CN, —NO$_2$, —NCO, —NCS, —OCN, —SCN, SF$_5$, straight-chain or branched alkyl having 1 to 25 C atoms, in which, in addition, one or more non-adjacent CH$_2$ groups may each be replaced, independently of one another, by arylene, —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another and in which, in addition, one or more H atoms may be replaced by F, Cl, Br, I, CN or P-Sp-, or aryl or heteroaryl which may also contain two or more fused rings and which is optionally mono- or polysubstituted by L,
where at least one of the radicals $R^a$ and $R^b$ denotes or contains a group P-Sp-,
P on each occurrence, identically or differently, denotes a polymerisable group,
Sp on each occurrence, identically or differently, denotes a spacer group or a single bond,
$A^1$, $A^2$ each, independently of one another, denote an aromatic, heteroaromatic, alicyclic or heterocyclic group, preferably having 4 to 25 C atoms, which may also contain fused rings and which is optionally mono- or polysubstituted by L,
L on each occurrence, identically or differently, denotes P-Sp-, H, OH, CH$_2$OH, halogen, SF$_5$, NO$_2$, a carbon group or hydrocarbon group,
$Z^1$ denotes —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —C(R$^0$R$^{00}$)—, —C(R$^y$R$^z$)- or a single bond, $R^0$, $R^{00}$ each, independently of one another and identically or differently on each occurrence, denote H or alkyl having 1 to 12 C atoms,
$R^y$, $R^z$ each, independently of one another, denote H, F, CH$_3$ or CF$_3$,
m denotes 0, 1, 2, 3 or 4,
n on each occurrence, identically or differently, denotes 1, 2, 3 or 4, and
p, q each, independently of one another, denote 0 or 1, where p+q is 1 or 2;
with the provisos that:
in the case where p=q=1, then -(A$^1$-Z$^1$)$_m$-A$^2$- is other than biphenyl, terphenyl, fluorene, substituted fluorene, and dibenzofuran; and
in the case where p=q=1, R$^a$=R$^b$=P-Sp-, P denotes an acrylate, glycidyl or epoxide group, and Sp denotes alkoxy or oxaalkyl having 1 to 20 C atoms or a single bond, then -(A$^1$-Z$^1$)$_m$-A$^2$- denotes a radical other than the following groups:

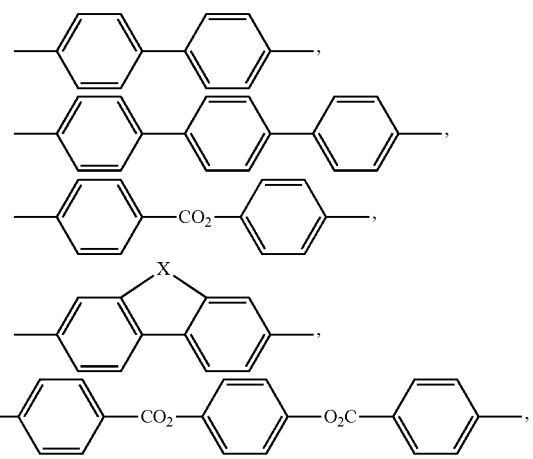

in which X denotes CH$_2$, NH, O, S or SO$_2$.

8. A compound according to formula II $$\text{G-O-Sp-}(C\!\!\equiv\!\!C)_p\text{-}(A^1\text{-}Z^1)_m\text{-}A^2\text{-}(C\!\!\equiv\!\!C)_q\text{-Sp'-O-G'} \qquad \text{II}$$

in which
$A^1$, $A^2$ each, independently of one another, denote an aromatic, hetero aromatic, alicyclic or heterocyclic group which optionally contains fused rings and which is optionally mono- or polysubstituted by L,
L on each occurrence, identically or differently, denotes P-Sp-, H, OH, CH$_2$OH, halogen, SF$_5$, NO$_2$, a carbon group or hydrocarbon group,
$Z^1$ denotes —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —C(R$^0$R$^{00}$)—, —C(R$^y$R$^z$)— or a single bond,
$R^0$, $R^{00}$ each, independently of one another and identically or differently on each occurrence, denote H or alkyl having 1 to 12 C atoms, R$^y$, R$^{00}$ each, independently of one another, denote H, F, CH$_3$ or CF$_3$, Sp on each occurrence, identically or differently, denotes a spacer group or a single bond, Sp' on each occurrence, identically or differently, denotes a spacer group or a single bond, n on each occurrence, identically or differently, denotes 1, 2, 3 or 4, p, q each, independently of one another, denote 0 or 1, where p+q is 1 or 2, m denotes 0, 1, 2, 3 or 4, and G and G' each, independently of one another, denote an H atom or a protecting group;

with the proviso that: in the case where p=q=1, then -(A$^1$-Z$^1$)$_m$-A$^2$- is other than biphenyl, terphenyl, fluorene, substituted fluorene, and dibenzofuran.

9. A process for the preparation of a compound, in which a compound according to claim 8 is esterified or etherified using corresponding acids, acid derivatives, or halogenated compounds containing a group P, wherein P on each occurrence is, identically or differently, a polymerisable group, in the presence of a dehydrating reagent.

10. A process for the production of an LC display of the PS or PSA type, in which an LC medium according to claim 1 is introduced into an LC cell having two substrates and two electrodes, where at least one substrate is transparent to light and at least one substrate has one or two electrodes, and the polymerisable compounds are polymerised, preferably with application of an electrical voltage to the electrodes.

11. The liquid crystal display according to claim 5, wherein said display is of the PS or PSA type and comprises an LC cell having two substrates and two electrodes, where at least one substrate is transparent to light and at least one substrate has one or two electrodes, and a layer, located between the substrates, of said liquid crystal medium.

12. A liquid crystal display of the PS or PSA type comprising:
a liquid crystal cell having two substrates and two electrodes, wherein at least one substrate is transparent to light and at least one substrate has one or two electrodes, and a layer, located between the substrates, of a liquid crystal medium comprising a polymerised component and a low-molecular-weight component, where the polymerised component is obtainable by polymerisation of one or more polymerisable compounds between the substrates of the liquid crystal cell in the liquid crystal medium, where at least one of the polymerisable compounds contains one mesogenic group and one or more polymerisable groups, where at least one of these polymerisable groups is connected to the mesogenic group via a spacer group and where at least one of these spacer groups contains a C—C triple bond.

13. The liquid crystal medium according to claim 1, wherein R$^a$ and R$^b$ denote identical or different radicals P-Sp-.

14. The liquid crystal medium according to claim 1, wherein R$^a$ and R$^b$ denote P-Sp-, where Sp in one of the radicals R$^a$ and R$^b$ denotes a single bond and Sp in the other of the radicals R$^a$ and R$^b$ is other than a single bond.

15. The liquid crystal medium according to claim 1, wherein Z$^1$ denotes a single bond.

16. The liquid crystal medium according to claim 1, wherein m denotes 0 or 1.

17. The liquid crystal medium according to claim 1, wherein A$^1$ and A$^2$ are selected from phenylene-1,4-diyl, naphthalene-2,6-diyl, phenanthrene-2,7-diyl, anthracene-2,7-diyl, 9,10-dihydrophenanthrene-2,7-diyl, 6H-benzo[c] chromene-3,8-diyl, which is optionally mono- or disubstituted in the 6-position by R$^a$, 9H-fluorene-2,7-diyl, which is optionally mono- or disubstituted in the 9-position by R$^a$, dibenzofuran-3,7-diyl, which is optionally mono- or disubstituted in the 6-position by R$^a$, where, in addition, one or two CH groups in all the rings or ring systems described above are each optionally replaced by N and where the individual rings are each optionally mono- or polysubstituted by L.

18. The liquid crystal medium according to claim 1, wherein L is selected from F, Cl, —CN and straight-chain or branched alkyl having 1 to 25 C atoms, in which, in addition, one or more non-adjacent CH$_2$ groups are each optionally replaced, independently of one another, by —C(R$^0$)=C(R$^{000}$)—, —C≡C—, —N(R$^{00}$)—, —O—, —S—, —CO—, —CO—O—, —O—CO—, or —O—CO—O— in such a way that O and/or S atoms are not linked directly to one another and in which, in addition, one or more H atoms are each optionally replaced by F, Cl, Br, I or CN.

19. The liquid crystal medium according to claim 1, wherein said one or more polymerisable compounds are selected from the following sub-formulae:

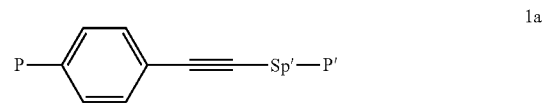

1a

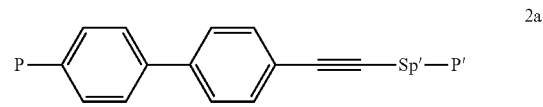

2a

3a

4a

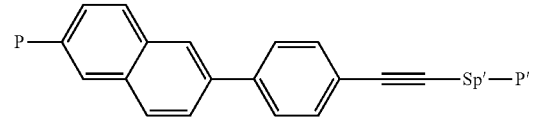

5a

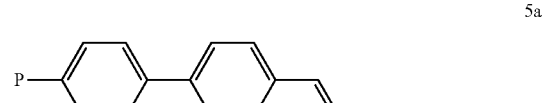

6a

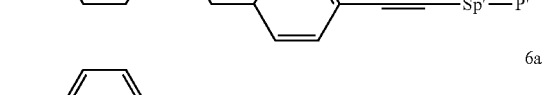

7a

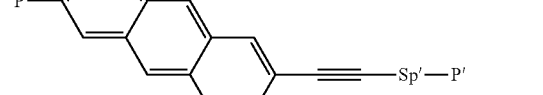

8a

-continued

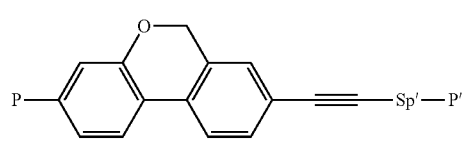

9a

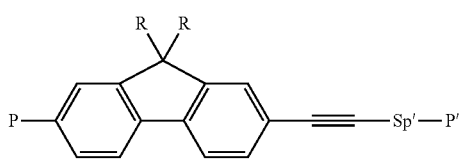

10a

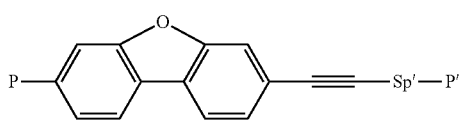

11a

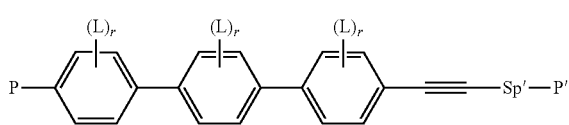

15a in which P, Sp and L have the meanings indicated in claim 1,
P' on each occurrence, identically or differently, denotes a polymerisable group,
Sp' on each occurrence, identically or differently, denotes a spacer group or a single bond, and
r denotes 0, 1, 2, 3 or 4.

20. The liquid crystal medium according to claim 2, wherein P and P' denote an acrylate, fluoroacrylate or methacrylate group.

21. The liquid crystal medium according to claim 2, wherein Sp and Sp' denote —(CH$_2$)$_{p1}$—O—(CH$_2$)$_{p1}$—, —(CH$_2$)$_{p1}$—O—, —O—CO—(CH$_2$)$_{p1}$—, —(CH$_2$)$_{p1}$—O—CO—, —O—CO—O—(CH$_2$)$_{p1}$—, —(CH$_2$)$_{p1}$—O—CO—O— or a single bond, in which p1 denotes an integer from 1 to 12, and where these groups are linked to P or P' in such a way that O atoms are not linked directly to one another.

22. The polymerisable compound according to claim 7, wherein R$^a$ and R$^b$ denote identical or different radicals P-Sp-.

23. The polymerisable compound according to claim 7, wherein R$^a$ and R$^b$ denote P-Sp-, where Sp in one of the radicals R$^a$ and R$^b$ denotes a single bond and Sp in the other of the radicals R$^a$ and R$^b$ is other than a single bond.

24. The polymerisable compound according to claim 7, wherein Z$^1$ denotes a single bond.

25. The polymerisable compound according to claim 7, wherein m denotes 0 or 1.

26. The polymerisable compound according to claim 7, wherein A$^1$ and A$^2$ are selected from phenylene-1,4-diyl, naphthalene-2,6-diyl, phenanthrene-2,7-diyl, anthracene-2,7-diyl, 9,10-dihydrophenanthrene-2,7-diyl, 6H-benzo[c]chromene-3,8-diyl, which is optionally mono- or disubstituted in the 6-position by R$^a$, 9H-fluorene-2,7-diyl, which is optionally mono- or disubstituted in the 9-position by R$^a$, dibenzofuran-3,7-diyl, which is optionally mono- or disubstituted in the 6-position by R$^a$, where, in addition, one or two CH groups in all the rings or ring systems described above are each optionally replaced by N and where the individual rings are each optionally mono- or polysubstituted by L.

27. The polymerisable compound according to claim 7, wherein L is selected from F, Cl, —CN and straight-chain or branched alkyl having 1 to 25 C atoms, in which, in addition, one or more non-adjacent CH$_2$ groups are each optionally replaced, independently of one another, by —C(R$^{oo}$)=C(R$^{ooo}$)—, —C≡C—, —N(R$^{oo}$)—, —O—, —S—, —CO—, —CO—O—, —O—CO—, or —O—CO—O— in such a way that O and/or S atoms are not linked directly to one another and in which, in addition, one or more H atoms are each optionally replaced by F, Cl, Br, I or CN.

28. The polymerisable compound according to claim 7, wherein said one or more polymerisable compounds are selected from the following sub-formulae:

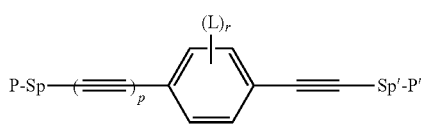

I1

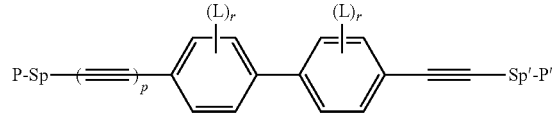

I2

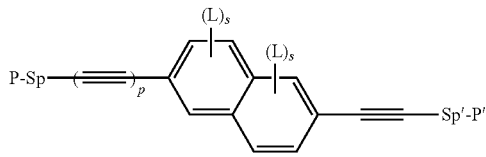

I3

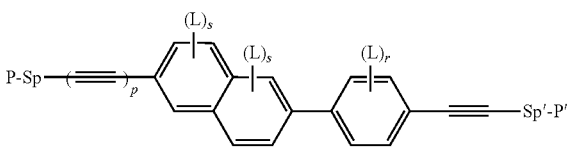

I4

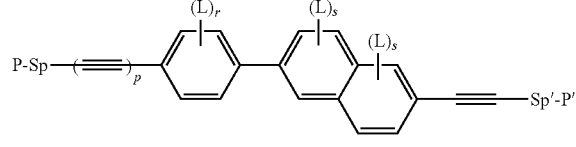

I5

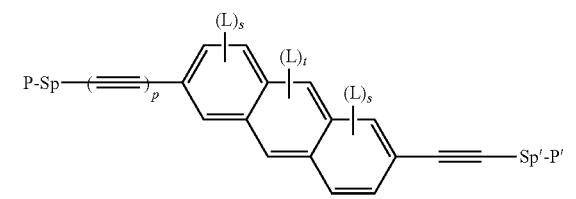

I6

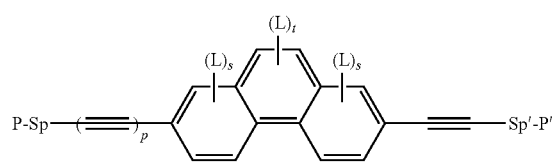

I7

-continued

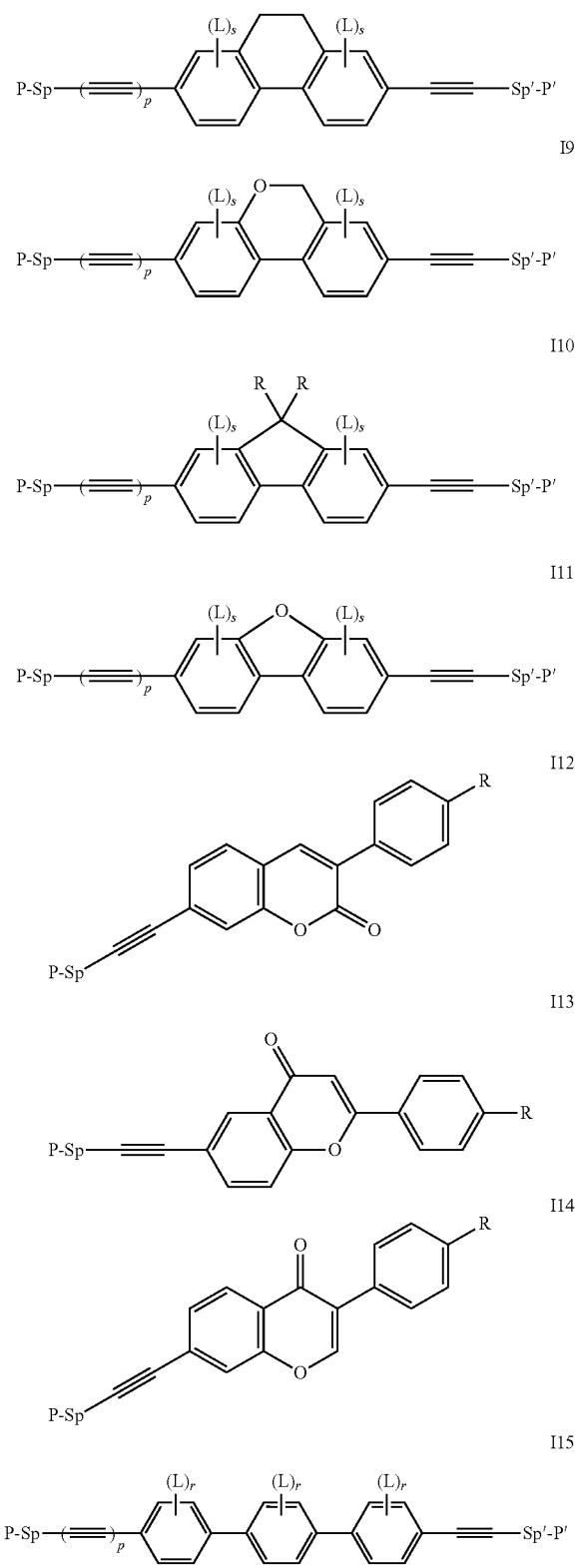

in which
p, P, Sp and L have the meanings indicated in claim 7,
the radicals R each, independently of one another, denote P-Sp-, H, F, Cl, Br, I, —CN, —NO$_2$, —NCO, —NCS, —OCN, —SCN, SF$_5$, straight-chain or branched alkyl having 1 to 25 C atoms, in which, in addition, one or more non-adjacent CH$_2$ groups are each optionally replaced, independently of one another, by arylene, —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another and in which, in addition, one or more H atoms are each optionally replaced by F, Cl, Br, I, CN or P-Sp-, or aryl or heteroaryl which optionally contain two or more fused rings and which are optionally mono- or polysubstituted by L, P' on each occurrence, identically or differently, denotes a polymerisable group, Sp' on each occurrence, identically or differently, denotes a spacer group or a single bond, r denotes 0, 1, 2, 3 or 4, s denotes 0, 1, 2 or 3, and t denotes 0, 1 or 2.

29. A polymerisable compound according to claim 7, wherein said compound is selected from the following sub-formulae:

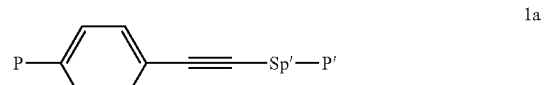

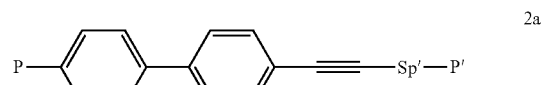

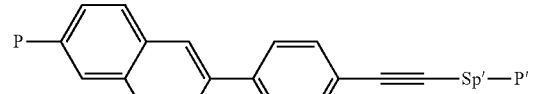

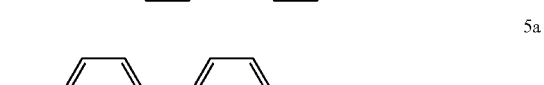

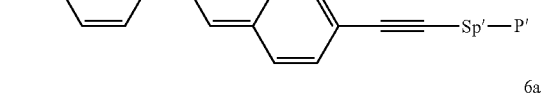

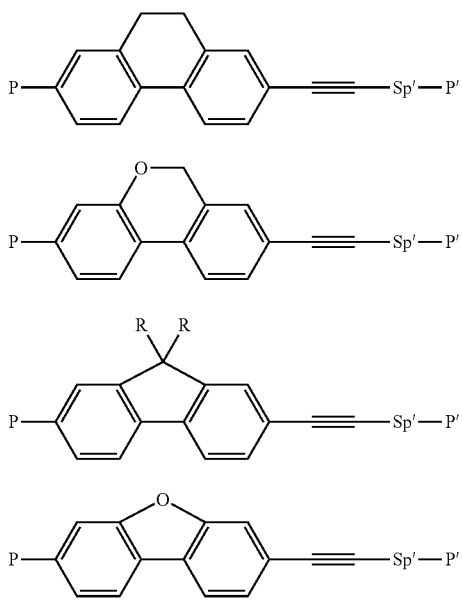

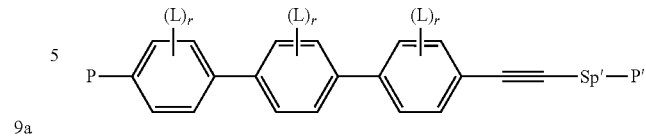

in which P, Sp and L have the meanings indicated in claim 7,
P' on each occurrence, identically or differently, denotes a polymerisable group,
Sp' on each occurrence, identically or differently, denotes a spacer group or a single bond, and
r denotes 0, 1, 2, 3 or 4.

30. A polymerisable compound according to claim 28, wherein P and P' denote an acrylate, fluoroacrylate or methacrylate group.

31. A polymerisable compound according to claim 28, wherein Sp and Sp' denote —$(CH_2)_{p1}$—, —O—$(CH_2)_{p1}$—, —$(CH_2)_{p1}$—O—, —O—CO—$(CH_2)_{p1}$—, —$(CH_2)_{p1}$—O—CO—, —O—CO—O—$(CH_2)_{p1}$—, —$(CH_2)_{p1}$—O—CO—O— or a single bond, in which p1 denotes an integer from 1 to 12, and where these groups are linked to P or P' in such a way that O atoms are not linked directly to one another.

* * * * *

UNITED STATES PATENT AND TRADEMARK OFFICE
CERTIFICATE OF CORRECTION

| | | |
|---|---|---|
| PATENT NO. | : 8,940,184 B2 | Page 1 of 1 |
| APPLICATION NO. | : 13/498694 | |
| DATED | : January 27, 2015 | |
| INVENTOR(S) | : Andreas Taugerbeck et al. | |

It is certified that error appears in the above-identified patent and that said Letters Patent is hereby corrected as shown below:

IN THE CLAIMS:

Column 141, line 12 (Claim 1), reads: -- -(CF$_2$)$_n$, CH=CH-, -CF=CF-, -CH=CF-, --
Should read: -- -(CF$_2$)$_n$-, -CH=CH-, -CF=CF-, -CH=CF-, --.

Column 147, line 1 (Claim 8), reads: -- R$^y$, R$^{00}$ each, independently of one another, denote H, F, --
Should read: -- R$^y$, R$^2$ each, independently of one another, denote H, F, --.

Column 148, line 13 (Claim 18), reads: -- replaced, independently of one another, by -C(R$^0$)=C --
Should read: -- replaced, independently of one another, by -C(R$^{00}$)=C --.

Signed and Sealed this
First Day of September, 2015

Michelle K. Lee
*Director of the United States Patent and Trademark Office*